US011592555B2

(12) United States Patent
Ata et al.

(10) Patent No.: US 11,592,555 B2
(45) Date of Patent: Feb. 28, 2023

(54) SETTING VALUE ADJUSTMENT DEVICE FOR DISPLACEMENT METER

(71) Applicant: Mitsubishi Electric Corporation, Tokyo (JP)

(72) Inventors: Daiki Ata, Tokyo (JP); Tatsumi Yabusaki, Tokyo (JP); Yuji Hattori, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/423,907

(22) PCT Filed: Mar. 11, 2019

(86) PCT No.: PCT/JP2019/009652
§ 371 (c)(1),
(2) Date: Jul. 19, 2021

(87) PCT Pub. No.: WO2020/183558
PCT Pub. Date: Sep. 17, 2020

(65) Prior Publication Data
US 2022/0043148 A1 Feb. 10, 2022

(51) Int. Cl.
*G01S 17/08* (2006.01)
*G01S 7/497* (2006.01)
(Continued)

(52) U.S. Cl.
CPC .............. *G01S 17/08* (2013.01); *G01S 7/497* (2013.01); *G05B 1/01* (2013.01); *G05B 13/0265* (2013.01);
(Continued)

(58) Field of Classification Search
None
See application file for complete search history.

(56) References Cited

U.S. PATENT DOCUMENTS

2002/0167677 A1    11/2002  Okada et al.
2005/0129304 A1    6/2005   Sasazawa et al.
(Continued)

FOREIGN PATENT DOCUMENTS

JP    2001-159516 A    6/2001
JP    2002-357408 A    12/2002
(Continued)

OTHER PUBLICATIONS

International Search Report and Written Opinion dated Jun. 11, 2019, received for PCT Application PCT/JP2019/009652, Filed on Mar. 11, 2019, 9 pages including English Translation.
(Continued)

*Primary Examiner* — Sean Shechtman
(74) *Attorney, Agent, or Firm* — Xsensus LLP

(57) ABSTRACT

A setpoint adjustment apparatus for a displacement meter (10) includes a determiner (343) to determine whether a measurement value acquired by an acquirer (341) in measurement of a reference workpiece using an applying setpoint, to be used in measurement of the reference workpiece, is within the range of a desired measurement value (352), and a changer (345) to change the applying setpoint. When the measurement value is within the range of the desired measurement value (352), the applying setpoint used in acquisition of the measurement value is employed as an applying setpoint for inspection of a measurement target (1). When the measurement value is out of this range, the applying setpoint used in acquisition of the measurement value is changed to a different applying setpoint, and whether the measurement value from the reference workpiece using this applying setpoint is within the range of the desired measurement value (352) is determined.

16 Claims, 47 Drawing Sheets

(51) Int. Cl.
  *G08C 25/00* (2006.01)
  *G05B 13/02* (2006.01)
  *G05B 1/01* (2006.01)
(52) U.S. Cl.
  CPC .... *G08C 25/00* (2013.01); *G05B 2219/49004* (2013.01)

(56) References Cited

U.S. PATENT DOCUMENTS

2015/0055141 A1* 2/2015 Cai .................. H01L 21/67288
  356/244
2017/0160074 A1 6/2017 Mossavat et al.

FOREIGN PATENT DOCUMENTS

| | | |
|---|---|---|
| JP | 2004-239866 A | 8/2004 |
| JP | 2005-121508 A | 5/2005 |
| JP | 2006-38571 A | 2/2006 |
| JP | 2010-223950 A | 10/2010 |
| JP | 2019-504293 A | 2/2019 |

OTHER PUBLICATIONS

Decision to Grant dated Jun. 23, 2020, received for JP Application 2020-518092, 5 pages including English Translation.

* cited by examiner

FIG.5

| ATTRIBUTE OF SETPOINT | INITIAL SETPOINT (X1) | SETPOINT (Xx) |
|---|---|---|
| LIGHT EMISSION (Ix) | 50% | 0.01~100% |
| MEASUREMENT MODE (Jx) | DIFFUSE REFLECTION | DIFFUSE REFLECTION, REGULAR REFLECTION, METAL, TRANSLUCENT OBJECT, GLASS, PATTERNED GLASS, AND OTHERS |
| FILTER TYPE (Kx) | MOVING AVERAGE | MOVING AVERAGE, LOW-PASS FILTER, HIGH-PASS FILTER, AND OTHERS |
| MOVING-AVERAGE CALCULATION TIMES (Lx) | 128 TIMES | 1, 2, 4, 8, 16, 32, 64, 128, 256, 512, 1024, 2048, 4096, 8192, ···, 65536 TIMES |
| SAMPLING PERIOD (Mx) | 40μs | 10μs, 20μs, 40μs, 100μs, 200μs, 400μs, 1ms, 2ms |
| CUT-OFF FREQUENCY (Nx) | 100Hz | 1Hz, 2Hz, 4Hz, 10Hz, 20Hz, ···, 2000Hz |
| REFRACTIVE INDEX (Ox) | 1.5000 | 0.5000~2.0000 |
| MEASUREMENT RECIPE (Px) | STANDARD | MEASUREMENT RECIPE A TO MEASUREMENT RECIPE G, AND OTHERS |
| ··· | ··· | ··· |

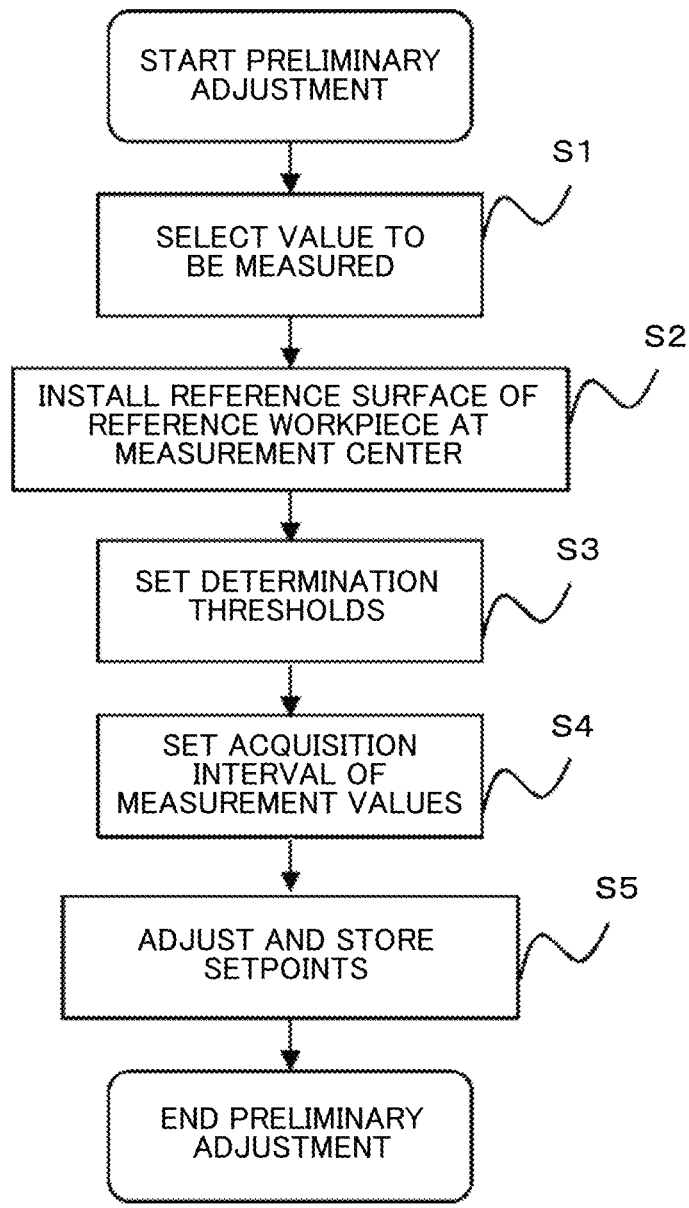

FIG.21

| | MEASURE-MENT RECIPE A | MEASURE-MENT RECIPE B | MEASURE-MENT RECIPE C | MEASURE-MENT RECIPE D | MEASURE-MENT RECIPE E | MEASURE-MENT RECIPE F | MEASURE-MENT RECIPE G | ⋮ |
|---|---|---|---|---|---|---|---|---|
| LIGHT EMISSION (Ix) | 50% | 80% | 20% | 20% | 20% | 30% | 50% | ⋮ |
| MEASUREMENT MODE (Jx) | DIFFUSE REFLECTION | DIFFUSE REFLECTION | REGULAR REFLECTION | REGULAR REFLECTION | REGULAR REFLECTION | REGULAR REFLECTION | REGULAR REFLECTION | ⋮ |
| FILTER TYPE (Kx) | MOVING AVERAGE | MOVING AVERAGE | MOVING AVERAGE | MOVING AVERAGE | MOVING AVERAGE | MOVING AVERAGE | MOVING AVERAGE | ⋮ |
| MOVING-AVERAGE CALCULATION TIMES (Lx) | 128 TIMES | 128 TIMES | 128 TIMES | 128 TIMES | 128 TIMES | 32 TIMES | 512 TIMES | ⋮ |
| SAMPLING PERIOD (Mx) | 40μs | 200μs | 40μs | 40μs | 40μs | 40μs | 40μs | ⋮ |
| CUT-OFF FREQUENCY (Nx) | — | — | — | — | — | — | — | ⋮ |
| REFRACTIVE INDEX (Ox) | — | — | — | — | 1.5000 | — | — | ⋮ |
| ⋮ | ⋮ | ⋮ | ⋮ | ⋮ | ⋮ | ⋮ | ⋮ | ⋮ |

| PHYSICAL PROPERTY DETECTION UNIT 40 | | | | MEASUREMENT RECIPE (Px) |
|---|---|---|---|---|
| FIRST DETECTOR | SECOND DETECTOR | THIRD DETECTOR | FOURTH DETECTOR | |
| × | × | × | ○ | MEASUREMENT RECIPE A |
| × | × | ○ | ○ | MEASUREMENT RECIPE B |
| ○/× | ○ | ○/× | ○ | MEASUREMENT RECIPE C |
| × | ○ | ○ | ○ | MEASUREMENT RECIPE F |
| ○ | ○ | × | ○ | MEASUREMENT RECIPE G |
| ... | ... | ... | ... | ... |

FIG.35

| PHYSICAL PROPERTY DETECTION UNIT | | | | MOVING-AVERAGE CALCULATION TIMES (Lx) |
|---|---|---|---|---|
| FIRST DETECTOR | SECOND DETECTOR | THIRD DETECTOR | FOURTH DETECTOR | |
| × | ○ | ○ | ○ | 32 TIMES (METAL (MIRROR SURFACE)) |
| × | × | ○/× | ○ | 128 TIMES (NORMAL / METAL (NON-MIRROR SURFACE) AND OTHERS) |
| ○ | × | ○ | ○ | 512 TIMES (PATTERNED GLASS) |
| ⋮ | ⋮ | ⋮ | ⋮ | ⋮ |

FIG.37

| PHYSICAL PROPERTY DETECTION UNIT | | | | MOVING-AVERAGE CALCULATION TIMES (Lx) | |
|---|---|---|---|---|---|
| FIRST DETECTOR | SECOND DETECTOR | THIRD DETECTOR | FOURTH DETECTOR | FIRST TEMPERA- TURE | SECOND TEMPERA- TURE |
| × | ○ | ○ | ○ | 32 TIMES | 64 TIMES |
| × | × | ○/× | ○ | 128 TIMES | 256 TIMES |
| ○ | × | ○ | ○ | 512 TIMES | 1024 TIMES |
| ... | ... | ... | ... | ... | ... |

FIG.40

| PHYSICAL PROPERTY DETECTION UNIT | | | | MOVING-AVERAGE CALCULATION TIMES (Lx) | |
|---|---|---|---|---|---|
| FIRST DETECTOR | SECOND DETECTOR | THIRD DETECTOR | FOURTH DETECTOR | WITHOUT VIBRATION | WITH VIBRATION |
| × | ○ | ○ | ○ | 32 TIMES | 64 TIMES |
| × | × | ○/× | ○ | 128 TIMES | 256 TIMES |
| ○ | × | ○ | ○ | 512 TIMES | 1024 TIMES |
| ... | ... | ... | ... | ... | ... |

SETTING VALUE ADJUSTMENT DEVICE FOR DISPLACEMENT METER

CROSS-REFERENCE TO RELATED APPLICATION

The present application is based on PCT filing PCT/JP2019/009652, filed Mar. 11, 2019, the entire contents of which are incorporated herein by reference.

TECHNICAL FIELD

The present disclosure relates to a setpoint adjustment apparatus for a displacement meter.

BACKGROUND ART

Optical displacement meters have been known that emit light from a light source to a measurement target and receive the light reflected from the measurement target by a light receiver, and thereby determine a measurement value indicating a displacement of the measurement target.

Patent Literature 1 discloses an optical displacement meter in which high measurement accuracy is maintained by selecting an appropriate measurement algorithm depending on the type of a measurement target or the like, while reducing the burden of determination and operation on a user as much as possible. Specifically, the optical displacement meter acquires a received light waveform using an image sensor for receiving the light reflected from the measurement target, and selects and uses one measurement algorithm suitable for the light reflectance of the measurement target from three measurement algorithms, on the basis of the width of a peak of the received light waveform.

CITATION LIST

Patent Literature

Patent Literature 1: Unexamined Japanese Patent Application Publication No. 2006-38571

SUMMARY OF INVENTION

Technical Problem

The optical displacement meter disclosed in Patent Literature 1 automatically switches a method of calculating the position of the peak point or the center of gravity depending on a feature amount extracted from the received light waveform, and selects an appropriate measurement algorithm depending on the type of a measurement target or the like. Unfortunately, the selection of the measurement algorithm alone cannot achieve automatic adjustment of applying setpoints defining measurement conditions in parallel to measurement of a reference workpiece serving as a standard of the measurement target.

In an exemplary case of actual inspection of a measurement target at an optical displacement meter, a user is required to manually set applying setpoints to be used in the optical displacement meter among setpoints related to measurement conditions in preliminarily adjustment for accurate measurement of the measurement target. In this process of manual setting, for example, the user confirms whether a displacement of the measurement target acquired in actual measurement of a reference workpiece serving as a standard of a measurement target is equal to a known reference displacement of the reference workpiece, and manually adjusts the applying setpoints defining measurement conditions, in parallel to measurement of the reference workpiece. The user is required to adjust the applying setpoints for proper measurement of the reference workpiece in this process. Unfortunately, a user unfamiliar to this process cannot readily achieve appropriate setting because the applying setpoints to be set belong to various types of attributes, such as amount of emitted light, measurement mode, filter type, calculation times of moving average, sampling period, cut-off frequency, and refractive index. The user cannot readily determine what adjustment of the applying setpoints leads to appropriate measurement. The user is thus required to manually adjust the applying setpoints while checking out the measurement value from the reference workpiece, resulting in a large burden on the user to adjust the applying setpoints.

An objective of the disclosure, which has been accomplished to solve the above problems, is to provide a setpoint adjustment apparatus for a displacement meter that can reduce the burden of determination and operation on a user during preliminary adjustment of the applying setpoints in parallel to measurement of the reference workpiece.

Solution to Problem

A setpoint adjustment apparatus for a displacement meter according to a first aspect of the disclosure includes i) an acquirer to acquire a measurement value indicating a displacement of a reference workpiece on the basis of a reception light signal received from a displacement meter, which includes a light source to emit light to the reference workpiece serving as a standard of a measurement target and a light receiver to receive reflected light from the reference workpiece and output the reception light signal, ii) a storage including a storage area for storing an applying setpoint to be used in measurement of the reference workpiece, and configured to store setpoints defining measurement conditions for measurement of the reference workpiece and store a desired measurement value to be compared with the measurement value, iii) a determiner to determine whether the measurement value acquired by the acquirer in measurement of the reference workpiece using the applying setpoint is within the range of the desired measurement value, and iv) a changer to change the applying setpoint. When the measurement value is determined to be within the range of the desired measurement value, the applying setpoint used in acquisition of the measurement value is employed as the applying setpoint to be used in inspection of a measurement target. When the measurement value is determined to be out of the range of the desired measurement value, the changer changes the applying setpoint from the applying setpoint used in acquisition of the measurement value to a different applying setpoint, the acquirer measures the reference workpiece using the changed applying setpoint and acquires a measurement value, and the determiner determines whether the measurement value acquired using the changed applying setpoint is within the range of the desired measurement value.

A setpoint adjustment apparatus for a displacement meter according to a second aspect of the disclosure includes i) a storage to store setpoints defining measurement conditions for measurement of a reference workpiece serving as a standard of a measurement target, and containing an initial setpoint, and store a desired measurement value for evaluation of a result of measurement, ii) a setter to set the initial setpoint as an applying setpoint to be used in measurement of the measurement target, iii) an acquirer to acquire a measurement value indicating a displacement of the reference workpiece using the initial setpoint, iv) a determiner to determine whether the measurement value acquired by the acquirer using the initial setpoint is within the range of the desired measurement value, and v) a changer to change the applying setpoint to another setpoint different from the initial setpoint. When the measurement value is determined to be within the range of the desired measurement value, the initial setpoint set by the setter is employed as the applying setpoint. When the measurement value is determined to be out of the range of the desired measurement value, the changer changes the applying setpoint to another setpoint different from the initial setpoint.

A setpoint adjustment apparatus for a displacement meter according to a third aspect of the disclosure includes, i) an acquirer to acquire a measurement value indicating a displacement of a reference workpiece on the basis of a reception light signal received from a displacement meter, which includes a light source to emit light to the reference workpiece serving as a standard of a measurement target and a light receiver to receive reflected light from the reference workpiece and output the reception light signal, ii) a storage including a storage area for storing an applying setpoint to be used in measurement of the reference workpiece, and configured to store setpoints defining measurement conditions for measurement of the reference workpiece and store a desired measurement value to be compared with the measurement value, iii) a state observer to observe the measurement value and the applying setpoint used in measurement of the reference workpiece as state variables, and iv) a learner to learn the applying setpoint in accordance with a training data set generated on the basis of the state variables.

Advantageous Effects of Invention

During preliminary adjustment of the applying setpoint in parallel to measurement of the reference workpiece in the setpoint adjustment apparatus for a displacement meter according to the first aspect of the disclosure, when the measurement value is within the range of the desired measurement value, the applying setpoint used in acquisition of the measurement value is employed as the applying setpoint to be used in inspection of a measurement target. When the measurement value is out of the range of the desired measurement value, the changer changes the applying setpoint, the acquirer acquires a measurement value using the changed applying setpoint, and the determiner re-determines whether the measurement value acquired using the changed applying setpoint is within the range of the desired measurement value. This configuration can adjust the applying setpoint while reducing the burden of determination and operation on a user during preliminary adjustment of the applying setpoint in parallel to measurement of the reference workpiece.

During preliminary adjustment of the applying setpoint in parallel to measurement of the reference workpiece in the setpoint adjustment apparatus for a displacement meter according to the second aspect of the disclosure, when the measurement value based on the initial setpoint is within the range of the desired measurement value, the initial setpoint is employed as the applying setpoint to be used in inspection of a measurement target. When the measurement value is out of the range of the desired measurement value, the changer changes the applying setpoint to another setpoint different from the initial setpoint. This configuration can adjust the applying setpoint while reducing the burden of determination and operation on a user during preliminary adjustment of the applying setpoint in parallel to measurement of the reference workpiece.

During preliminary adjustment of the applying setpoint in parallel to measurement of the reference workpiece in the setpoint adjustment apparatus for a displacement meter according to the third aspect of the disclosure, the learner learns the applying setpoint in accordance with a training data set generated on basis of the state variables, which include the measurement value acquired by the state observer and the applying setpoint used in measurement of the reference workpiece. This configuration can learn and adjust the applying setpoint while reducing the burden of determination and operation on a user.

BRIEF DESCRIPTION OF DRAWINGS

FIG. 5 illustrates exemplary setpoints in the displacement meter in Embodiment 1 of the disclosure;

FIG. 6 illustrates the order of adjustment of applying setpoints in the displacement meter in Embodiment 1 of the disclosure;

FIG. 21 illustrates types of a measurement recipe, which is one of the setpoints in a displacement meter in Embodiment 6 of the disclosure;

FIG. 33 illustrates a measurement recipe adjustment table referenced in the measurement recipe adjustment process executed in the PC in Embodiment 10 of the disclosure;

FIG. 35 illustrates a second filter adjustment table referenced in the second filter adjustment process executed in the PC in Embodiment 11 of the disclosure;

FIG. 37 illustrates a second filter adjustment table referenced in the second filter adjustment process executed in the PC in Embodiment 12 of the disclosure;

FIG. 40 illustrates a second filter adjustment table referenced in the second filter adjustment process executed in the PC in Embodiment 13 of the disclosure;

DESCRIPTION OF EMBODIMENTS

Embodiment 1

A setpoint adjustment system for a displacement meter 10 according to Embodiment 1 will now be described with reference to FIGS. 1 to 16.

Figure 1:
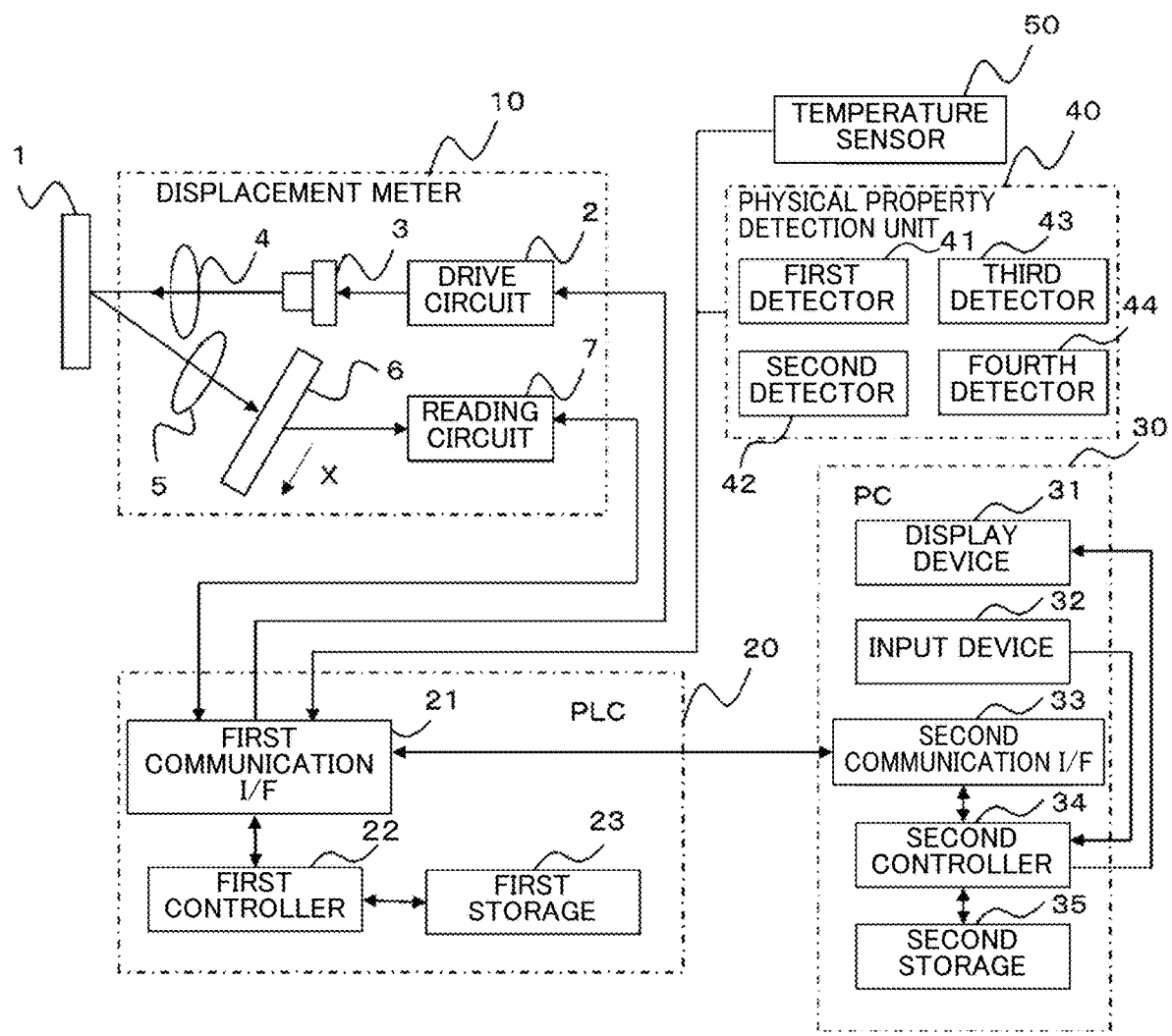
FIG. 1 illustrates an entire configuration of a setpoint adjustment system for a displacement meter according to Embodiment 1 of the disclosure.

The setpoint adjustment system for the displacement meter 10 according to Embodiment 1 of the disclosure constitutes equipment related to factory automation (FA). As illustrated in FIG. 1, the setpoint adjustment system for the displacement meter 10 is equipped with the displacement meter 10, such as a laser displacement sensor, a programmable logic controller (PLC) 20 serving as a control device, and a personal computer (PC) 30 serving as a setpoint adjustment apparatus. The displacement meter 10 is an optical displacement meter for measuring a distance to a measurement target 1 or a measurement value indicating a displacement of the measurement target 1 by applying the triangulation principle.

The displacement meter 10 includes a drive circuit 2, a laser diode 3 serving as a light source, a light emitting lens 4, a light receiving lens 5, a one-dimensional image sensor 6 serving as a light receiver, and a reading circuit 7.

The drive circuit 2 drives the laser diode 3. The laser diode 3 emits a laser beam to the measurement target 1 through the light emitting lens 4. The one-dimensional image sensor 6 has multiple light receiving elements arranged in a row and corresponding to the respective pixels. The reflected light from the measurement target 1 is incident to the light receiving elements through the light receiving lens 5, so that electric charges are accumulated in the light receiving elements. Examples of the one-dimensional image sensor 6 include a charge-coupled device (CCD) line sensor and a complementary metal oxide semiconductor (CMOS) line sensor. The reading circuit 7 reads reception light signals that depend on the amounts of light received at the light receiving elements corresponding to the respective pixels of the image sensor 6 and the positions of the light receiving elements that have received the light.

In the image sensor 6, electric charges are accumulated in the individual light receiving elements constituting the light-receiving surface of the image sensor 6, in accordance with a relative displacement of the measurement target 1 and the amounts of received light. The reading circuit 7 then reads the electric charges from the individual light receiving elements in the scanning direction X, in the form of reception light signals indicating the amounts of light received at the individual light receiving elements from the light receiving element at one end to the light receiving element at the other end in the image sensor 6.

Figure 2:
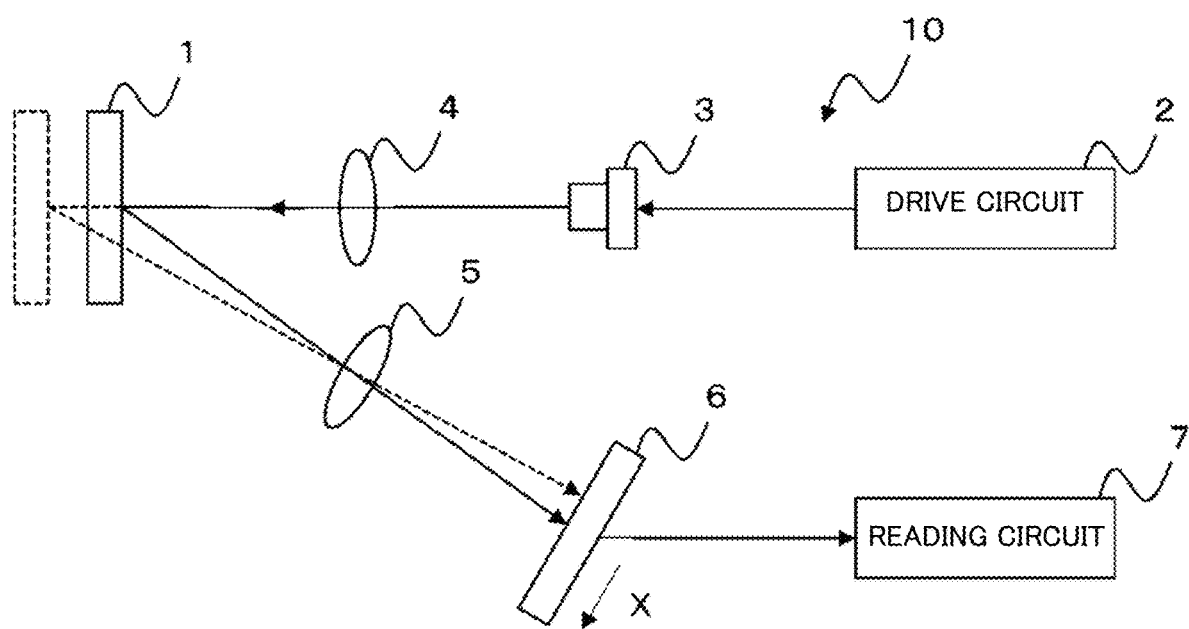
FIG. 2 illustrates a measurement principle of a displacement meter in Embodiment 1 of the disclosure.

As illustrated in FIG. 2, when the measurement target 1 is displaced relative to the displacement meter 10 from the position represented by the solid line to the position represented by the dashed line, the reflecting surface of the measurement target 1 is also displaced. Such a displacement of the reflecting surface of the measurement target 1 causes variations in the positions of the pixels corresponding to the respective light receiving elements in the image sensor 6 that receive the reflected light from the measurement target 1, so that electric charges corresponding to the amounts of received light in the respective pixels are accumulated and read in the form of reception light signals.

Figure 3:
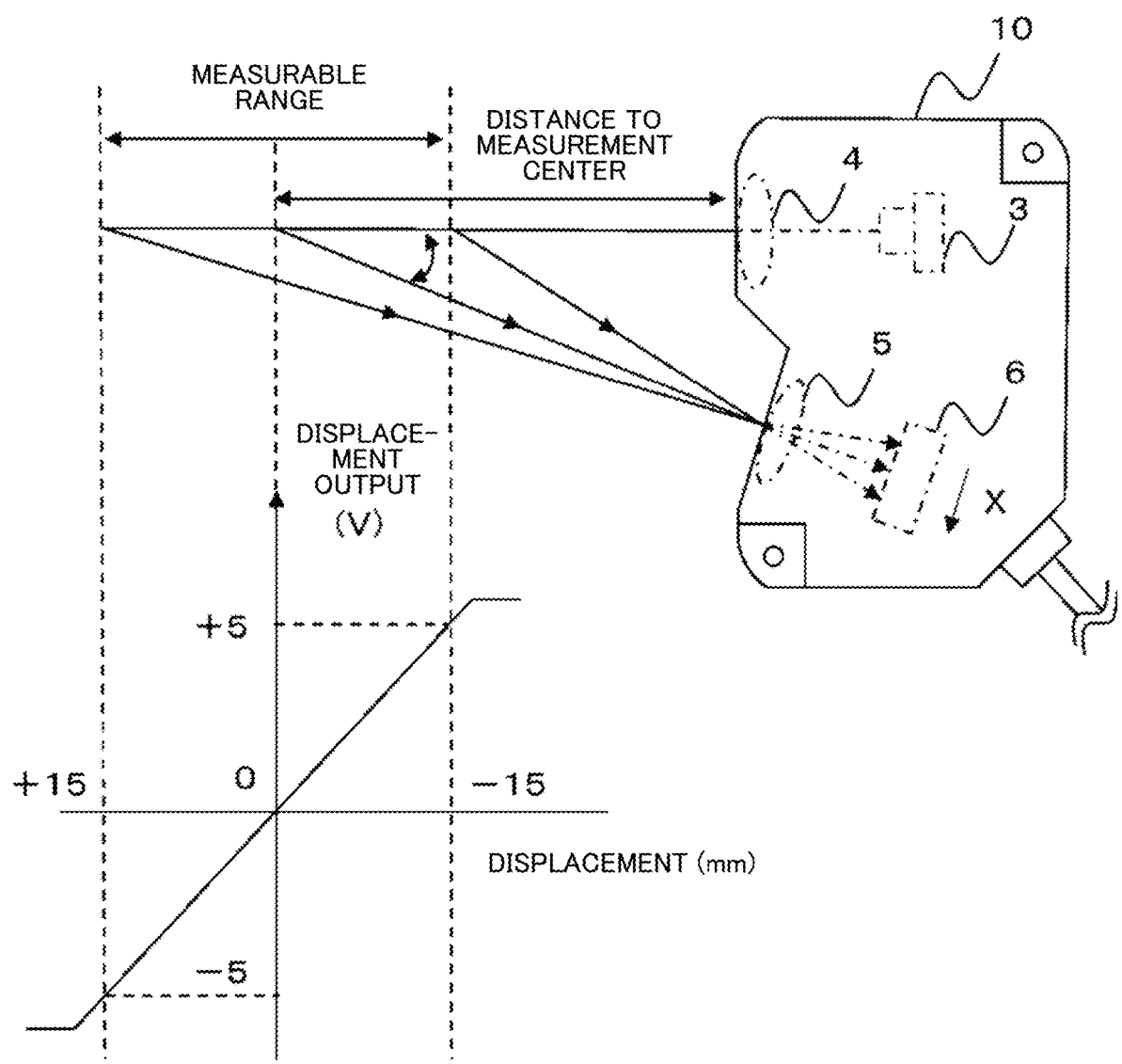
FIG. 3 illustrates a measurable range and displacement outputs of the displacement meter in Embodiment 1 of the disclosure.

For more specific description, the relationship between the measurable range and displacement outputs of the displacement meter 10 will now be described with reference to FIG. 3. In general, the displacement meter 10 originally has a distance to the measurement center. The distance to the measurement center is an absolute distance defined by arrangement of the laser diode 3 and the light emitting lens 4, which are optical components included in the displacement meter 10, and used as a measurement reference in the displacement meter 10. Specifically, the distance to the measurement center indicates a distance that provides the minimum spot diameter of the laser beam emitted from the light emitting lens 4 of the displacement meter 10, that is, the focal length of the light emitting lens 4. The measurable range of the displacement meter 10 having the distance to the measurement center as the median is also preliminarily defined by arrangement of the laser diode 3, the light emitting lens 4, the light receiving lens 5, and the image sensor 6, which are optical components included in the displacement meter 10. The distance to the measurement center and the measurable range are thus defined by arrangement of optical components, because the distance to the measurement center and the measurable range cannot be adjusted in general due to the fixed arrangement of the laser diode 3, the light emitting lens 4, the light receiving lens 5, and the image sensor 6 inside the displacement meter 10. In the case where the measurement center coincides with the intersection point between the light emitting axis of the light emitting lens 4 and the light receiving axis of the light receiving lens 5, the angle between the light emitting axis and the light receiving axis is also constant.

When the reflecting surface of the measurement target 1 is located at the measurement center, the reflected light is incident to light receiving elements disposed in the vicinity of the center between one and the other ends of the light-receiving surface of the image sensor 6 in the scanning direction X. In this case, the reading circuit 7 outputs a voltage of 0 V as a displacement output. This result means that the position of the reflecting surface of the measurement target 1 coincides with the measurement center, that is, the displacement from the measurement center is 0 mm. When the reflecting surface of the measurement target 1 has a distance from the displacement meter 10 longer than the distance to the measurement center, the reflected light is incident to light receiving elements one side including one end of the light-receiving surface of the image sensor 6 in the scanning direction X. In an exemplary case where the reflecting surface of the measurement target 1 is located at the lower limit of the measurable range, the reading circuit 7 outputs a voltage of −5 V as a displacement output. This result means that the displacement of the reflecting surface of the measurement target 1 from the measurement center is −15 mm. When the reflecting surface of the measurement target 1 has a distance from the displacement meter 10 shorter than the distance to the measurement center, the reflected light is incident to light receiving elements the other side including the other end of the light-receiving surface of the image sensor 6 in the scanning direction X. In an exemplary case where the reflecting surface of the measurement target 1 is located at the upper limit of the measurable range, the reading circuit 7 outputs a voltage of +5 V as a displacement output. This result means that the displacement of the reflecting surface of the measurement target 1 from the measurement center is +15 mm. Within the measurable range, in accordance with an increase in the voltage value corresponding to a displacement output, the displacement linearly increases. The above-mentioned voltage values and displacements are mere examples and should not be construed as limiting the disclosure.

As illustrated in FIG. 1, the PLC 20 includes a first communication interface (I/F) 21, a first controller 22, and a first storage 23. The first communication I/F 21 receives signals from external devices connected to the PLC 20 and transmits signals from the PLC 20 to the external devices connected to the PLC 20. The first communication I/F 21 includes an analog-to-digital (A/D) conversion circuit for converting received analog signals into digital signals, and includes a digital-to-analog (D/A) conversion circuit for converting digital signals into analog signals to be transmitted to the external devices when the first communication I/F 21 is configured to transmit analog signals to the external devices. The first communication I/F 21 transmits or receives signals not via the A/D conversion circuit or the D/A conversion circuit when the PLC 20 and the external devices are configured to transmit or receive digital signals. The first controller 22 and the first storage 23 will be described detail below. It should be noted that a physical property detection unit 40 and a temperature sensor 50 connectable to the PLC 20 are used in Embodiment 2 or following embodiments and therefore not described in Embodiment 1.

The PC 30 serving as the setpoint adjustment apparatus for the displacement meter 10 includes a display device 31, an input device 32, a second communication I/F 33, a second controller 34, and a second storage 35. The display device 31 displays a window for displaying measurement values acquired at the displacement meter 10, for example. The display device 31 is a liquid crystal display device, although this configuration is a mere example. The input device 32 is, for example, a mouse and keyboard for receiving an input caused by an operation of a user, although this configuration is a mere example. The second communication I/F 33 is connected to the first communication I/F 21 of the PLC 20, such that the PLC 20 and the PC 30 transmit or receive signals to or from each other. The second controller 34 and the second storage 35 will be described in detail below.

Figure 4:
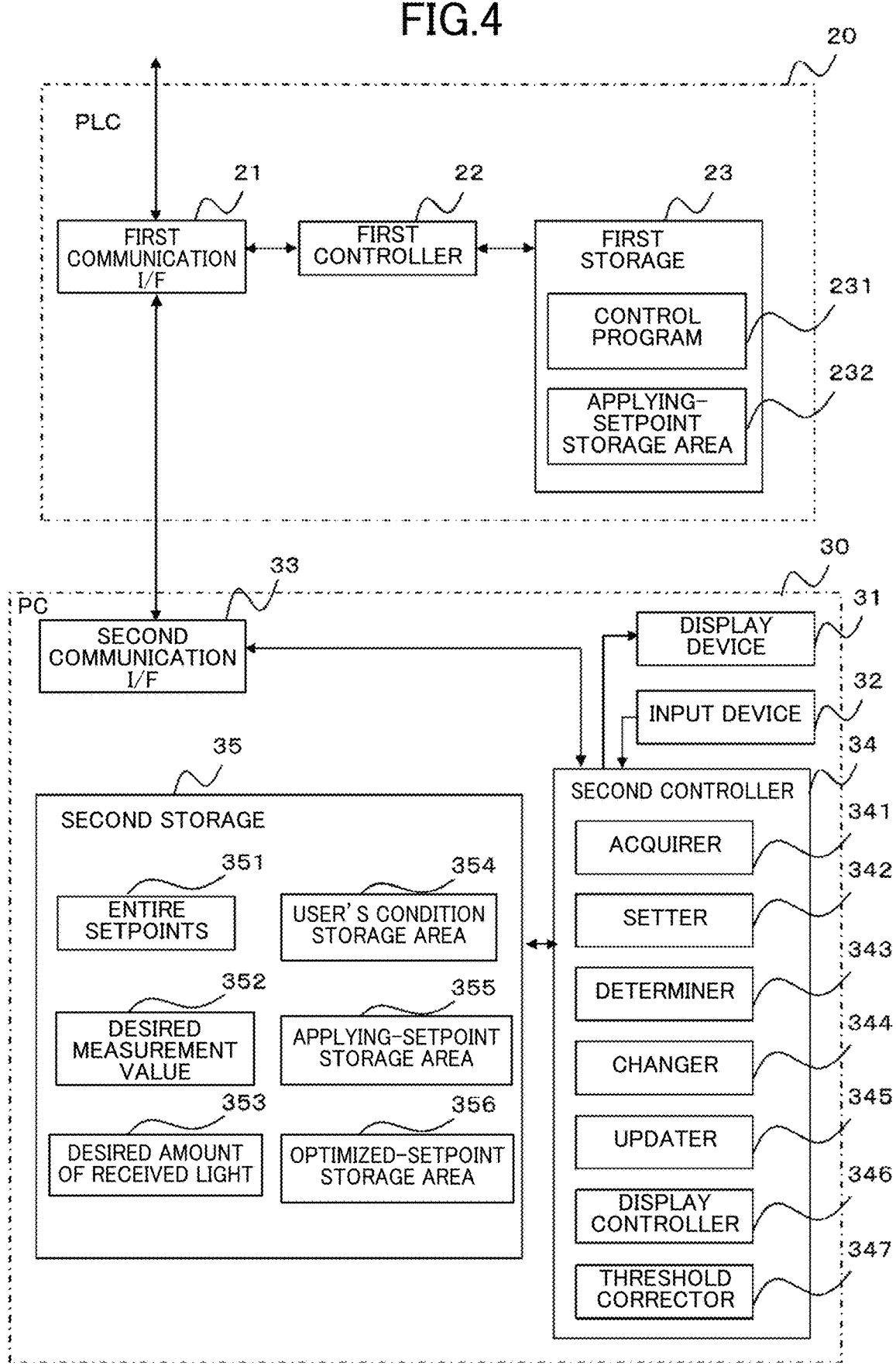
FIG. 4 illustrates functional blocks of a PLC and a PC included in the setpoint adjustment system for a displacement meter according to Embodiment 1 of the disclosure.

The functional blocks representing detailed configurations of the PLC 20 and the PC 30 included in the setpoint adjustment system for the displacement meter 10 according to Embodiment 1 will now be described with reference to FIG. 4.

The first storage 23 of the PLC 20 stores a control program 231 and has an applying-setpoint storage area 232 for storing various applying setpoints Yy, which are setpoints to be used in measurement of the measurement target 1. The control program 231 is generated by a user using an engineering tool installed in the PC 30, and is intended to control the displacement meter 10, which is a device to be controlled, connected to the PLC 20. In Embodiment 1, the first storage 23 includes a non-volatile storage device, such as flash memory, solid state drive (SSD), or hard disk drive (HDD) and a volatile storage device, such as random access memory (RAM), serving as a work area. The first storage 23, however, should not necessarily include a flash memory, SSD, or HDD, and a RAM. The non-volatile storage device of the first storage 23 may also be an external storage device connectable to the PLC 20.

The first controller 22 reads the control program 231 stored in the first storage 23. In accordance with the read control program 231, the first controller 22 processes signals received via the first communication I/F 21 from the external devices, such as the displacement meter 10 and the PC 30, then outputs the measurement value and the amount of received light, which are based on the reception light signals from the displacement meter 10, via the first communication I/F 21 to the PC 30. The first controller 22 also stores applying setpoints Yy received from the PC 30 into the applying-setpoint storage area 232 of the first storage 23. The first controller 22 reads the applying setpoints Yy from the applying-setpoint storage area 232 of the first storage 23, and executes the control program 231 in accordance with the applying setpoints Yy stored in the applying-setpoint storage area 232, thereby controlling the displacement meter 10. The functions of the first controller 22 are achieved by the processor.

The second storage 35 of the PC 30 stores entire setpoints 351, which are multiple setpoints categorized by individual attributes and define measurement conditions in measurement of the measurement target 1 at the displacement meter 10, and a desired measurement value 352 set by the user. The second storage 35 has a user's condition storage area 354 for storing user's conditions input by an operation of the user through the input device 32, an applying-setpoint storage area 355 for storing applying setpoints Yy to be used in measurement of the measurement target 1, and an optimized-setpoint storage area 356 for storing optimized setpoints X_opt, which are optimized setpoints Xx and likely to provide proper measurement values. In Embodiment 1, the second storage 35 includes a flash memory, SSD, or HDD, and a RAM serving as a work area. The second storage 35, however, should not necessarily include a flash memory, SSD, or HDD, and a RAM. It should be noted that a desired amount 353 of received light is used in Embodiment 2 or following embodiments and therefore not described in Embodiment 1.

The second controller 34 includes an acquirer 341, a setter 342, a determiner 343, a changer 344, an updater 345, a display controller 346, and a threshold corrector 347. The functions of the acquirer 341, the setter 342, the determiner 343, the changer 344, the updater 345, the display controller 346, and the threshold corrector 347 of the second controller 34 are achieved by the processor. It should be noted that the threshold corrector 347 is used in Embodiment 2 or following embodiments and therefore not described in Embodiment 1.

The acquirer 341 acquires the measurement value (and the amount of received light) acquired at the displacement meter 10 from the PLC 20 via the second communication I/F 33, and acquires an input caused by an operation of the user through the input device 32. The setter 342 reads a single setpoint Xx for each attribute from the entire setpoints 351 in the second storage 35 and stores the setpoints Xx into the applying-setpoint storage area 355, thereby employing the setpoints Xx as the applying setpoints Yy to be used in measurement of the measurement target 1. The determiner 343 determines whether the measurement value acquired by the acquirer 341 in measurement of the measurement target 1 using the applying setpoints Yy employed by the setter 342 is within the range of the desired measurement value 352.

The changer 344 changes an applying setpoint Yy to be used in measurement of a reference workpiece of the measurement target 1 from the previous applying setpoint Yy. Specifically, the changer 344 reads a setpoint Xx+1 different from the setpoint Xx corresponding to the previous applying setpoint Yy from the entire setpoints 351 in the second storage 35, and stores the currently-read setpoint Xx+1 into the applying-setpoint storage area 355 as a new applying setpoint Yy. The changer 344 then transmits the new applying setpoint Yy stored in the applying-setpoint storage area 355 to the PLC 20, and the first controller 22 of the PLC 20 stores the new applying setpoint Yy into the applying-setpoint storage area 232 of the first storage 23.

The updater 345 causes the applying setpoint Yy used in acquisition of either one of the measurement values closer to the desired measurement value 352, that is, either one of the measurement value (first measurement value) acquired using the previous applying setpoint Yy (first applying setpoint) before being changed by the changer 344 and the measurement value (second measurement value) acquired using the new applying setpoint Yy (second applying setpoint) after being changed by the changer 344, to be retained as the applying setpoint Yy to be used in measurement of the measurement target 1. Specifically, the updater 345 causes the one of the previous applying setpoint Yy and the new applying setpoint Yy stored in the applying-setpoint storage area 355, which is used in acquisition of a measurement value closer to the desired measurement value 352, to be retained in the optimized-setpoint storage area 356. The updater 345 then transmits an instruction to the first controller 22 of the PLC 20 and thereby causes the applying setpoint Yy retained in the optimized-setpoint storage area 356, among the previous applying setpoint Yy and the new applying setpoint Yy stored in the applying-setpoint storage area 232 of the first storage 23, to be retained as the applying setpoint Yy.

The display controller 346 causes the display device 31 to display a window for displaying measurement values acquired at the displacement meter 10, for example, on the basis of the measurement value acquired by the acquirer 341 or the input caused by an operation of the user through the input device 32.

The entire setpoints 351 stored in the second storage 35 of the PC 30 will now be described with reference to FIG. 5. As illustrated in FIG. 5, the setpoints Xx are categorized by attributes, such as amount of emitted light, measurement mode, filter type, calculation times of moving average, sampling period, cut-off frequency, refractive index, and measurement recipe. Each attribute has multiple setpoints Xx. The setpoints for individual attributes may be hereinafter collectively referred to as "setpoints Xx". In some context, the upper-case letter X is replaced with a letter associated with each attribute for discriminating the setpoints Xx for individual attributes. For example, Ix indicates the setpoint for light emission, Jx indicates the setpoint for measurement mode, Kx indicates the setpoint for filter type, Lx indicates the setpoint for moving-average calculation times, Mx indicates the setpoint for sampling period, Nx indicates the setpoint for cut-off frequency, Ox indicates the setpoint for refractive index, and Px indicates the setpoint for measurement recipe. The initial value of the setpoint for each attribute is provided with the number 1. That is, the lower-case letters x of the setpoints are provided with serial numbers starting from 1. For example, among the setpoints Kx for filter type, the initial setpoint for moving-average calculation times is called K1, the setpoint for low-pass filter is called K2, and the setpoint for high-pass filter is called K3 in some context below. The same holds true for the setpoints Ix, Jx, Lx, Mx, Nx, Ox, and Px for the attributes other than filter type. The measurement recipe is used in Embodiment 2 or following embodiments and therefore not described in Embodiment 1. The applying setpoint Yy indicates a single setpoint Xx for each attribute selected from the entire setpoints 351. The applying setpoints Yy are stored into the applying-setpoint storage area 355 and the optimized-setpoint storage area 356 of the PC 20 during preliminary adjustment and finally stored into the applying-setpoint storage area 232 of the PLC 20, and thereby being used in measurement of the measurement target 1 by the displacement meter 10. It should be noted that the setpoints Px for measurement recipe are not stored in the applying-setpoint storage area 232 of the PLC 20, which will be described in detail in Embodiment 2 or following embodiments.

The setpoints Ix for light emission are related to amounts of laser beam emitted from the laser diode 3. The setpoints Ix include multiple setpoints I1, I2, I3 . . . indicating values between 0.01% and 100%. 0.01% is the lower-limit setpoint for light emission, and 100% is the upper-limit setpoint for light emission.

The setpoints Jx for measurement mode are related to measurement algorithms for accurately determining the peak point of the received light waveform, which represents the amounts of light received in the light receiving elements corresponding to the respective pixels in the form of a wave, on the basis of the reception light signals from the image sensor 6. The setpoints Jx for measurement mode include appropriate setpoints J1, J2, J3 . . . prepared in advance for the respective types of the measurement target 1 depending on the surface physical properties of the measurement target 1. Exemplary modes indicated by the setpoints Jx for measurement mode include a diffuse reflection mode involving a measurement algorithm suitable for a measurement target 1 having normal surface physical properties, a regular reflection mode involving a measurement algorithm suitable for a mirror-finished or transparent measurement target 1, a metal mode involving a measurement algorithm suitable for a metal measurement target 1, a translucent object mode involving a measurement algorithm suitable for a translucent measurement target 1, a glass mode involving a measurement algorithm suitable for a transparent, in particular, glass measurement target 1, and a patterned glass mode involving a measurement algorithm suitable for a patterned-glass measurement target 1 made of glass in which metal wires are embedded. Although any of these measurement algorithms is applicable, a typical example is the known algorism for varying the calculation line of the center of gravity depending on the measurement target 1, as disclosed in Unexamined Japanese Patent Application Publication No. 2006-38571, for example.

The setpoints Kx for filter type include setpoints K1, K2, K3 . . . related to filter types for filtering a measurement value. Exemplary setpoints Kx for filter type include a setpoint K1 for moving average filter indicating filtering of a measurement value by the moving average method, a setpoint K2 for low-pass filter indicating diminishing of components of frequencies higher than the cut-off frequency in the received light waveform, and a setpoint K3 for high-pass filter indicating diminishing of components of frequencies lower than the cut-off frequency in the received light waveform. The filter types indicated by the setpoints Kx include both of the low-pass and high-pass filters, which are the filter types related to the cut-off frequency, in this configuration, but may include at least one of the low-pass and high-pass filters.

The setpoints Lx for moving-average calculation times are additional setpoints defined when the setpoint K1 for moving average filter is selected from the setpoints Lx for filter type, and include multiple setpoints L1, L2, L3 . . . indicating calculation times of moving average between 1 and 65,536 times.

The setpoints Mx for sampling period are related to periods of reading, at the reading circuit 7, reception light signals indicating the amounts of lights received in the light receiving elements corresponding to the respective pixels of the image sensor 6. The setpoints Mx include multiple setpoints M1, M2, M3 . . . indicating periods between 10 μs to 2 ms, for example. The sampling period is also deemed as an exposure time because the time of incidence of reflected light to the light receiving elements corresponding to the respective pixels increases in accordance with an increase in the sampling period.

The setpoints Nx for cut-off frequency are additional setpoints defined when the setpoint Kx for low-pass or high-pass filter is selected from the setpoints Kx for filter type. The setpoints Nx include multiple setpoints N1, N2, N3 . . . indicating cut-off frequencies between 1 Hz and 2000 Hz.

The setpoints Ox for refractive index are additional setpoints defined when the value to be measured is the thickness of a transparent object. The setpoints Ox include multiple setpoints O1, O2, O3 . . . indicating refractive indexes between 0.5000 and 2.0000.

The actual inspection on the basis of measurement of the measurement target 1 requires preliminary adjustment of the applying setpoints using a reference workpiece in advance. This preliminary adjustment will now be explained with reference to FIGS. 6 to 19. The reference workpiece is a conforming product of the measurement target 1, which is an inspection target.

Figure 7:
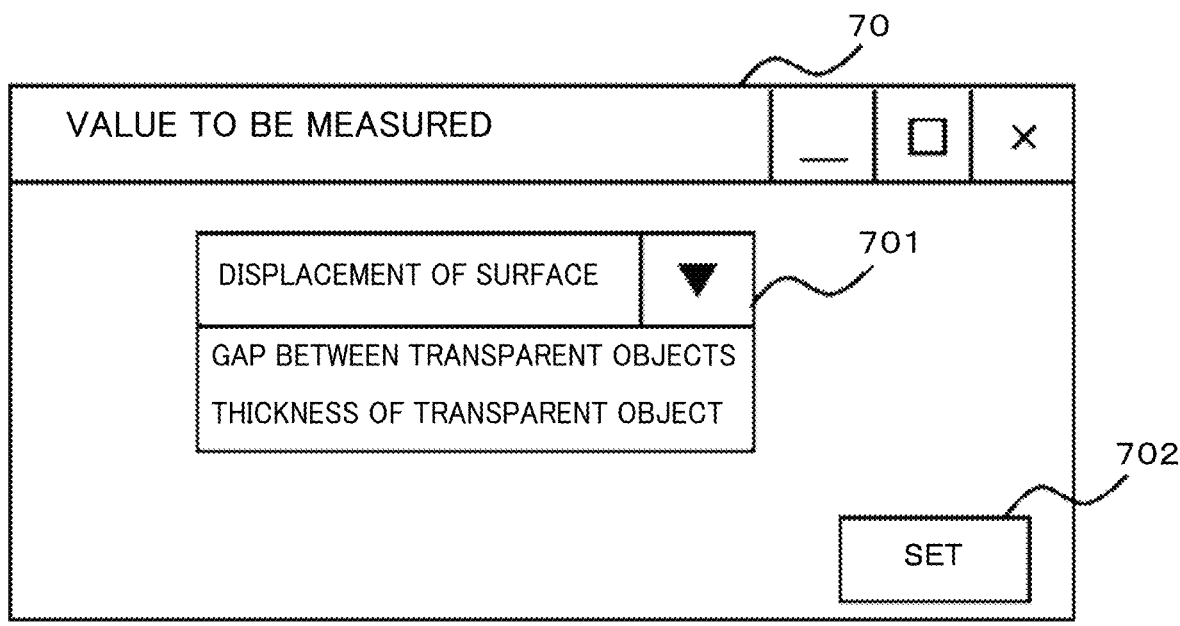
FIG. 7 illustrates a window for selecting a value to be measured in the displacement meter in Embodiment 1 of the disclosure.

As illustrated in the adjustment process in FIG. 6, a value to be measured from the measurement target 1 is selected in response to an operation of the user through the input device 32 in Step S1. Specifically, in a window 70 for selecting a value to be measured displayed on the display device 31 of the PC 30, which is illustrated in FIG. 7, an operation of the user through the input device 32 selects a value to be measured from a field 701 for selecting a value to be measured. Then, in response to an operation at a set button 702, the acquirer 341 acquires the value to be measured selected by the operation of the user. The acquirer 341 then stores the selected value to be measured into the user's condition storage area 354 of the second storage 35. The process then goes to Step S2. It should be noted that the displacement of the surface of the measurement target 1 is selected as the value to be measured in the example illustrated in FIG. 7.

Figure 8:
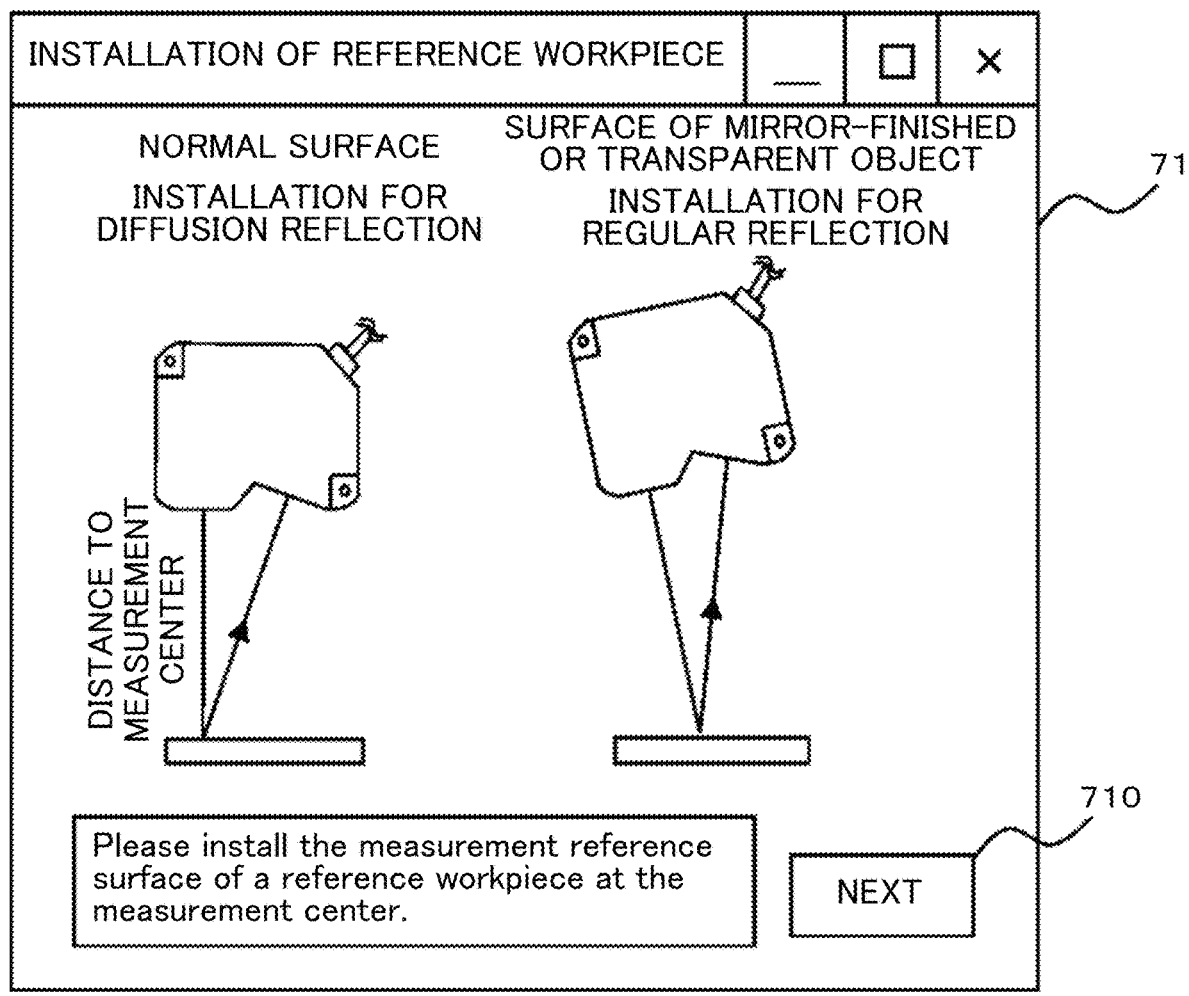
FIG. 8 illustrates a window for requesting installation of a reference workpiece in Embodiment 1 of the disclosure.

In Step S2, the display controller 346 causes the display device 31 to display a window 71 for requesting installation of a reference workpiece, as illustrated in FIG. 8. In accordance with the content of the displayed window 71 for requesting installation of a reference workpiece, the user performs installation for achieving diffusion reflection that causes light to be diffusively reflected on the surface of the measurement target 1 unless the reference workpiece is a mirror-finished or transparent object. The installation for achieving diffusion reflection indicates to install the reference workpiece and the displacement meter 10 such that the light emitting axis of the displacement meter 10 and the surface of the measurement target 1 define an angle of 90° and the surface of the reference workpiece is disposed at the measurement center. In the case where the reference workpiece is a mirror-finished or transparent object, the user performs installation for achieving regular reflection that causes light to be regularly reflected on the surface of the measurement target 1. The installation for achieving regular reflection indicates to install the reference workpiece and the displacement meter 10 such that the incident angle of incident light is equal to the reflection angle of reflected light when the measurement target 1 is disposed at the measurement center. After installation of the reference workpiece and the displacement meter 10 as explained above, when the acquirer 341 receives an operation of the user at a button 710 for proceeding to the next step in response to an operation of the user through the input device 32, then the process goes to Step S3.

Figure 9:
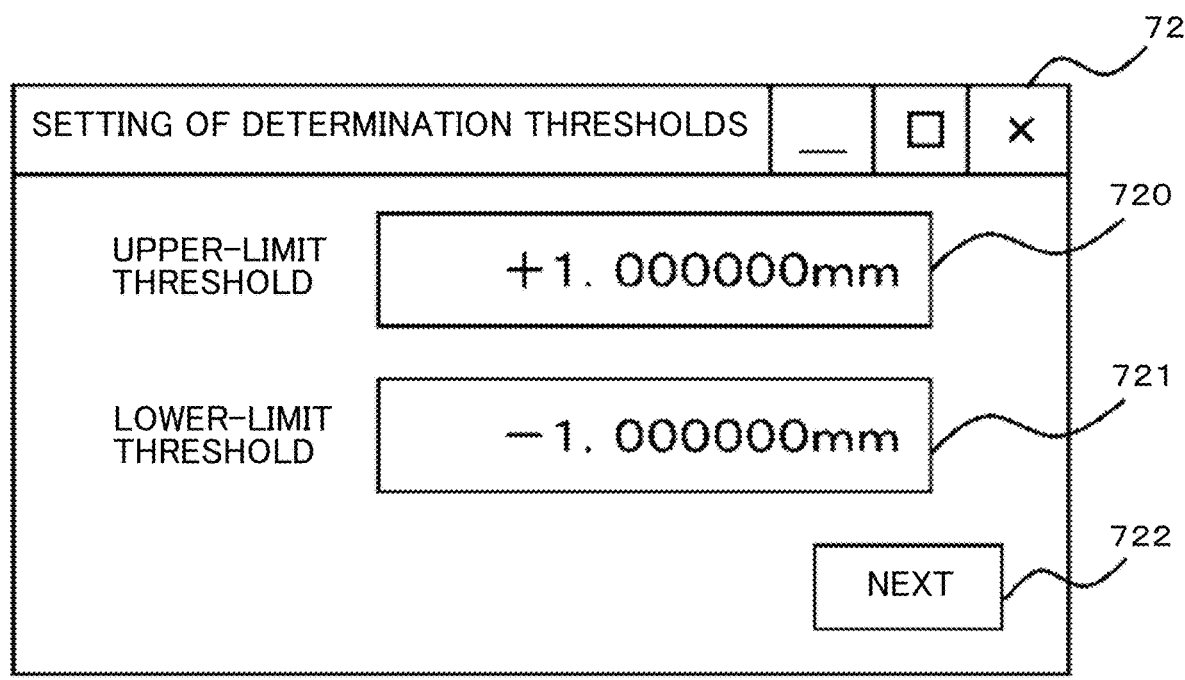
FIG. 9 illustrates a window for setting determination thresholds in Embodiment 1 of the disclosure.

In Step S3, the display controller 346 causes the display device 31 to display a window 72 for setting determination thresholds, as illustrated in FIG. 9. In the window 72 for setting determination thresholds, upper-limit and lower-limit thresholds are input to an input field 720 for upper-limit threshold and an input field 721 for lower-limit threshold, respectively, in response to an operation of the user through the input device 32. The determination thresholds are used to define a level of relative displacement of the surface of the measurement target 1 from the measurement center at which the measurement target 1 is evaluated as a nonconforming product. In the example illustrated in FIG. 9, the input upper-limit threshold is +1.000000 mm, and the input lower-limit threshold is −1.000000 mm. At the stage of inspection of the measurement target 1, the measurement target 1 is evaluated as a conforming product in the case of the measurement value within the range between the upper-limit and lower-limit thresholds, and evaluated as a nonconforming product in the case of the measurement value out of the range between the upper-limit and lower-limit thresholds. When the acquirer 341 receives an operation of the user at a button 722 for proceeding to the next step, the range of the determination thresholds is stored into the second storage 35 in the form of the desired measurement value 352. The process then goes to Step S4.

Figure 10:
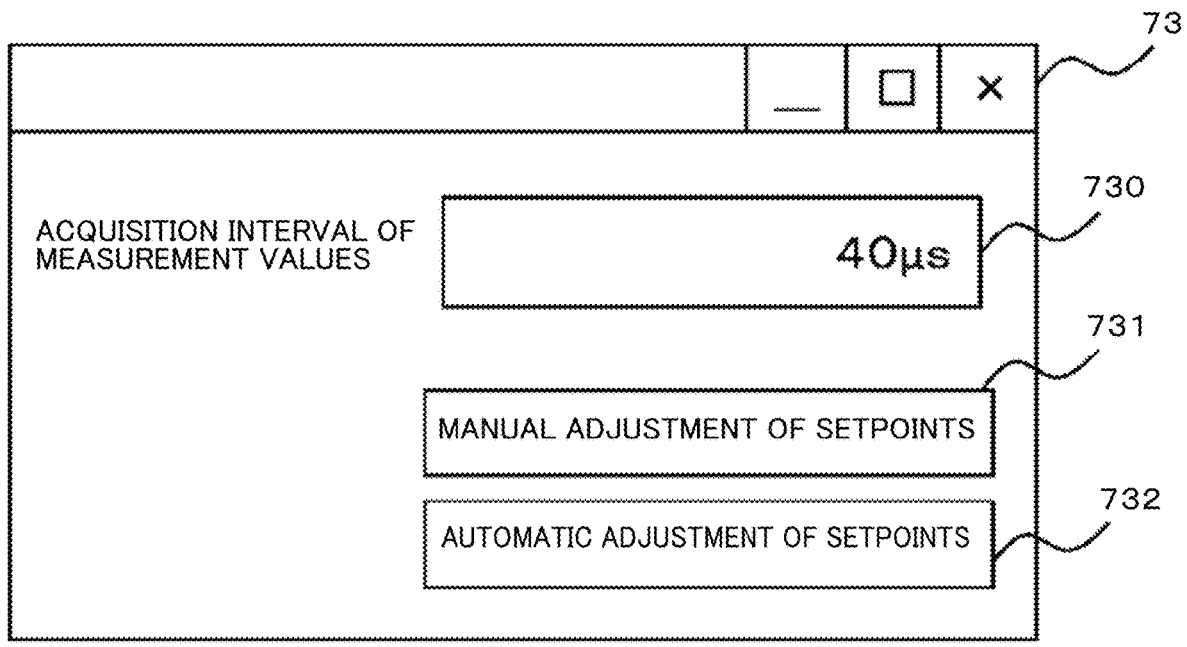
FIG. 10 illustrates a window for setting an acquisition interval of measurement values in Embodiment 1 of the disclosure.

In Step S4, the display controller 346 causes the display device 31 to display a window 73 for setting an acquisition interval of measurement values, as illustrated in FIG. 10. In the window 73 for setting an acquisition interval of measurement values, an acquisition interval of measurement values desired by the user is input and designated in an input field 730 for an acquisition interval of measurement values in response to an operation of the user through the input device 32. The acquisition interval of measurement values indicates an interval of processes in which the acquirer 341 of the PC 30 acquires a measurement value from the PLC 20. The acquisition interval of measurement values is set to 40 μs in the example illustrated in FIG. 10. In the case where the user manually sets the setpoints Xx defining measurement conditions as in existing techniques, the acquirer 341 receives an operation of the user at a button 731 for manual adjustment of the setpoints Xx. In contrast, in the case of automatic adjustment of the setpoints Xx, the acquirer 341 receives an operation of the user at a button 732 for automatic adjustment of the setpoints Xx. After reception of the operation of the user at the button 731 or 732 in the acquirer 341, the acquisition interval of measurement values input by the operation of the user is stored into the user's condition storage area 354 of the second storage 35. The process then goes to Step S5. The input field 730 for an acquisition interval of measurement values functions as a receiver for receiving an operation of the user that designates an acquisition interval of measurement values, which indicates an interval of acquisition of measurement values in the acquirer 341.

Figure 11:
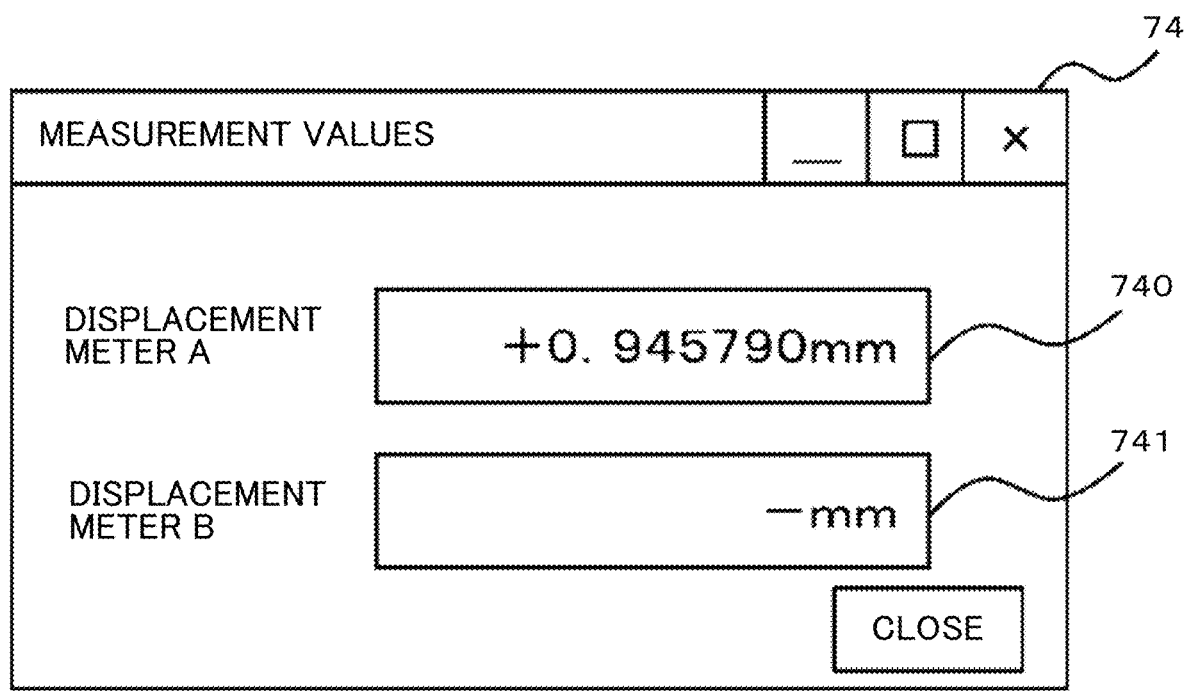
FIG. 11 illustrates a window for displaying measurement values acquired at displacement meters in Embodiment 1 of the disclosure.
Figure 12:
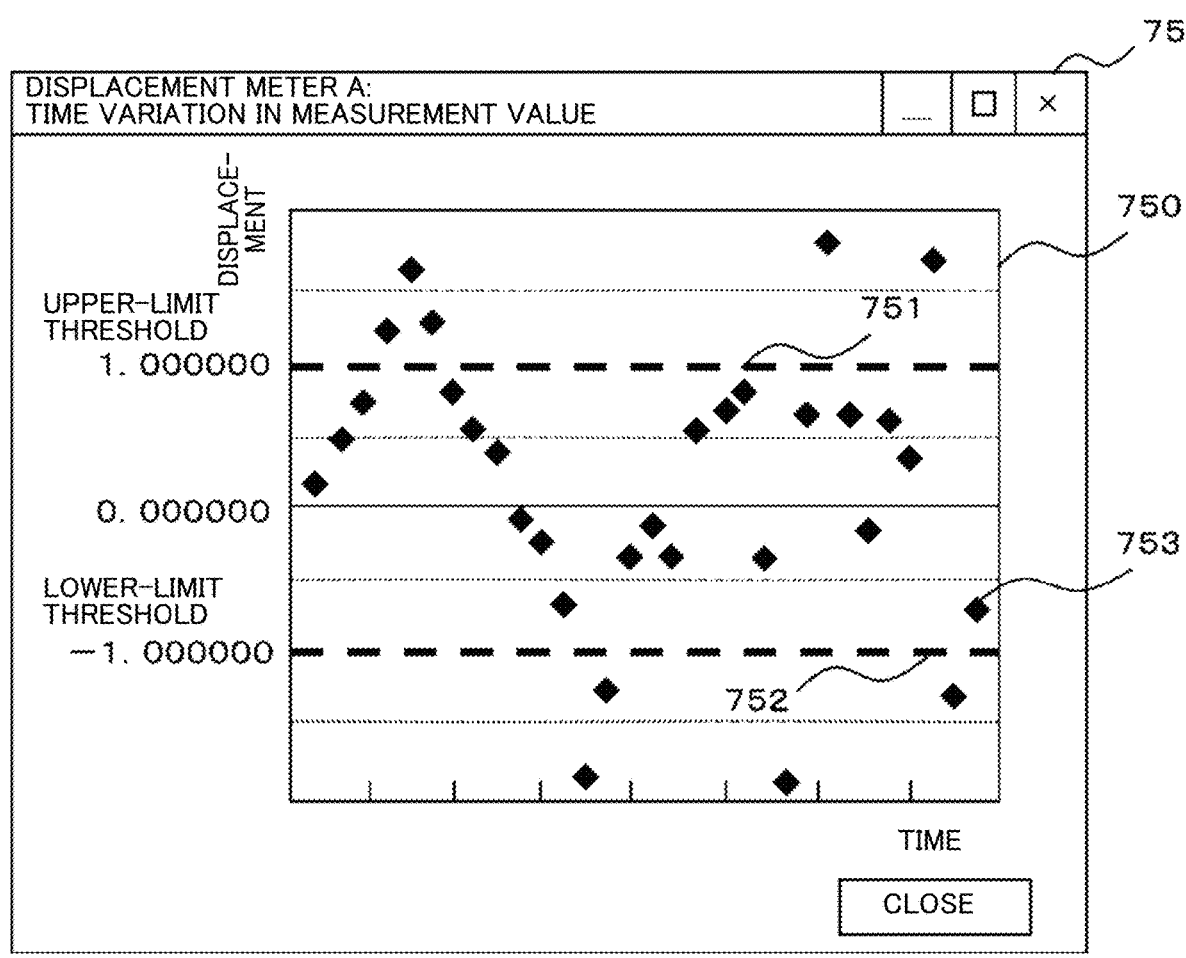
FIG. 12 illustrates a window for displaying a time variation in measurement value acquired at the displacement meter in Embodiment 1 of the disclosure.
Figure 13:
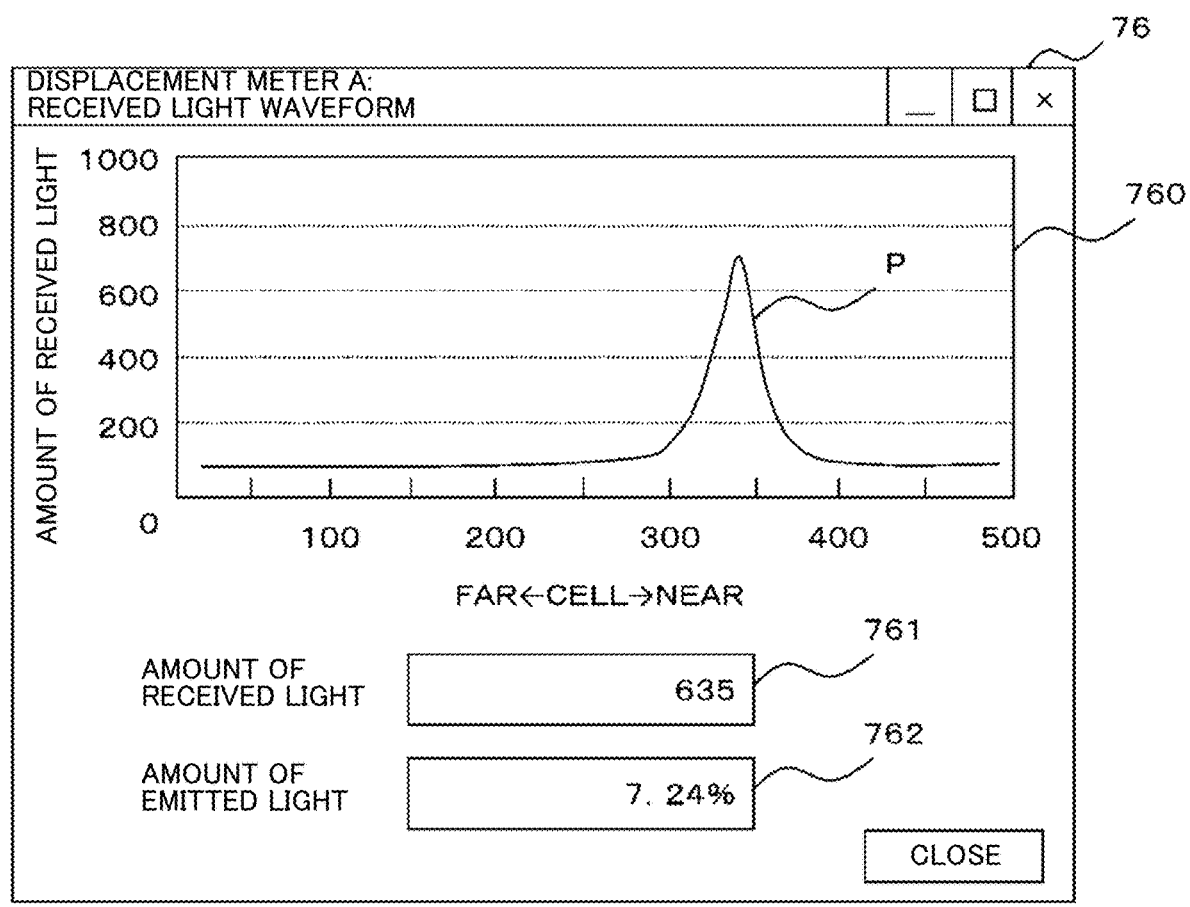
FIG. 13 illustrates a window for displaying a received light waveform in the displacement meter in Embodiment 1 of the disclosure.

When the button 731 for manual adjustment of the setpoints Xx is selected, the display controller 346 causes the display device 31 to display windows illustrated in FIGS. 11 to 13 in Step S5. While checking out the windows displayed on the display device 31, the user manually adjusts various applying setpoints Yy among the entire setpoints 351 as in existing techniques. In a window 74 for displaying measurement values illustrated in FIG. 11, measurement values are displayed in fields 740 and 741 for displaying measurement values acquired at the displacement meter 10. In the example illustrated in FIG. 11, a measurement value of +0.945790 mm from the displacement meters 10 is displayed in the field 740 for displaying a measurement value. This measurement value is within the range of the determination thresholds (range between the upper-limit threshold of +1.000000 mm and the lower-limit threshold of −1.000000 mm). The measurement value is displayed only in the field 740 for displaying a measurement value in FIG. 11. In contrast, in the case of the PLC 20 connected to two displacement meters 10, a measurement value acquired at one displacement meter 10 is displayed in one field 740, while a measurement value acquired at the other displacement meter 10 is displayed in the other field 741. FIG. 12 illustrates a window 75 for displaying a time variation in measurement value using a distribution map 750 in which a measurement value at each acquisition interval of measurement values is plotted. The window 75 for displaying a time variation in measurement value also displays an upper-limit threshold 751 and a lower-limit threshold 752 of the determination thresholds, so as to allow the user to recognize whether the measurement value 753 is within the range of the determination thresholds. In the example illustrated in FIG. 12, some measurement values are higher than the upper-limit threshold 751 while some measurement values are lower than the lower-limit threshold 752. FIG. 13 illustrates a window 76 for displaying a received light waveform acquired from the displacement meter 10. In the window 76 for displaying a received light waveform, the vertical axis of a display region 760 for displaying a received light waveform indicates an amount of received light, and the horizontal axis indicates the positions of pixels corresponding to the respective light receiving elements in the image sensor 6. The window 76 for displaying a received light waveform also includes a display region 761 for displaying an amount of received light in the form of a numerical value, and a display region 762 for displaying an amount of emitted light at the time of acquisition of the amount of received light. In the example illustrated in FIG. 13, the positions of the pixels can have values corresponding to the pixels from 0 to 500, for example. The position of the pixel of 250, which is the median of the values 0 to 500, indicates the position of a displacement of 0 mm. For example, the displacement shifts to the negative side (in the direction approaching the displacement meter 10) when the surface of the measurement target 1 approaches from the position of the pixel of 250 toward the position of the pixel of 500. In contrast, the displacement shifts to the positive side (in the direction leaving the displacement meter 10) when the surface of the measurement target 1 approaches from the position of the pixel of 250 toward the position of the pixel of 0. The top of a peak P is located between the positions of the pixels of 300 and 400 in the received light waveform illustrated in FIG. 13, which means that the displacement has shifted to the negative side. When the applying setpoints Yy are appropriately employed, the top of the peak P of the received light waveform should be located at the position of the pixel of 250 indicating the position of a displacement of 0 mm, provided that the surface of a reference workpiece to be measured is disposed at the measurement center. In FIG. 13, the displacement has shifted to the negative side because the applying setpoints Yy are not appropriately adjusted.

In the case where the user manually adjusts the applying setpoints Yy in parallel to measurement of a reference workpiece as in existing techniques, the user adjusts the applying setpoints Yy among the entire setpoints 351 such that the measurement value is within the range of the desired measurement value, while checking out the exemplary windows illustrated in FIGS. 11 to 13. When the measurement value falls within the range of the desired measurement value, the acquirer 341 receives an operation of the user at a manual adjustment completion button (not shown). The updater 345 then stores the applying setpoints Yy when the measurement value falls within the range of the desired measurement value into the optimized-setpoint storage area 356 of the second storage 35 of the PC 30, as the applying setpoints Yy to be used in actual inspection of the measurement target 1. The updater 345 then transmits the applying setpoints Yy stored in the optimized-setpoint storage area 356 of the second storage 35 of the PC 30 to the PLC 20. The first controller 22 of the PLC 20 then stores the received applying setpoints Yy into the applying-setpoint storage area 232 of the first storage 23.

Figure 14:
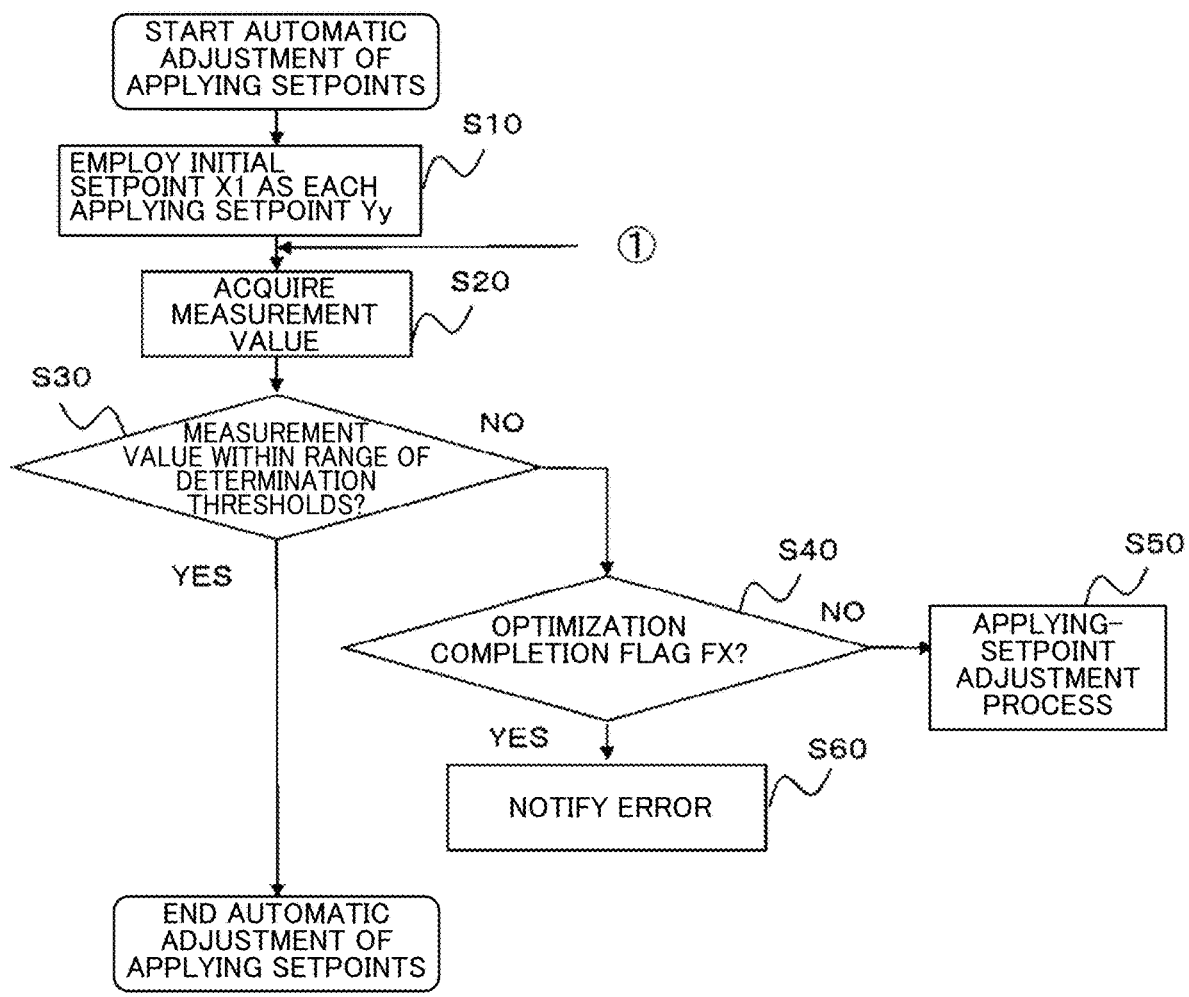
FIG. 14 is a flowchart illustrating an applying-setpoint automatic adjustment process executed in the PC in Embodiment 1 of the disclosure.

Referring back to FIG. 10, when the button 732 for automatic adjustment of the setpoints Xx is selected, an applying-setpoint automatic adjustment process illustrated in FIG. 14 is started in Step S5. Embodiment 1 involves a measurement mode adjustment process applied to the applying-setpoint adjustment process in Step S50.

First, in Step S10, the setter 342 employs the initial setpoints X1 for individual attributes listed in the central column in FIG. 5 as the applying setpoints Yy. Specifically, the setter 342 stores the setpoints X1, which are predetermined as the initial setpoints for individual attributes illustrated in FIG. 5 among the entire setpoints 351 in the second storage 35, into the applying-setpoint storage area 355 of the second storage 35 as the applying setpoints Yy, and thereby employs the applying setpoints Yy to be used in measurement of the measurement target 1. That is, the setter 342 employs 50%, indicated by the initial value I1 of the setpoint Ix for light emission from the laser diode 3, as the applying setpoint Yy to be used in measurement of the measurement target 1. The setter 342 also employs the diffuse reflection mode, indicated by the initial value J1 of the setpoint Jx for measurement mode, as the applying setpoint Yy to be used in measurement of the measurement target 1. The setter 342 also employs the moving average filter, indicated by the initial value K1 of the setpoint Kx for filter type, as the applying setpoint Yy to be used in measurement of the measurement target 1. The setter 342 also employs 128 times, indicated by the initial value L1 of the setpoint Lx for moving-average calculation times, as the applying setpoint Yy to be used in measurement of the measurement target 1. The setter 342 reads the acquisition interval of measurement values set in Step S4 in FIG. 6 from the user's condition storage area 354, and employs 40 µs, indicated by the initial value M1 of the setpoint Mx for sampling period, as the applying setpoint Yy to be used in measurement of the measurement target 1 when the initial value M1 is equal to or lower than the acquisition interval of measurement values. In contrast, when the initial value M1 of the setpoint Mx for sampling period is higher than the acquisition interval of measurement values, the setter 342 employs a setpoint Mx for sampling period that is equal to or lower than the acquisition interval of measurement values and closest to the acquisition interval of measurement values, as the applying setpoint Yy to be used in measurement of the measurement target 1. For example, in the case of an acquisition interval of measurement values illustrated in FIG. 10 set to 20 µs, the setter 342 employs 20 µs as the setpoint Mx for sampling period. The setter 342 also employs 100 Hz, indicated by the initial value N1 of the setpoint Nx for cut-off frequency, as the applying setpoint Yy to be used in measurement of the measurement target 1. The setter 342 also employs 1.5000, indicated by the initial value O1 of the setpoint Ox for refractive index, as the applying setpoint Yy to be used in measurement of the measurement target 1. The setter 342 then transmits the applying setpoints Yy for individual attributes stored in the applying-setpoint storage area 355 to the PLC 20. The first controller 22 of the PLC 20 then stores the received applying setpoints Yy for individual attributes into the applying-setpoint storage area 232 of the first storage 23. The process then goes to Step S20. The initial value P1 of the setpoint Px for measurement recipe is not used in Embodiment 1 and therefore not described.

In Step S20, the acquirer 341 of the PC 30 acquires the measurement value (and the amount of received light) from the displacement meter 10, which is obtained by the first controller 22 of the PLC 20 through execution of the control program 231 in accordance with the applying setpoints Yy in the applying-setpoint storage area 232.

In Step S30, the determiner 343 of the PC 30 determines whether the measurement value from the displacement meter 10 is within the range of the desired measurement value 352, which was stored into the user's condition storage area 354 in Step S4 in FIG. 6, that is, within the range of the determination thresholds between the upper-limit and lower-limit thresholds. The measurement value for the first time is acquired using the initial setpoints X1 (that is, I1, J1, K1, L1, M1 (or the setpoint Mx for sampling period that is equal to or lower than the acquisition interval of measurement values and closest to the acquisition interval of measurement values), N1, and O1) as the applying setpoints Yy. When the measurement value is determined to be within the range of the desired measurement value 352 (Step S30: Yes), which means that a measurement value acquired from the reference workpiece using these initial setpoints X1 (note that Mx should not necessarily be M1 as described above) used in acquisition of the measurement value falls within the appropriate range, then the applying-setpoint automatic adjustment process is terminated. That is, the applying setpoints Yy used in acquisition of the measurement value from the reference workpiece that is within the range of the desired measurement value 352 are stored into the applying-setpoint storage area 232 of the first storage 23 of the PLC 20, and employed as the applying setpoints Yy. The applying setpoints Yy used in acquisition of the measurement value from the reference workpiece that is within the range of the desired measurement value 352 will therefore be used in actual inspection of the measurement target 1 at the displacement meter 10. When the measurement value is determined to be out of the range of the desired measurement value 352 (Step S30: No), the process goes to Step S40.

In Step S40, the determiner 343 of the PC 30 confirms the setting of an optimization completion flag FX. The optimization completion flag FX is a flag F to be set at the time of completion of an applying-setpoint adjustment process in Step S50 explained below. As the optimization completion flag FX for measurement mode, an optimization completion flag FJ is set as explained below at the time of completion of the measurement mode adjustment process, for example. The optimization completion flag FJ is named by replacing the upper-case letter X of the optimization completion flag FX with the upper-case letter J of the setpoint Jx for measurement mode. In the processes of adjusting the setpoints Xx for other attributes, the upper-case letter X of the optimization completion flag FX is also replaced with the upper-case letter X of the setpoint Xx for the corresponding attribute. When the determiner 343 determines that the optimization completion flag FJ is not set in Step S40 (Step S40: No), which means incompletion of the measurement mode adjustment process explained below, then the process goes to Step S50.

In Step S50, since the initial value J1 of the setpoint Jx for measurement mode employed as the applying setpoint Yy does not provide an appropriate measurement value, the measurement mode adjustment process is executed as the applying-setpoint adjustment process. The measurement mode adjustment process will now be explained in detail with reference to FIG. 15.

Step S50 involves the measurement mode adjustment process. First, in Step S101 in FIG. 15, the determiner 343 determines whether the current measurement value in the measurement mode adjustment process is the measurement value for the first time. The measurement value for the first time in the measurement mode adjustment process indicates the measurement value, which is acquired in Step S20 in advance of the measurement mode adjustment process and then subject to the measurement mode adjustment process in Step S50 for the first time. In order to determine whether the current measurement value is the measurement value for the first time in the measurement mode adjustment process, the number of times of proceeding to the measurement mode adjustment process in Step S50 is counted from the start of the applying-setpoint automatic adjustment process. The determiner 343 determines the current measurement value to be the measurement value for the first time when the counted number is 1. This configuration is, however, a mere example. When the current measurement value is determined to be the measurement value for the first time (Step S101: Yes), the diffuse reflection mode, indicated by the initial value J1 of the setpoint Jx for measurement mode, is employed as the applying setpoint Yy to be used in measurement of the measurement target 1. Since this measurement value is acquired for the first time and has no other measurement value to be compared, the process goes to Step S102.

In Step S102, the changer 344 reads a setpoint Jx+1 for measurement mode different from the setpoint Jx with which the measurement value has already been acquired, from the entire setpoints 351 in the second storage 35. In the process for the first time, the setpoint Jx for measurement mode with which the measurement value has already been acquired is only the initial setpoint J1 for diffuse reflection mode. The setpoint J2 is thus read from the entire setpoints 351 in the second storage 35 as the setpoint Jx+1 for measurement mode different from the initial setpoint J1. The changer 344 then stores the read setpoint Jx+1 for measurement mode into the applying-setpoint storage area 355, thereby substituting the setpoint Jx+1 for measurement mode for the applying setpoint Yy to be subsequently used. The changer 344 then transmits the setpoint Jx+1 for measurement mode, which is the applying setpoint Yy that is stored in the applying-setpoint storage area 355 and will be subsequently used, to the PLC 20. The first controller 22 then stores and sets the setpoint Jx+1 for measurement mode, which is the applying setpoint Yy to be subsequently used, into the applying-setpoint storage area 232. In the case where the determination of the current measurement value to be the measurement value for the first time in Step S101 is followed by Step S102 while skipping Steps S103 and S104, the changer 344 also stores the initial setpoint J1 into the optimized-setpoint storage area 356 as a provisional setpoint in Step S102. The process then returns to Step S20 in FIG. 14, and the first controller 22 of the PLC 20 executes the control program 231 in accordance with the setpoint Jx+1 for measurement mode, which is a new applying setpoint Yy (applying setpoint to be subsequently used) stored in the applying-setpoint storage area 232. In Step S20 in FIG. 14, the acquirer 341 acquires a measurement value using the new applying setpoint Yy (above-mentioned applying setpoint to be subsequently used). Steps S30 and S40 are then executed again as explained above. When the optimization completion flag FJ is not set, the process goes to Step S50 again. When the measurement value immediately after the change of the setpoint Jx for measurement mode to the setpoint J2 is determined to be within the range of the desired measurement value 352 in Step S30, the process goes to Step S40 as an exceptional measure, because the initial setpoint J1 is stored in the optimized-setpoint storage area 356 as a provisional setpoint without optimization of the setpoint Jx at this stage.

In Step S50, the process goes to Step S101 in FIG. 15 again. In this case, the current measurement value is determined to be not the measurement value for the first time (Step S101: No), and the process goes to Step S103.

In Step S103, the updater 345 causes the applying setpoint Yy for measurement mode used in acquisition of either one of the measurement values, which is the measurement value (first measurement value) acquired using the applying setpoint Yy (first applying setpoint, Jx in Embodiment 1) for measurement mode retained in the optimized-setpoint storage area 356 and the measurement value (second measurement value) acquired using the new applying setpoint Yy (second applying setpoint, Jx+1 in Embodiment 1) for measurement mode after being changed by the changer 344, closer to the desired measurement value 352 to be retained in the optimized-setpoint storage area 356. In the case where the measurement value (first measurement value) acquired using the applying setpoint Yy (first applying setpoint, Jx in Embodiment 1) for measurement mode is equal to the measurement value (second measurement value) acquired using the new applying setpoint Yy (second applying setpoint, Jx+1 in Embodiment 1) for measurement mode, either one of the applying setpoints Yy for measurement mode is retained in the optimized-setpoint storage area 356. The process then goes to Step S104.

In Step S104, the determiner 343 determines whether all the measurement values have already been acquired from the reference workpiece using all the setpoints Jx for measurement mode as the applying setpoint Yy. In order to determine whether all the measurement values have already been acquired, the determiner 343 confirms whether the number of measurement values that have been acquired by the acquirer 341 from the start of the measurement mode adjustment process is equal to the number of setpoints Jx for measurement mode among the entire setpoints 351 in the second storage 35, for example. When the determiner 343 determines that not all the measurement values have been acquired (Step S104: No), the process returns to Step S102. In Step S102, the changer 344 reads a setpoint Jx+1 for measurement mode different from the setpoint Jx with which the measurement value has already been acquired, from the entire setpoints 351, and stores the setpoint Jx+1 into the applying-setpoint storage area 355 as the applying setpoint Yy. The changer 344 then transmits the setpoint Jx+1 for measurement mode stored in the applying-setpoint storage area 355 to the PLC 20, and causes the setpoint Jx+1 for measurement mode to be stored into the applying-setpoint storage area 232 as the applying setpoint Yy. In the case of execution of Step S102 after Steps S103 and S104, since the applying setpoint Yy for measurement mode used in acquisition of the measurement value closer to the desired measurement value 352 is retained in the optimized-setpoint storage area 356 in Step S103, the initial setpoint J1 is not stored into the optimized-setpoint storage area 356 so as to retain the applying setpoint Yy.

Steps S20 to S50 in FIG. 14 are thus repeated. That is, Steps S20 to S50 in FIG. 14 are repetitively executed, provided that the measurement value is out of the range of the desired measurement value 352 and the optimization completion flag FJ is not set. After the setpoint J3 among the setpoints Jx for measurement mode is employed in the applying-setpoint storage area 232 as the applying setpoint Yy, when the measurement value is determined to be within the range of the desired measurement value 352 in Step S30 (Step S30: Yes) during repetition of Steps S20 to S50, which means that a measurement value acquired from the reference workpiece using the setpoint Jx for measurement mode stored in the optimized-setpoint storage area 356 falls within the appropriate range, then the applying-setpoint automatic adjustment process is terminated. That is, the setpoint Jx for measurement mode, which is identical to the applying setpoint Yy used in acquisition of the measurement value within the range of the desired measurement value 352 from the reference workpiece, is retained in the optimized-setpoint storage area 356 of the PC 30, and the identical applying setpoint Yy is also stored in the applying-setpoint storage area 232 of the PLC 20 at this stage. The setpoint Jx for measurement mode stored in the optimized-setpoint storage area 356 will therefore be used in actual inspection of the measurement target 1 at the displacement meter 10. The setpoint Xx retained in the optimized-setpoint storage area 356 at the time of determination of the measurement value to be within the range of the desired measurement value 352 will be hereinafter also referred to as "optimized setpoint X_opt". The symbol "J_opt" indicates the optimized setpoint for measurement mode.

In Step S104, if all the measurement values are determined to have already been acquired using all the setpoints Jx for measurement mode as the applying setpoint Yy (Step S104: Yes), then the process goes to Step S105.

In Step S105, the updater 345 sets the optimization completion flag FJ as the optimization completion flag FX, because all the measurement values have already been acquired using all the setpoints Jx for measurement mode as the applying setpoint Yy, which means completion of the measurement mode adjustment process as the applying setpoint adjustment process. The updater 345 then transmits an instruction to the first controller 22 of the PLC 20, and causes the optimized setpoint J_opt for measurement mode, which is the setpoint Jx for measurement mode retained in the optimized-setpoint storage area 356 at the time of completion of the measurement mode adjustment process, to be retained as the applying setpoint Yy for measurement mode stored in the first storage 23.

After setting of the optimization completion flag FJ in Step S105, the setpoint Jx that provides the measurement value closest to the desired measurement value 352 among the entire setpoints J1, J2, J3 . . . for measurement mode is retained as the optimized setpoint J_opt for measurement mode stored in the optimized-setpoint storage area 356, and this optimized setpoint J_opt is also stored in the applying-setpoint storage area 232 of the PLC 20.

In this state, Steps S20 to S40 in FIG. 14 are executed. When the measurement value acquired using the optimized setpoint J_opt for measurement mode in Step S20 is determined to be out of the range of the desired measurement value 352 in Step S30 (Step S30: No), then the setting of the optimization completion flag FJ is confirmed in Step S40, and the process goes to Step S60.

In Step S60, the determiner 343 causes the display device 31 to display an error screen, so as to notify the user that the applying-setpoint automatic adjustment process has failed to adjust the setpoint Jx for measurement mode for appropriate measurement of a measurement value.

Figure 16:
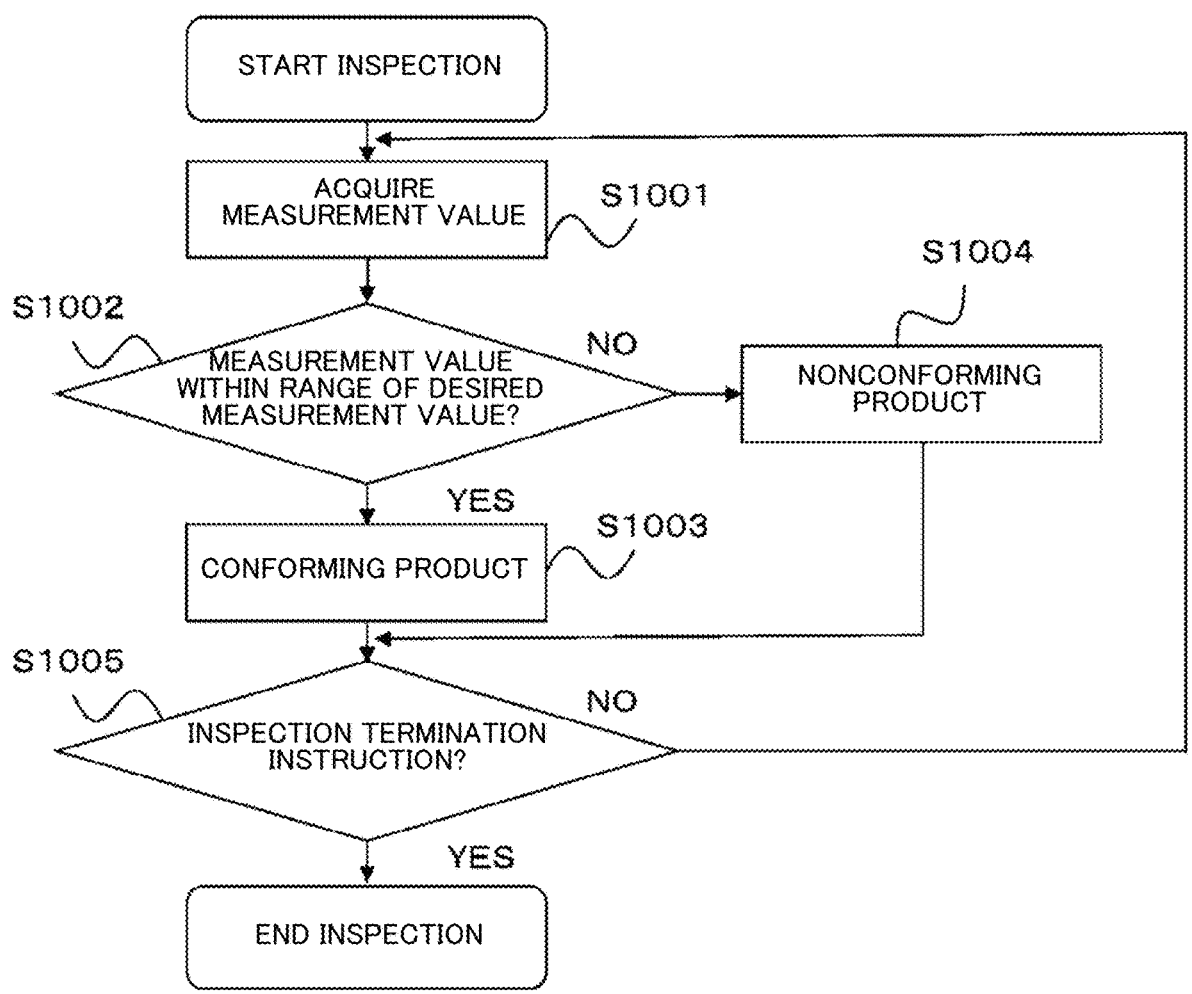
FIG. 16 is a flowchart illustrating an inspection process executed in the PLC in Embodiment 1 of the disclosure.

After the above-explained applying-setpoint automatic adjustment process and the determination that the measurement value is within the range of the desired measurement value 352 in Step S30, the measurement target 1 is actually inspected at the displacement meter 10, as illustrated in FIG. 16. During the actual inspection, the setpoint Jx for measurement mode, which provides the measurement value within the range of the desired measurement value 352 in the applying-setpoint automatic adjustment process, is stored in the applying-setpoint storage area 232 of the PLC 20 as the applying setpoint Yy and used in inspection.

First, in Step S1001, the acquirer 341 of the PC 30 acquires the measurement value from the displacement meter 10, which is obtained by execution of the control program 231 in accordance with the applying setpoint Yy in the applying-setpoint storage area 232 by the first controller 22 of the PLC 20, as in Step S20.

In Step S1002, the determiner 343 determines whether the measurement value from the displacement meter 10 is within the range of the desired measurement value 352, that is, within the range of the desired measurement value 352 between the upper-limit and lower-limit thresholds, as in Step S30. When the measurement value is determined to be within the range of the desired measurement value 352 (Step S1002: Yes), the process goes to Step S1003.

In Step S1003, the determiner 343 stores the result that the measurement target 1 is a conforming product into the second storage 35. The process then goes to Step S1005.

In contrast, when the measurement value is determined to be out of the range of the desired measurement value 352 in Step S1002 (Step S1002: No), the process goes to Step S1004.

In Step S1004, the determiner 343 stores the result that the measurement target 1 is a nonconforming product into the second storage 35. The display controller 346 causes the display device 31 to display a screen to notify the user of occurrence of a nonconforming product. The process then goes to Step S1005.

In Step S1005, the determiner 343 determines whether the acquirer 341 has received an inspection termination instruction caused by an operation of the user through the input device 32. When an inspection termination instruction has been received (Step S1005: Yes), the inspection of the measurement target 1 is terminated. When no inspection termination instruction has been received (Step S1005: No), the process returns to Step S1001 to continue the inspection of the measurement target 1.

As explained above, in the setpoint adjustment apparatus for the displacement meter 10 according to Embodiment 1, during adjustment of the applying setpoint Yy among the setpoints Jx for measurement mode in parallel to measurement of the reference workpiece, when the measurement value is within the range of the desired measurement value 352, the applying setpoint Yy (setpoint Jx for measurement mode) used in acquisition of the measurement value determined to be within the range of the desired measurement value 352 is employed as the applying setpoint Yy to be used in inspection of the measurement target 1. In contrast, when the measurement value is out of the range of the desired measurement value 352, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Jx+1 for measurement mode) is within the range of the desired measurement value 352. This configuration can adjust the applying setpoint Yy for measurement mode while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 1, during preliminary adjustment of the applying setpoint Yy among the setpoints Jx for measurement mode on the basis of measurement of the reference workpiece, when the measurement value based on the initial setpoint J1 is within the range of the desired measurement value 352, the initial setpoint J1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Jx+1 for measurement mode) different from the initial setpoint J1 for measurement mode. This configuration can adjust the applying setpoint Yy for measurement mode while reducing the burden of determination and operation on a user during preliminary adjustment of the applying setpoint Yy on the basis of measurement of the reference workpiece.

In addition, in the setpoint adjustment apparatus for the displacement meter 10 according to Embodiment 1, the updater 345 causes the applying setpoint Yy used in acquisition of either one of the measurement values, which include the measurement value (first measurement value) acquired using the applying setpoint Yy (first applying setpoint, setpoint Jx for measurement mode) before being changed by the changer 344 and the measurement value (second measurement value) acquired using the applying setpoint Yy (second applying setpoint, setpoint Jx+1 for measurement mode) after being changed by the changer 344, closer to the desired measurement value 352 as the applying setpoint Yy to be used in measurement of the measurement target 1. This configuration can update the applying setpoint Yy for measurement mode to an appropriate setpoint Jx for measurement mode while reducing the burden of determination and operation on a user during preliminary adjustment of the applying setpoint Yy on the basis of measurement of the reference workpiece.

Embodiment 2

A setpoint adjustment system for the displacement meter 10 according to Embodiment 2 will now be described with reference to FIGS. 14 and 17. The component identical to that in Embodiment 1 is provided with the same reference symbol without detailed description.

Figure 15:
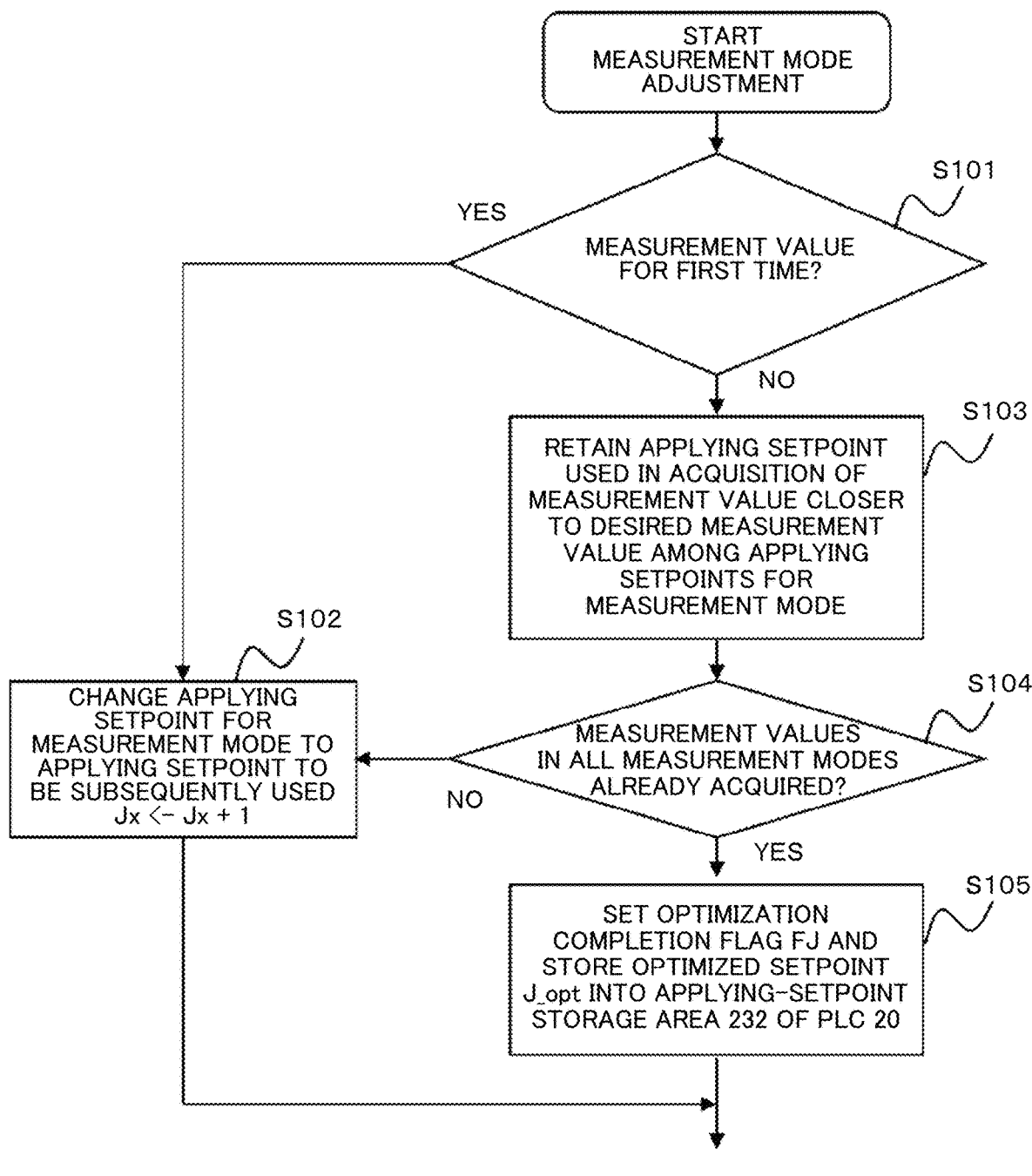
FIG. 15 is a flowchart illustrating a measurement mode adjustment process executed in the PC in Embodiment 1 of the disclosure.
Figure 17:
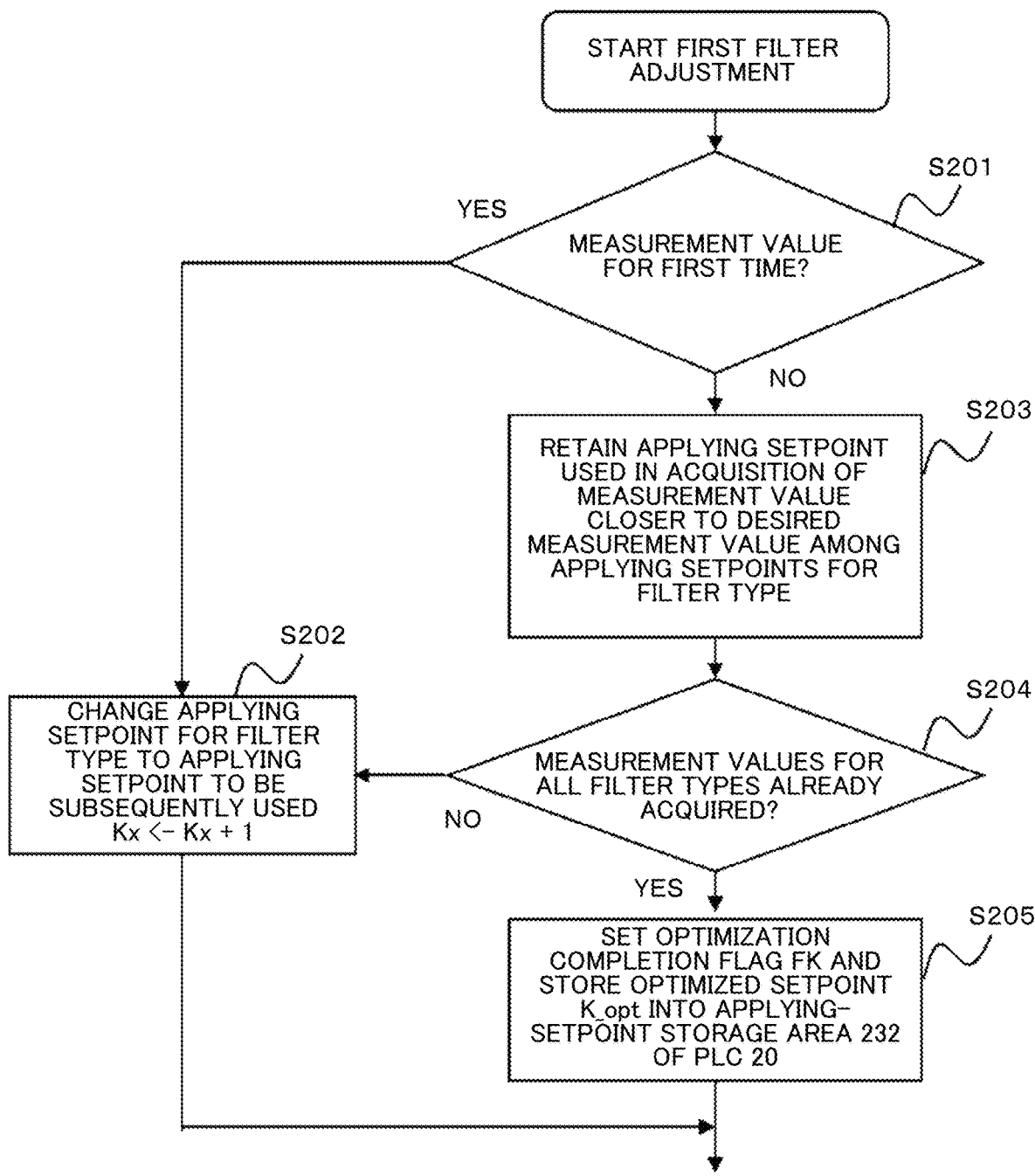
FIG. 17 is a flowchart illustrating a first filter adjustment process executed in a PC in Embodiment 2 of the disclosure.

The setpoint adjustment system for the displacement meter 10 according to Embodiment 2 differs from that according to Embodiment 1 in that the first filter adjustment process in FIG. 17 is applied to the applying-setpoint adjustment process in Step S50 in FIG. 14 instead of the measurement mode adjustment process in FIG. 15 in Embodiment 1. The processes in Embodiment 2 are identical to those in Embodiment 1 except for the first filter adjustment process, and the identical processes will not be redundantly explained.

Step S50 involves the first filter adjustment process. Instead of the setpoint Jx for measurement mode adjusted in Steps S101 to S105 in Embodiment 1, the setpoint Kx for filter type is adjusted in Steps S201 to S205 in Embodiment 2, which correspond to Steps S101 to S105 in Embodiment 1, in the same procedure as in Embodiment 1. The optimization completion flag FX set in Step S205 in this process corresponds to an optimization completion flag FK indicating completion of the first filter adjustment process. The optimized setpoint X_opt retained in the optimized-setpoint storage area 356 corresponds to an optimized setpoint K_opt for filter type. In Step S40 of the applying-setpoint automatic adjustment process in FIG. 14, the setting of the optimization completion flag FK is confirmed, which indicates completion of the adjustment of the setpoint Kx for filter type.

In the setpoint adjustment apparatus for the displacement meter 10 according to Embodiment 2, during preliminary adjustment of the applying setpoint Yy among the setpoints Kx for filter type on the basis of measurement of the reference workpiece, when the measurement value is within the range of the desired measurement value 352, the applying setpoint Yy (setpoint Kx for filter type) used in acquisition of the measurement value determined to be within the range of the desired measurement value 352 is employed as the applying setpoint Yy to be used in inspection of the measurement target 1, as in Embodiment 1. When the measurement value is out of the range of the desired measurement value 352, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Kx+1 for filter type) is within the range of the desired measurement value 352. This configuration can adjust the applying setpoint Yy for filter type while reducing the burden of determination and operation on a user during preliminary adjustment of the applying setpoint Yy on the basis of measurement of the reference workpiece.

In the setpoint adjustment apparatus for the displacement meter 10 according to Embodiment 2, during preliminary adjustment of the applying setpoint Yy among the setpoints Kx for filter type on the basis of measurement of the reference workpiece, when the measurement value based on the initial setpoint K1 is within the range of the desired measurement value 352, the initial setpoint K1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Kx+1 for filter type) different from the initial setpoint K1 for filter type. This configuration can adjust the applying setpoint Yy for filter type while reducing the burden of determination and operation on a user during preliminary adjustment of the applying setpoint Yy on the basis of measurement of the reference workpiece.

In the setpoint adjustment apparatus for the displacement meter 10 according to Embodiment 2, the updater 345 causes the applying setpoint Yy used in acquisition of either one of the measurement values, which include the measurement value (first measurement value) acquired using the applying setpoint Yy (first applying setpoint, setpoint Kx for filter type) before being changed by the changer 344 and the measurement value (second measurement value) acquired using the applying setpoint Yy (second applying setpoint, setpoint Kx+1 for filter type) after being changed by the changer 344, closer to the desired measurement value 352 as the applying setpoint Yy to be used in inspection of the measurement target 1, as in Embodiment 1. This configuration can update the applying setpoint Yy for filter type to an appropriate setpoint Kx while reducing the burden of determination and operation on a user during preliminary adjustment of the applying setpoint Yy on the basis of measurement of the reference workpiece.

Embodiment 3

A setpoint adjustment system for the displacement meter 10 according to Embodiment 3 will now be described with reference to FIGS. 14 and 18. The component identical to that in Embodiment 1 or 2 is provided with the same reference symbol without detailed description.

Figure 18:
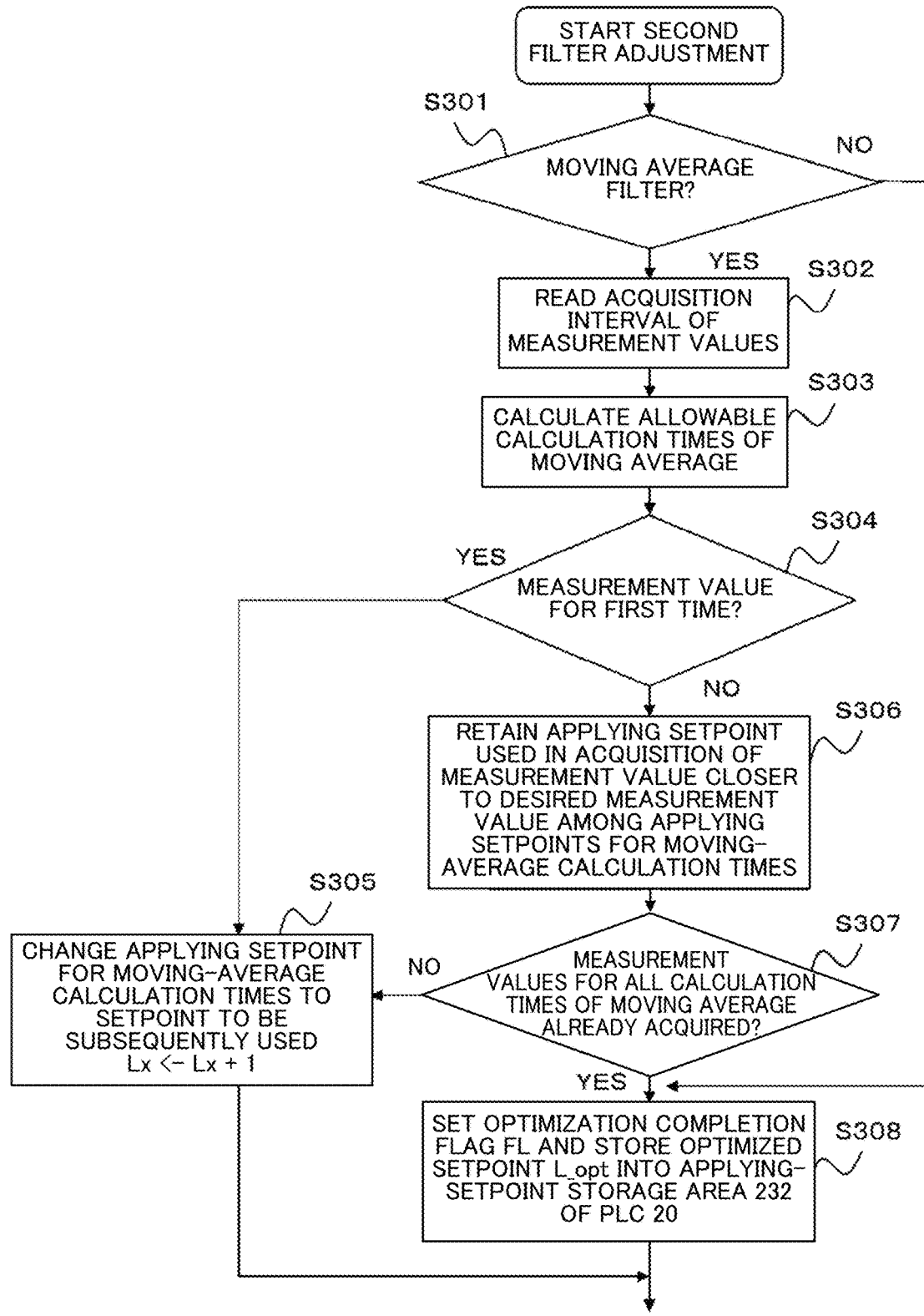
FIG. 18 is a flowchart illustrating a second filter adjustment process executed in a PC in Embodiment 3 of the disclosure.

The setpoint adjustment system for the displacement meter 10 according to Embodiment 3 differs from that according to Embodiment 1 in that a second filter adjustment process in FIG. 18 is applied to the applying-setpoint adjustment process in Step S50 in FIG. 14 instead of the measurement mode adjustment process in FIG. 15 in Embodiment 1. The processes in Embodiment 3 are identical to those in Embodiment 1 except for the second filter adjustment process, and the identical processes will not be redundantly explained.

Step S50 involves the second filter adjustment process. First, in Step S301, the determiner 343 determines whether the setpoint K1 for moving average filter is retained in the applying-setpoint storage area 355 of the second storage 35 as the applying setpoint Yy for filter type to be used in measurement of the measurement target 1. When the setpoint K1 for moving average filter is not retained (Step S301: No), which means that the setpoint Kx indicating filter type other than moving average filter is retained as the applying setpoint Yy for filter type, then the process goes to Step S308 to set an optimization completion flag FL and terminate the second filter adjustment process. If the setpoint K1 for moving average filter is retained as the applying setpoint Yy (Step S301: Yes), the process goes to Step S302.

In Step S302, the determiner 343 reads the acquisition interval of measurement values set in Step S4 in FIG. 6 from the user's condition storage area 354. The process then goes to Step S303.

In Step S303, the determiner 343 calculates allowable calculation times of moving average on the basis of Expression 1 below. The process then goes to Step S304. The allowable calculation times of moving average indicate the number of times of calculation of moving average equal to or lower than the acquisition interval of measurement values desired by the user without exceeding the acquisition interval of measurement values. The calculation of the allowable calculation times of moving average on the basis of Expression 1 below uses the setpoint Mx for sampling period, which is the applying setpoint Yy for sampling period stored in the applying-setpoint storage area 355 of the second storage 35. In the case of the first execution of the second filter adjustment process, a value of 40 µs, which is the initial value M1 of the setpoint Mx for sampling period in FIG. 5, (or the setpoint Mx for sampling period that is equal to or lower than the acquisition interval of measurement values and closest to the acquisition interval of measurement values) is stored in the applying-setpoint storage area 355 of the second storage 35 as the applying setpoint Yy for sampling period.

Allowable calculation times of moving average<acquisition interval of measurement values÷sampling period    (Expression 1)

In Steps S304 to S308 in Embodiment 3, which correspond to Steps S101 to S105 in Embodiment 1, the setpoint Lx for moving-average calculation times is adjusted in the same procedure as in Embodiment 1, instead of the setpoint Jx for measurement mode in Embodiment 1. The optimization completion flag FX set in Step S308 in this process corresponds to the optimization completion flag FL indicating completion of the second filter adjustment process. The optimized setpoint X_opt retained in the optimized-setpoint storage area 356 corresponds to an optimized setpoint L_opt for moving-average calculation times. In Step S40 of the applying-setpoint automatic adjustment process in FIG. 14, the setting of the optimization completion flag FL is confirmed, which indicates completion of the adjustment of the setpoint Lx for moving-average calculation times.

In Step S305, the changer 344 reads a setpoint Lx+1 for moving-average calculation times different from the setpoint Lx with which the measurement value has already been acquired, from the entire setpoints 351 in the second storage 35, and stores the setpoint Lx+1 into the applying-setpoint storage area 355, thereby employing the setpoint Lx+1 for moving-average calculation times as the applying setpoint Yy to be subsequently used. The changer 344 then transmits the setpoint Lx+1 for moving-average calculation times, which is the applying setpoint Yy that is stored in the applying-setpoint storage area 355 and will be subsequently used, to the PLC 20, and causes the setpoint Lx+1 for moving-average calculation times, which is the applying setpoint Yy to be subsequently used, to be stored and set in the applying-setpoint storage area 232. As the setpoint Lx+1 for moving-average calculation times to be changed by the changer 344, only the setpoints equal to or lower than the allowable calculation times of moving average calculated in Step S303 are selected.

In the setpoint adjustment apparatus for the displacement meter 10 according to Embodiment 3, during preliminary adjustment of the applying setpoint Yy among the setpoints Lx for moving-average calculation times on the basis of measurement of the reference workpiece, when the measurement value is within the range of the desired measurement value 352, the applying setpoint Yy (setpoint Lx for moving-average calculation times) used in acquisition of the measurement value determined to be within the range of the desired measurement value 352 is employed as the applying setpoint Yy to be used in inspection of the measurement target 1, as in Embodiment 1 or 2. When the measurement value is out of the range of the desired measurement value 352, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Lx+1 for moving-average calculation times) is within the range of the desired measurement value 352. This configuration can adjust the applying setpoint Yy for moving-average calculation times while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 3, during preliminary adjustment of the applying setpoint Yy among the setpoints Lx for moving-average calculation times on the basis of measurement of the reference workpiece, when the measurement value based on the initial setpoint L1 is within the range of the desired measurement value 352, the initial setpoint L1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Lx+1 for moving-average calculation times) different from the initial setpoint L1 for moving-average calculation times. This configuration can adjust the applying setpoint Yy for moving-average calculation times while reducing the burden of determination and operation on a user during preliminary adjustment of the applying setpoint Yy on the basis of measurement of the reference workpiece.

In addition, in the setpoint adjustment apparatus for the displacement meter 10 according to Embodiment 3, the updater 345 causes the applying setpoint Yy used in acquisition of either one of the measurement values, which include the measurement value (first measurement value) acquired using the applying setpoint Yy (first applying setpoint, setpoint Lx for moving-average calculation times) before being changed by the changer 344 and the measurement value (second measurement value) acquired using the applying setpoint Yy (second applying setpoint, setpoint Lx+1 for moving-average calculation times) after being changed by the changer 344, closer to the desired measurement value 352 as the applying setpoint Yy to be used in measurement of the measurement target 1, as in Embodiment 1 or 2. This configuration can update the applying setpoint Yy to an appropriate setpoint Lx while reducing the burden of determination and operation on a user during preliminary adjustment of the applying setpoint Yy for moving-average calculation times on the basis of measurement of the reference workpiece.

Furthermore, in the setpoint adjustment apparatus for the displacement meter 10 according to Embodiment 3, the changer 344 changes the applying setpoint Yy to a setpoint Lx for moving-average calculation times equal to or lower than the allowable calculation times of moving average, which is calculated by dividing the acquisition interval of measurement values by the applying setpoint Yy for sampling period (setpoint Mx for sampling period to be used in measurement of the measurement target 1 at the displacement meter 10). The changer 344 thus does not change the applying setpoint Yy for moving-average calculation times to a setpoint Lx for moving-average calculation times exceeding the acquisition interval of measurement values designated by an operation of the user. This configuration can automatically adjust the applying setpoint Yy for moving-average calculation times to an appropriate setpoint Lx for moving-average calculation times without affecting a tact time expected by the user.

Embodiment 4

A setpoint adjustment system for the displacement meter 10 according to Embodiment 4 will now be described with reference to FIGS. 14 and 19. The component identical to that in any one of Embodiments 1 to 3 is provided with the same reference symbol without detailed description.

Figure 19:
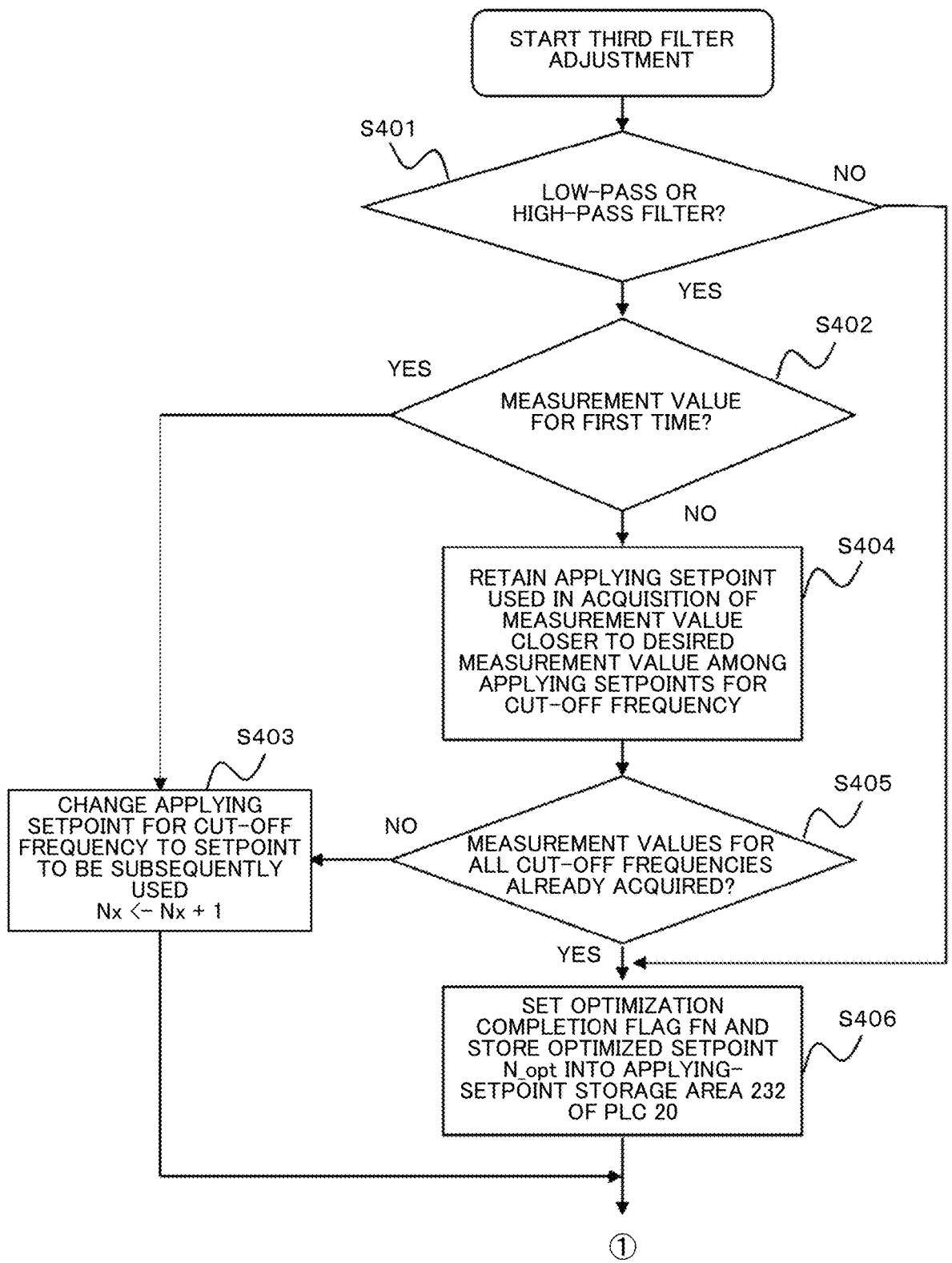
FIG. 19 is a flowchart illustrating a third filter adjustment process executed in a PC in Embodiment 4 of the disclosure.

The setpoint adjustment system for the displacement meter 10 according to Embodiment 4 differs from that according to Embodiment 1 in that a third filter adjustment process illustrated in FIG. 19 is applied to the applying-setpoint adjustment process in Step S50 in FIG. 14 instead of the measurement mode adjustment process in FIG. 15 in Embodiment 1. The processes in Embodiment 4 are identical to those in Embodiment 1 except for the third filter adjustment process, and the identical processes will not be redundantly explained.

Step S50 involves the third filter adjustment process. First, in Step S401, the determiner 343 determines whether either one of the setpoint K2 for low-pass filter and the setpoint K3 for high-pass filter are retained in the applying-setpoint storage area 355 of the second storage 35, as the applying setpoint Yy for filter type to be used in measurement of the measurement target 1. If neither of the setpoint K2 for low-pass filter and the setpoint K3 for high-pass filter is retained (Step S401: No), which means that a setpoint Kx for filter type other than the low-pass and high-pass filters is retained as the applying setpoint Yy for filter type, then the process goes to Step S406 to set an optimization completion flag FN and terminate the third filter adjustment process. If either one of the setpoint K2 for low-pass filter and the setpoint K3 for high-pass filter is retained as the applying setpoint Yy for filter type (Step S401: Yes), the process goes to Step S402.

In Steps S402 to S406 in Embodiment 4, which correspond to Steps S101 to S105 in Embodiment 1, the setpoint Nx for cut-off frequency is adjusted in the same procedure as in Embodiment 1, instead of the setpoint Jx for measurement mode in Embodiment 1. The optimization completion flag FX set in Step S406 in this process corresponds to the optimization completion flag FN indicating completion of the third filter adjustment process. The optimized setpoint X_opt retained in the optimized-setpoint storage area 356 corresponds to an optimized setpoint N_opt for cut-off frequency. In Step S40 of the applying-setpoint automatic adjustment process in FIG. 14, the setting of the optimization completion flag FN is confirmed, which indicates completion of the adjustment of the setpoint Nx for cut-off frequency.

In the setpoint adjustment apparatus for the displacement meter 10 according to Embodiment 4, during preliminary adjustment of the applying setpoint Yy among the setpoints Nx for cut-off frequency on the basis of measurement of the reference workpiece, when the measurement value is within the range of the desired measurement value 352, the applying setpoint Yy (setpoint Nx for cut-off frequency) used in acquisition of the measurement value determined to be within the range of the desired measurement value 352 is employed as the applying setpoint Yy to be used in inspection of the measurement target 1, as in any one of Embodiments 1 to 3. When the measurement value is out of the range of the desired measurement value 352, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Nx+1 for cut-off frequency) is within the range of the desired measurement value 352. This configuration can adjust the applying setpoint Yy for cut-off frequency while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 4, during preliminary adjustment of the applying setpoint Yy among the setpoints Nx for cut-off frequency on the basis of measurement of the reference workpiece, when the measurement value based on the initial setpoint N1 is within the range of the desired measurement value 352, the initial setpoint N1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Nx+1 for cut-off frequency) different from the initial setpoint N1 for cut-off frequency. This configuration can adjust the applying setpoint Yy for cut-off frequency while reducing the burden of determination and operation on a user during preliminary adjustment of the applying setpoint Yy on the basis of measurement of the reference workpiece.

In addition, in the setpoint adjustment apparatus for the displacement meter 10 according to Embodiment 4, the updater 345 causes the applying setpoint Yy used in acquisition of either one of the measurement values, which include the measurement value (first measurement value) acquired using the applying setpoint Yy (first applying setpoint, setpoint Nx for cut-off frequency) before being changed by the changer 344 and the measurement value (second measurement value) acquired using the applying setpoint Yy (second applying setpoint, setpoint Nx+1 for cut-off frequency) after being changed by the changer 344, closer to the desired measurement value 352 as the applying setpoint Yy to be used in measurement of the measurement target 1, as in any one of Embodiments 1 to 3. This configuration can update the applying setpoint Yy for cut-off frequency to an appropriate setpoint Lx while reducing the burden of determination and operation on a user during preliminary adjustment of the applying setpoint Yy on the basis of measurement of the reference workpiece.

Embodiment 5

A setpoint adjustment system for the displacement meter 10 according to Embodiment 5 will now be described with reference to FIGS. 14 and 20. The component identical to that in any one of Embodiments 1 to 4 is provided with the same reference symbol without detailed description.

Figure 20:
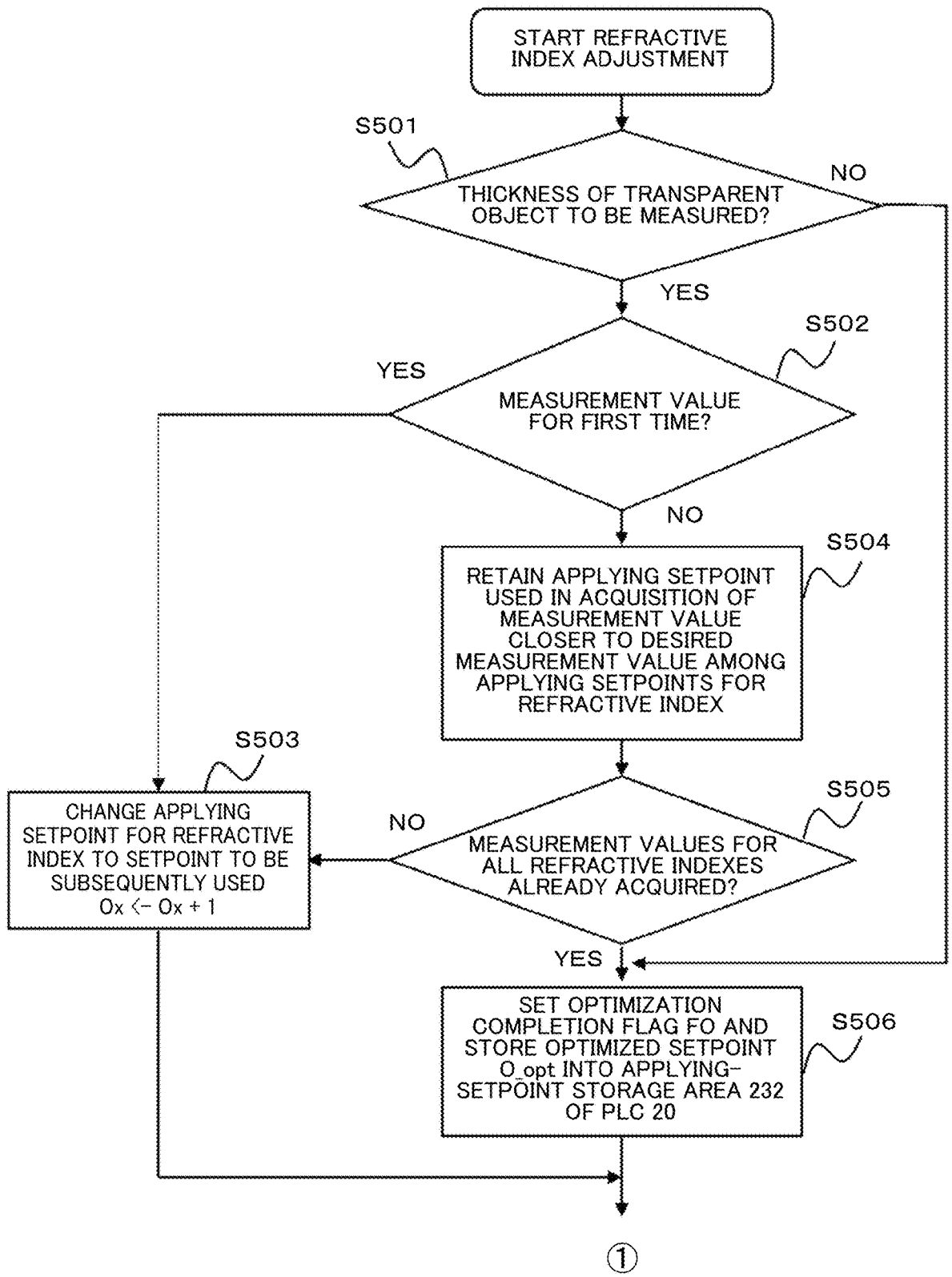
FIG. 20 is a flowchart illustrating a refractive index adjustment process executed in a PC in Embodiment 5 of the disclosure.

The setpoint adjustment system for the displacement meter 10 according to Embodiment 5 differs from that according to Embodiment 1 in that a refractive index adjustment process in FIG. 20 is applied to the applying-setpoint adjustment process in Step S50 in FIG. 14 instead of the measurement mode adjustment process in FIG. 15 in Embodiment 1. The processes in Embodiment 4 are identical to those in Embodiment 1 except for the refractive index adjustment process, and the identical processes will not be redundantly explained.

Step S50 involves the refractive index adjustment process. First, in Step S501, the determiner 343 reads the value to be measured set in Step S1 in FIG. 6 from the user's condition storage area 354 of the second storage 35, and determines whether the selected value to be measured is the thickness of a transparent object, which is the measurement target 1. When the value to be measured is determined to be not the thickness of a transparent object (Step S501: No), which means that the refractive index of the transparent object, which is the measurement target 1, is not required to be considered during measurement of the measurement target 1, then the process goes to Step S506 to set an optimization completion flag FO and terminate the refractive index adjustment process. When the value to be measured is determined to be the thickness of a transparent object (Step S501: Yes), the process goes to Step S502.

In Steps S502 to S506 in Embodiment 5, which correspond to Steps S101 to S105 in Embodiment 1, the setpoint Ox for refractive index is adjusted in the same procedure as in Embodiment 1, instead of the setpoint Jx for measurement mode in Embodiment 1. The optimization completion flag FX set in Step S506 in this process corresponds to the optimization completion flag FO indicating completion of the refractive index adjustment process. The optimized setpoint X_opt retained in the optimized-setpoint storage area 356 corresponds to an optimized setpoint O_opt for refractive index. In Step S40 of the applying-setpoint automatic adjustment process in FIG. 14, the setting of the optimization completion flag FO is confirmed, which indicates completion of the adjustment of the setpoint Ox for refractive index.

In the setpoint adjustment apparatus for the displacement meter 10 according to Embodiment 5, during preliminary adjustment of the applying setpoint Yy among the setpoints Ox for refractive index on the basis of measurement of the reference workpiece, when the measurement value is within the range of the desired measurement value 352, the applying setpoint Yy (setpoint Ox for refractive index) used in acquisition of the measurement value determined to be within the range of the desired measurement value 352 is employed as the applying setpoint Yy to be used in inspection of the measurement target 1, as in any one of Embodiments 1 to 4. When the measurement value is out of the range of the desired measurement value 352, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Ox+1 for refractive index) is within the range of the desired measurement value 352. This configuration can adjust the applying setpoint Yy for refractive index while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 5, during preliminary adjustment of the applying setpoint Yy among the setpoints Ox for refractive index on the basis of measurement of the reference workpiece, when the measurement value based on the initial setpoint O1 is within the range of the desired measurement value 352, the initial setpoint O1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Ox+1 for refractive index) different from the initial setpoint O1 for refractive index. This configuration can adjust the applying setpoint Yy for refractive index while reducing the burden of determination and operation on a user during preliminary adjustment of the applying setpoint Yy on the basis of measurement of the reference workpiece.

In addition, in the setpoint adjustment apparatus for the displacement meter 10 according to Embodiment 5, the updater 345 causes the applying setpoint Yy used in acquisition of either one of the measurement values, which include the measurement value (first measurement value) acquired using the applying setpoint Yy (first applying setpoint, setpoint Ox for refractive index) before being changed by the changer 344 and the measurement value (second measurement value) acquired using the applying setpoint Yy (second applying setpoint, setpoint Ox+1 for refractive index) after being changed by the changer 344, closer to the desired measurement value 352 as the applying setpoint Yy to be used in measurement of the measurement target 1, as in any one of Embodiments 1 to 4. This configuration can update the applying setpoint Yy for refractive index to an appropriate setpoint Ox while reducing the burden of determination and operation on a user during preliminary adjustment of the applying setpoint Yy on the basis of measurement of the reference workpiece.

Embodiment 6

A setpoint adjustment system for the displacement meter 10 according to Embodiment 6 will now be described with reference to FIGS. 21 to 23. The component identical to that in any one of Embodiments 1 to 5 is provided with the same reference symbol without detailed description.

Figure 22:
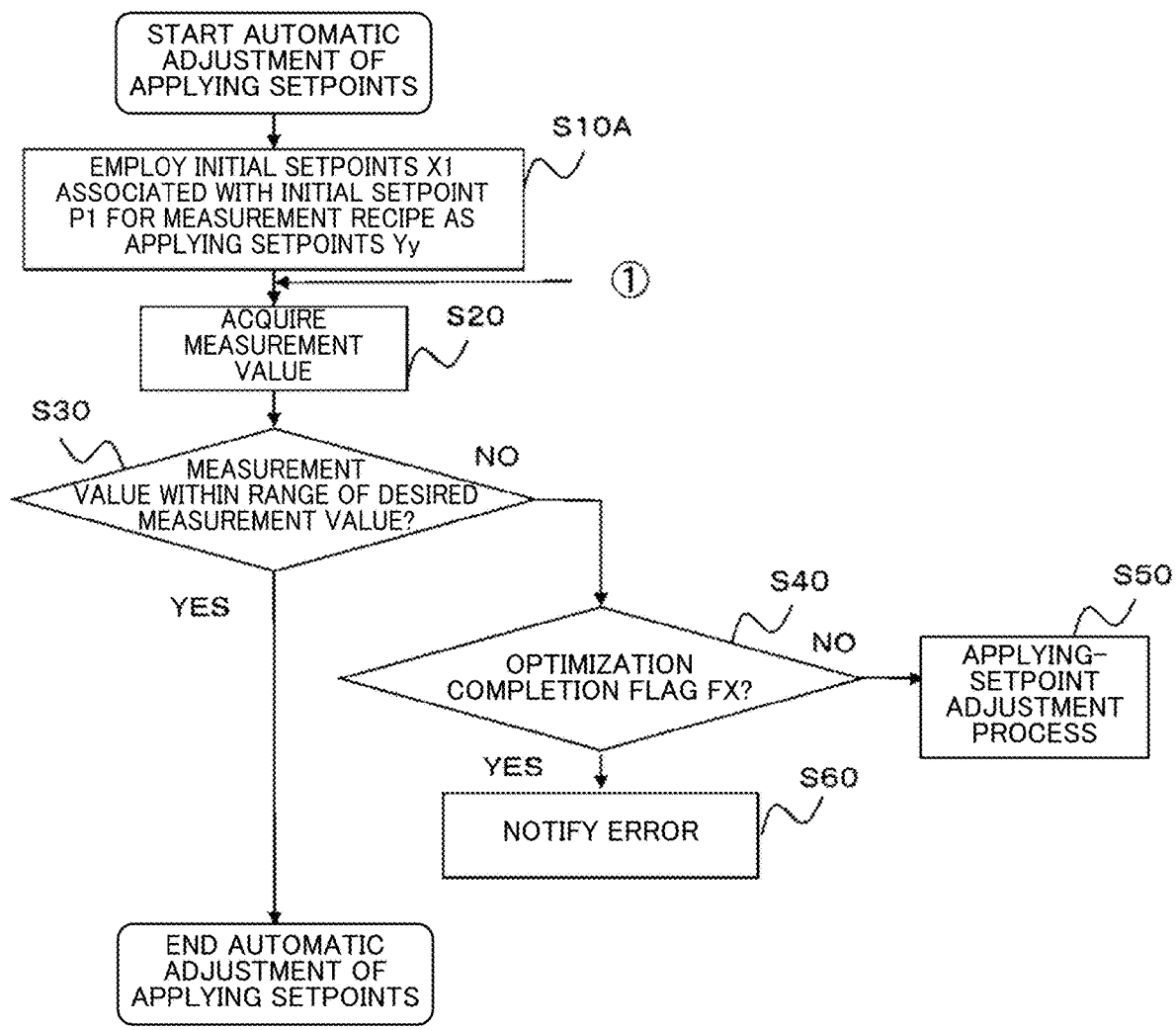
FIG. 22 is a flowchart illustrating an applying-setpoint automatic adjustment process executed in a PC in Embodiment 6 of the disclosure.

In the setpoint adjustment system for the displacement meter 10 according to Embodiment 6, the applying-setpoint automatic adjustment process in FIG. 14 is replaced with an applying-setpoint automatic adjustment process in FIG. 22. Specifically, Embodiment 6 differs from Embodiment 1 in that Step S10 is replaced with Step S10A, and that a measurement recipe adjustment process in FIG. 23 is applied to the applying-setpoint adjustment process in Step S50 instead of the measurement mode adjustment process in FIG. 15 in Embodiment 1. The processes in Embodiment 6 are identical to those in Embodiment 1 except for the measurement recipe adjustment process, and the identical processes will not be redundantly explained.

The measurement recipe, which is not described in Embodiment 1, will now be described with reference to a measurement recipe table 60 in FIG. 21.

Each of the setpoints Px for measurement recipe is associated with the setpoints Ix, Jx, Kx, Lx, Mx, Nx, Ox . . . for multiple attributes, that is, one setpoint for each attribute, depending on the physical properties of the measurement target 1 and the value to be measured. Exemplary setpoints Px for measurement recipe include multiple setpoints P1, P2, P3 . . . that respectively indicate a measurement recipe A suitable for a measurement target 1 having normal surface physical properties, a measurement recipe B suitable for a metal measurement target 1 having a non-mirror surface, a measurement recipe C suitable for a mirror-finished or transparent measurement target 1, a measurement recipe D suitable for measurement of a gap between transparent objects of a measurement target 1, a measurement recipe E suitable for measurement of the thickness of a transparent object of a measurement target 1, a measurement recipe F suitable for a metal measurement target 1 having a mirror surface, and a measurement recipe G suitable for a patterned-glass measurement target 1. In this embodiment, the initial value P1 of the setpoint Px for measurement recipe indicates the measurement recipe A.

The following description is directed to the measurement recipe A, so as to describe an example of the setpoints Ix, Jx, Kx, Lx, Mx, Nx, Ox . . . for individual attributes associated with the setpoint Px for measurement recipe. As illustrated in FIG. 21, the setpoint P1 indicating the measurement recipe A is preliminarily associated, by a manufacturer or the like, with 50% indicated by the initial value I1 of the setpoint Ix for light emission, the diffuse reflection mode indicated by the initial value J1 of the setpoint Jx for measurement mode, the moving average filter indicated by the initial value K1 of the setpoint Kx for filter type, 128 times indicated by the initial value L1 of the setpoint Lx for moving-average calculation times, and 40 μm indicated by the initial value M1 of the setpoint Mx for sampling period. The setpoint P1 indicating the measurement recipe A is not associated with the setpoint Nx for cut-off frequency or the setpoint Ox for refractive index, which are not used. The other setpoints Px for measurement recipe are also preliminarily associated with the setpoints Ix, Jx, Kx, Lx, Mx, Nx, Ox . . . for individual attributes, for example, as illustrated in FIG. 21.

First, in Step S10A of the applying-setpoint automatic adjustment process in FIG. 22, the setter 342 employs, as the applying setpoints Yy, the setpoints Xx J1, K1, L1, M1, none, none . . . ) for individual attributes associated with the setpoint P1 indicating the measurement recipe A, which is the initial value P1 of the setpoint Px for measurement recipe. In Step S10 in Embodiment 1, the setpoints I1, J1, K1, L1, M1, N1, O1 . . . except for the setpoint Px for measurement recipe are stored into the applying-setpoint storage area 355. In contrast, in Step S10A of the applying-setpoint automatic adjustment process in Embodiment 6, the initial setpoints for individual attributes also include the setpoint P1 indicating the measurement recipe A, which is the setpoint Px for measurement recipe. That is, the setpoints Xx for individual attributes associated with the setpoint P1 indicating the measurement recipe A and the setpoint P1 indicating the measurement recipe A are stored into the applying-setpoint storage area 355 as the applying setpoints Yy in Step S10A. The setter 342 then transmits the setpoints Xx for individual attributes associated with the setpoint P1 indicating the measurement recipe A, which are the applying setpoints Yy for individual attributes stored in the applying-setpoint storage area 355 except for the setpoint P1 indicating the measurement recipe A, to the PLC 20. The first controller 22 of the PLC 20 then stores the received applying setpoints Yy for individual attributes into the applying-setpoint storage area 232 of the first storage 23. Then, Steps S20 to S60 are executed in the applying-setpoint automatic adjustment process in FIG. 22, as in Embodiment 1.

The applying-setpoint adjustment process in Step S50 in Embodiment 6 will now be explained. Step S50 involves the measurement recipe adjustment process in FIG. 23. First, in Step S601, the determiner 343 reads the value to be measured set in Step S1 in FIG. 6 from the user's condition storage area 354 of the second storage 35, and determines whether the selected value to be measured is a gap between transparent objects or the thickness of a transparent object in the measurement target 1. When the selected value to be measured is determined to be a gap between transparent objects or the thickness of a transparent object (Step S601: Yes), the process goes to Step S602.

In Step S602, the changer 344 reads the setpoints Xx (Ix, Jx, Kx, Lx, Mx, Nx, Ox . . . ) for individual attributes associated with the setpoint Px for measurement recipe, which corresponds to the value to be measured read from the user's condition storage area 354, from the entire setpoints 351 in the second storage 35. Specifically, when the value to be measured is a gap between transparent objects, the changer 344 reads the setpoints Ix (20%), Jx (regular reflection mode), Kx (moving average filter), Lx (128 times), Mx (40 μs), Nx (none), Ox (none) . . . for individual attributes associated with the measurement recipe D (refer to FIG. 21) indicated by the setpoint Px for measurement recipe corresponding to a gap between transparent objects. In contrast, when the value to be measured is the thickness of a transparent object, the changer 344 reads the setpoints Ix (20%), Jx (regular reflection mode), Kx (moving average filter), Lx (128 times), Mx (40 μs), Nx (none), Ox (1.5000) . . . for individual attributes associated with the measurement recipe E (refer to FIG. 21) indicated by the setpoint Px for measurement recipe corresponding to the thickness of a transparent object. The changer 344 stores the read setpoints Xx for individual attributes into the applying-setpoint storage area 355, and thus employs the read setpoints Xx for individual attributes as the applying setpoints Yy to be subsequently used. The changer 344 transmits the setpoints Xx for individual attributes, which are the applying setpoints Yy that are stored in the applying-setpoint storage area 355 and will be subsequently used, to the PLC 20. The first controller 22 then stores and sets the setpoints Xx for individual attributes, which are the applying setpoints Yy to be subsequently used, into the applying-setpoint storage area 232. The process then goes to Step S607.

When the selected value to be measured is determined to be not a gap between transparent objects or the thickness of a transparent object in Step S601 (Step S601: No), the process goes to Step S603.

In Steps S603 to S607 in Embodiment 6, which correspond to Steps S101 to S105 in Embodiment 1, not only the setpoint Jx for measurement mode in Embodiment 1 but also the setpoints Xx (Ix, Jx, Kx, Lx, Mx, Nx, Ox . . . ) for individual attributes associated with the setpoint Px for measurement recipe are adjusted on the basis of the setpoint Px for measurement recipe, in the same procedure as in Embodiment 1.

Specifically, in Step S604, the changer 344 changes the setpoint Px for measurement recipe with which the measurement value has already been acquired to a different setpoint Px+1, and reads the setpoints Xx (Ix, Jx, Kx, Lx, Mx, Nx, Ox . . . ) for individual attributes associated with the setpoint Px+1 for measurement recipe, from the entire setpoints 351 in the second storage 35. The changer 344 then stores the setpoint Px+1 for measurement recipe and the setpoints Xx (Ix, Jx, Kx, Lx, Mx, Nx, Ox . . . ) for individual attributes associated with the setpoint Px+1 for measurement recipe into the applying-setpoint storage area 355, and thus employs the setpoints Xx for individual attributes as the applying setpoints Yy to be subsequently used. The changer 344 then transmits the setpoints Xx for individual attributes (the setpoints Xx (Ix, Jx, Kx, Lx, Mx, Nx, Ox . . . ) for individual attributes associated with the setpoint Px+1 for measurement recipe, except for the setpoint Px+1 for measurement recipe), which are the applying setpoints Yy that are stored in the applying-setpoint storage area 355 and will be subsequently used, to the PLC 20. The first controller 22 then stores and sets the setpoints Xx for individual attributes (the setpoints Xx (Ix, Jx, Kx, Lx, Mx, Nx, Ox . . . ) for individual attributes associated with the setpoint Px+1 for measurement recipe), which are the applying setpoints Yy to be subsequently used, into the applying-setpoint storage area 232.

The optimization completion flag FX set in Step S607 corresponds to an optimization completion flag FP indicating completion of the measurement recipe adjustment process. The optimized setpoint X_opt retained in the optimized-setpoint storage area 356 corresponds to an optimized setpoint P_opt for measurement recipe and the setpoints Xx (Ix, Jx, Kx, Lx, Mx, Nx, Ox . . . ) for individual attributes associated with the optimized setpoint P_opt for measurement recipe. In Step S40 of the applying-setpoint automatic adjustment process in FIG. 22, the setting of the optimization completion flag FP is confirmed, which indicates completion of the adjustment of the setpoint Px for measurement recipe.

In Embodiment 6, the setpoints Xx for individual attributes associated with the setpoint Px for measurement recipe include all of the setpoint Ix for light emission, the setpoint Jx for measurement mode, the setpoint Kx for filter type, the setpoint Lx for moving-average calculation times, the setpoint Mx for sampling period, the setpoint Nx for cut-off frequency, the setpoint Ox for refractive index, and the like. This configuration, however, is a mere example. For example, the setpoints Xx for two or more attributes among the setpoint Ix for light emission, the setpoint Jx for measurement mode, the setpoint Kx for filter type, the setpoint Lx for moving-average calculation times, the setpoint Mx for sampling period, the setpoint Nx for cut-off frequency, the setpoint Ox for refractive index, and the like, may be associated with the setpoint Px for measurement recipe.

In the setpoint adjustment apparatus for the displacement meter 10 according to Embodiment 6, during preliminary adjustment of the applying setpoints Yy among the setpoints Px for measurement recipe on the basis of measurement of the reference workpiece, when the measurement value is within the range of the desired measurement value 352, the applying setpoints Yy (setpoints Xx for individual attributes associated with the setpoint Px for measurement recipe) used in acquisition of the measurement value determined to be within the range of the desired measurement value 352 are employed as the applying setpoints Yy to be used in inspection of the measurement target 1, as in any one of Embodiments 1 to 5. When the measurement value is out of the range of the desired measurement value 352, the changer 344 changes the applying setpoint from the applying setpoints Yy used in acquisition of the measurement value to different applying setpoints Yy, the acquirer 341 re-acquires a measurement value using the changed applying setpoints Yy, and the determiner 343 re-determines whether the measurement value acquired using the changed applying setpoints Yy (setpoints Xx for individual attributes associated with the setpoint Px+1 for measurement recipe) is within the range of the desired measurement value 352. This configuration can adjust the applying setpoint Yy for measurement recipe while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 6, during preliminary adjustment of the applying setpoints Yy on the basis of measurement of the reference workpiece using the setpoints Xx for individual attributes associated with the setpoint Px for measurement recipe, when the measurement value based on the initial setpoint P1 is within the range of the desired measurement value 352, the setpoints Xx for individual attributes associated with the initial setpoint P1 are employed as the applying setpoints Yy to be used in inspection of the measurement target 1. In contrast, when the measurement value is out of the range of the desired measurement value 352, the changer 344 changes the applying setpoints Yy to setpoints (for example, the setpoints Xx for individual attributes associated with the setpoint Px+1 for measurement recipe) different from the initial setpoint P1. This configuration can adjust the applying setpoints Yy while reducing the burden of determination and operation on a user during preliminary adjustment of the applying setpoints Yy on the basis of measurement of the reference workpiece using the setpoint Px for measurement recipe.

In addition, in the setpoint adjustment apparatus for the displacement meter 10 according to Embodiment 6, the updater 345 causes the applying setpoints Yy used in acquisition of either one of the measurement values, which include the measurement value (first measurement value) acquired using the applying setpoints Yy (first applying setpoints, setpoints Xx for individual attributes associated with the setpoint Px for measurement recipe) before being changed by the changer 344 and the measurement value (second measurement value) acquired using the applying setpoints Yy (second applying setpoints, setpoints Xx for individual attributes associated with the setpoint Px+1 for measurement recipe) after being changed by the changer 344, closer to the desired measurement value 352 as the applying setpoints Yy to be used in measurement of the measurement target 1, as in any one of Embodiments 1 to 5. This configuration can update the applying setpoint Yy for measurement recipe to an appropriate setpoint Px while reducing the burden of determination and operation on a user during preliminary adjustment of the applying setpoint Yy on the basis of measurement of the reference workpiece.

Embodiment 7

A setpoint adjustment system for the displacement meter 10 according to Embodiment 7 will now be described with reference to FIGS. 13, 14, 24, and 25. The component identical to that in any one of Embodiments 1 to 6 is provided with the same reference symbol without detailed description.

Figure 24:
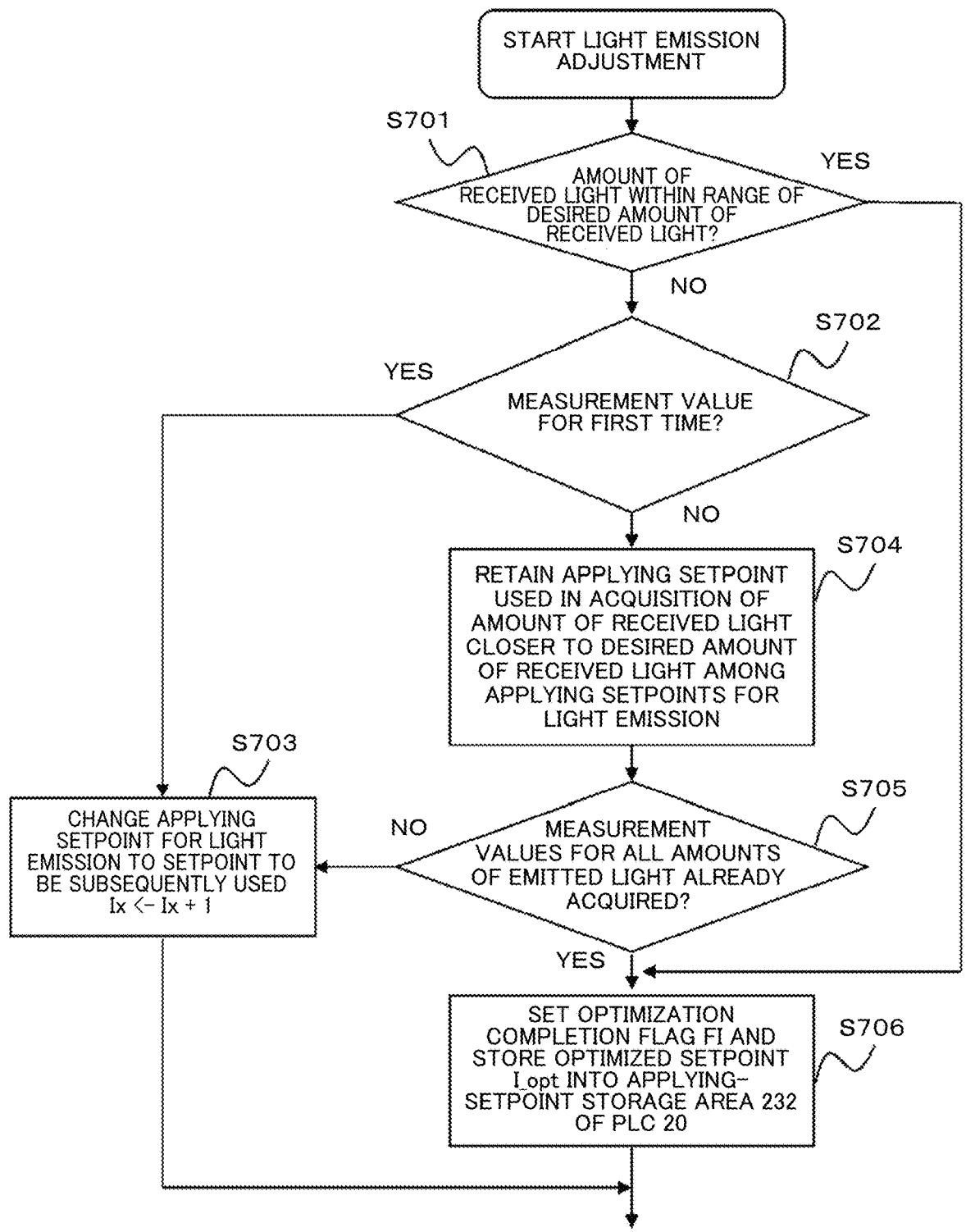
FIG. 24 is a flowchart illustrating a light emission adjustment process executed in a PC in Embodiment 7 of the disclosure.

The setpoint adjustment system for the displacement meter 10 according to Embodiment 7 differs from that according to Embodiment 1 in that a light emission adjustment process in FIG. 24 is applied to the applying-setpoint adjustment process in Step S50 in FIG. 14 instead of the measurement mode adjustment process in FIG. 15 in Embodiment 1. The processes in Embodiment 7 are identical to those in Embodiment 1 except for the light emission adjustment process, and the identical processes will not be redundantly explained.

Embodiment 7 involves the desired amount 353 of received light, which is not described in Embodiment 1. The second storage 35 of the PC 30 also stores the desired amount 353 of received light, defined as one of the measurement conditions of the displacement meter 10, in addition to the entire setpoints 351 and the desired measurement value 352. The desired amount 353 of received light is preliminarily defined by a manufacturer, for example. When the amount of received light from the displacement meter 10 is out of the range of the desired amount 353 of received light, a measurement value cannot be appropriately acquired. Specifically, when the amount of received light from the displacement meter 10 is smaller than the desired amount 353 of received light, the received light waveform displayed in the display region 760 in FIG. 13 has a small peak P, for example. The peak P of the received light waveform thus has a large width, resulting in low accuracy of detection of the top of the peak P in the horizontal axis indicating the positions of the pixels corresponding to the respective light receiving elements in the image sensor 6. This result leads to low accuracy of measurement value. In contrast, when the amount of received light from the displacement meter 10 is larger than the desired amount 353 of received light, the received light waveform displayed in the display region 760 in FIG. 13 has an extremely large peak P, for example. When the top of the peak P of the received light waveform exceeds the detectable range (range between 0 and 1,000 in the vertical axis in the example illustrated in FIG. 13), the received light waveform is deemed as a trapezoidal waveform without the top of the peak P, resulting in failure in detection of the top of the peak P in the horizontal axis. This result leads to low accuracy of measurement value. In order to avoid such a problem, the setpoint Ix for light emission is adjusted so as to provide the amount of received light within the desired amount 353 of received light in Embodiment 7. The desired amount 353 of received light may be a range between the lower and upper limits of the desired amount of received light, such as the range of 400 to 800, or may be a certain value, such as 600.

Step S50 in FIG. 14 involves the light emission adjustment process. First, as illustrated in FIG. 24, the determiner 343 determines whether the amount of received light from the displacement meter 10 is within the range of the desired amount 353 of received light in Step S701. When the amount of received light is determined to be within the range of the desired amount 353 of received light (Step S701: Yes), which means that the amount of received light from the displacement meter 10 during measurement of the reference workpiece using the initial setpoint I1 for light emission used in acquisition of the measurement value is within an appropriate range, then the process goes to Step S706. When the amount of received light is determined to be out of the range of the desired amount 353 of received light (Step S701: No), the process goes to Step S702.

In Steps S702 to S706 in Embodiment 7, which correspond to Steps S101 to S105 in Embodiment 1, the setpoint Ix for light emission is adjusted in the same procedure as in Embodiment 1, instead of the setpoint Jx for measurement mode in Embodiment 1.

In Step S704, the acquired amount of received light and the desired amount 353 of received light are used, instead of the acquired measurement value and the desired measurement value 352 used in Step S603 in Embodiment 1. Specifically, the updater 345 causes the applying setpoint Yy for light emission used in acquisition of either one of the amounts of received light, which are the amount of received light (first amount of received light) acquired using the applying setpoint Yy (first applying setpoint, Ix in Embodiment 7) for light emission retained in the optimized-setpoint storage area 356 and the amount of received light (second amount of received light) acquired using a new applying setpoint Yy (second applying setpoint, Ix+1 in Embodiment 7) for light emission after being changed by the changer 344, closer to the desired amount 353 of received light to be retained in the optimized-setpoint storage area 356.

The optimization completion flag FX set in Step S706 corresponds to an optimization completion flag FI indicating completion of the light emission adjustment process. The optimized setpoint X_opt retained in the optimized-setpoint storage area 356 corresponds to an optimized setpoint I_opt for light emission. In Step S40 of the applying-setpoint automatic adjustment process in FIG. 14, the setting of the optimization completion flag FI is confirmed, which indicates completion of the adjustment of the setpoint Ix for light emission.

Figure 25:
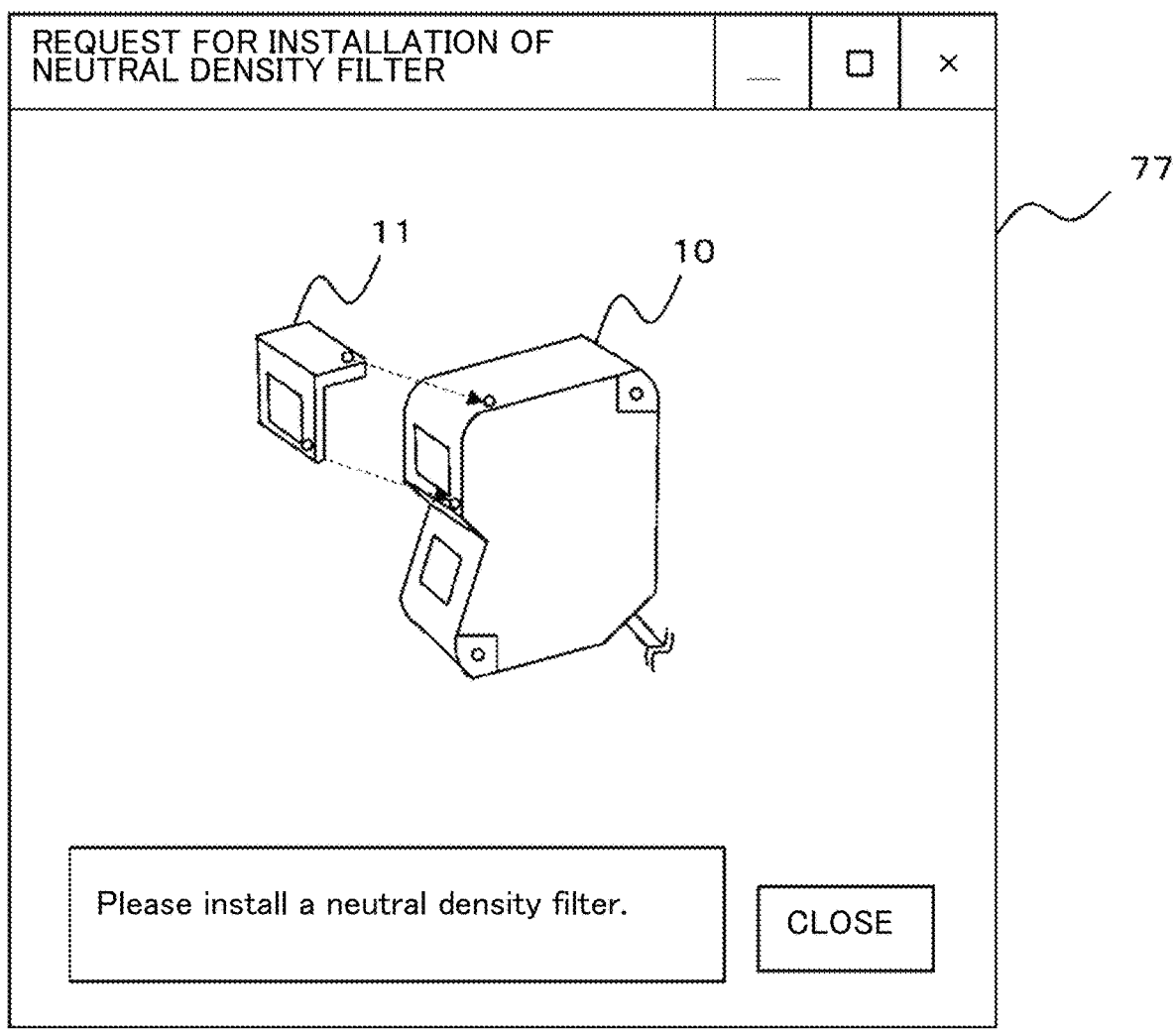
FIG. 25 illustrates a window for requesting installation of a neutral density filter to a displacement meter in Embodiment 7 of the disclosure.

In Step S60 of the applying-setpoint automatic adjustment process in FIG. 14, the display controller 346 causes the display device 31 to display an error screen, so as to notify the user that the applying-setpoint automatic adjustment process has failed to adjust the setpoint Ix for light emission for appropriate measurement of a measurement value. More preferably, in Embodiment 7, in the case where the determiner 343 determines that the amount of received light is still larger than the upper limit of the desired amount of received light even if the minimum setpoint of 0.01% among the setpoints Ix for light emission is employed as the applying setpoint, the display controller 346 may cause the display device 31 to display a window 77 for requesting installation of a neutral density filter so as to facilitate the user to install a neutral density filter 11 to the displacement meter 10, as illustrated in FIG. 25. The installation of the neutral density filter 11 is required, because even the minimum setpoint Ix for light emission employed as the applying setpoint Yy in the displacement meter 10 cannot avoid an excessively large amount of received light, which means that the adjustment of the setpoint Ix for light emission alone is not sufficient.

As described above, in the setpoint adjustment apparatus for the displacement meter 10 according to Embodiment 7, during adjustment of the applying setpoint Yy among the setpoints Ix for light emission in parallel to measurement of the reference workpiece, when the measurement value is within the range of the desired measurement value 352, the applying setpoint Yy (setpoint Ix for light emission) used in acquisition of the measurement value determined to be within the range of the desired measurement value 352 is employed as the applying setpoint Yy to be used in inspection of the measurement target 1. In contrast, when the measurement value is out of the range of the desired measurement value 352 and when the amount of received light is out of the range of the desired amount 353 of received light, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Ix+1 for light emission) is within the range of the desired measurement value 352. This configuration can adjust the applying setpoint Yy for light emission while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 7, during preliminary adjustment of the applying setpoint Yy among the setpoints Ix for light emission on the basis of measurement of the reference workpiece, when the measurement value based on the initial setpoint I1 is within the range of the desired measurement value 352, the initial setpoint I1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Ix+1 for light emission) different from the initial setpoint I1 for light emission. This configuration can adjust the applying setpoint Yy for light emission while reducing the burden of determination and operation on a user during preliminary adjustment of the applying setpoint Yy on the basis of measurement of the reference workpiece.

In addition, in the setpoint adjustment apparatus for the displacement meter 10 according to Embodiment 7, the updater 345 causes the applying setpoint Yy used in acquisition of either one of the amounts of received light, which include the amount of received light (first amount of received light) acquired using the applying setpoint Yy for light emission (first applying setpoint, setpoint Ix for light emission) before being changed by the changer 344 and the amount of received light (second amount of received light) acquired using the applying setpoint Yy for light emission (second applying setpoint, setpoint Ix+1 for light emission) after being changed by the changer 344, closer to the desired amount 353 of received light as the applying setpoint Yy to be used in measurement of the measurement target 1. This configuration can update the applying setpoint Yy for light emission to an appropriate setpoint Ix while reducing the burden of determination and operation on a user during preliminary adjustment of the applying setpoint Yy on the basis of measurement of the reference workpiece.

Embodiment 8

A setpoint adjustment system for the displacement meter 10 according to Embodiment 8 will now be described with reference to FIGS. 14 and 26. The component identical to that in any one of Embodiments 1 to 7 is provided with the same reference symbol without detailed description.

Figure 26:
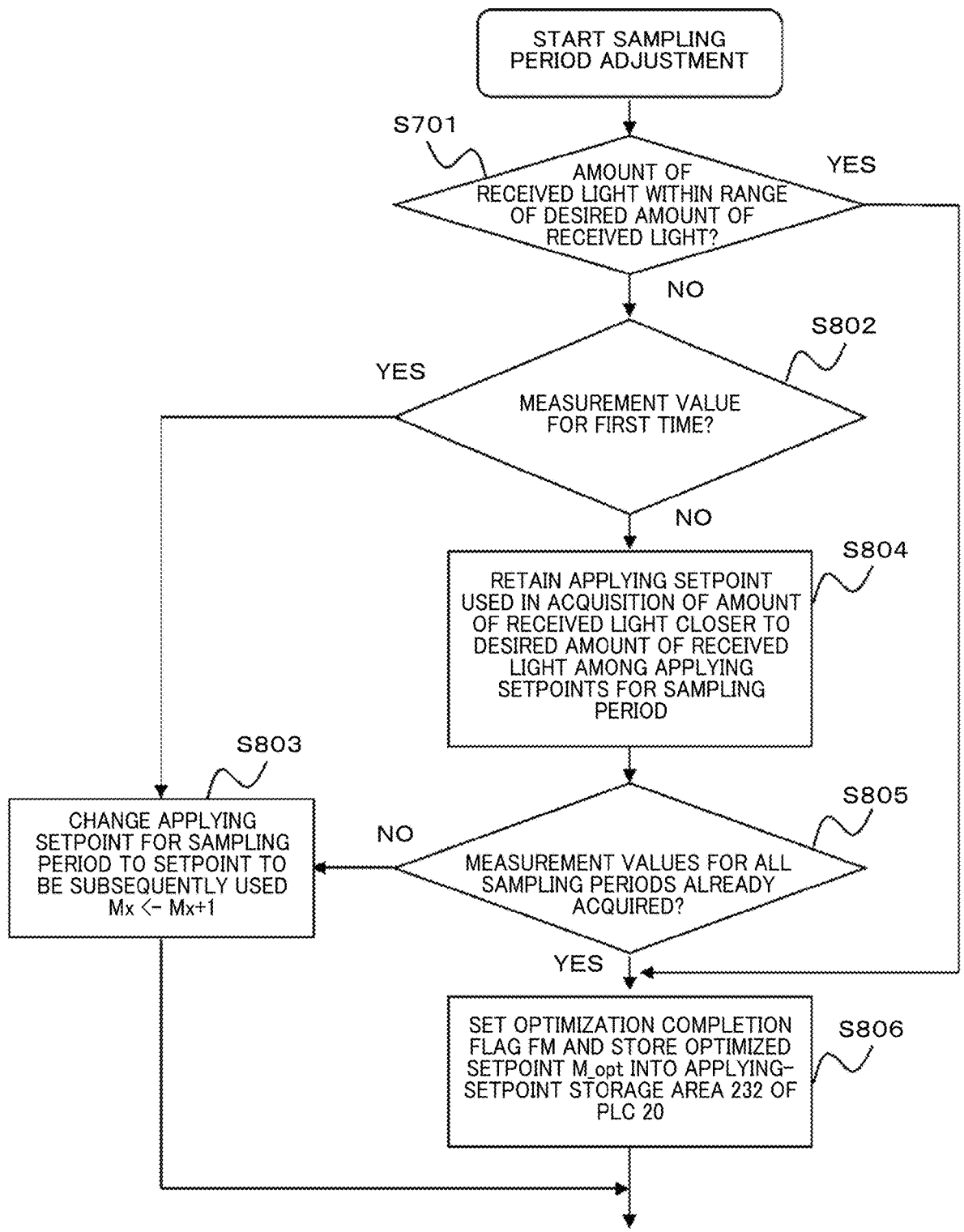
FIG. 26 is a flowchart illustrating a sampling period adjustment process executed in a PC in Embodiment 8 of the disclosure.

The setpoint adjustment system for the displacement meter 10 according to Embodiment 8 differs from that according to Embodiment 1 in that a sampling period adjustment process in FIG. 26 is applied to the applying-setpoint adjustment process in Step S50 in FIG. 14 instead of the measurement mode adjustment process in FIG. 15 in Embodiment 1. The processes in Embodiment 8 are identical to those in Embodiment 1 except for the sampling period adjustment process, and the identical processes will not be redundantly explained.

Steps S701 to S806 of the sampling period adjustment process in Embodiment 8 are identical to Steps S701 to S706 of the light emission adjustment process in Embodiment 7 except for the point described below.

Specifically, the setpoint Mx for sampling period is adjusted, instead of the setpoint Ix for light emission in Embodiment 7.

The optimization completion flag FX set in Step S806 corresponds to an optimization completion flag FM indicating completion of the sampling period adjustment process. The optimized setpoint X_opt retained in the optimized-setpoint storage area 356 corresponds to an optimized setpoint M_opt for sampling period. In Step S40 of the applying-setpoint automatic adjustment process in FIG. 14, the setting of the optimization completion flag FM is confirmed, which indicates completion of the adjustment of the setpoint Mx for sampling period.

In Step S60 of the applying-setpoint automatic adjustment process in FIG. 14, the display controller 346 causes the display device 31 to display an error screen so as to notify the user that the applying-setpoint automatic adjustment process has failed to adjust the setpoint Mx for sampling period for appropriate measurement of a measurement value. More preferably, in Embodiment 8, in the case where the determiner 343 determines that the amount of received light is still larger than the upper limit of the desired amount of received light even if the minimum setpoint of 10 µs among the setpoints Mx for sampling period is employed as the applying setpoint, the display controller 346 may cause the display device 31 to display the window 77 for requesting installation of a neutral density filter in FIG. 25, as in Embodiment 7. The installation of the neutral density filter is required, because even the minimum setpoint Mx for sampling period employed in the displacement meter 10 cannot avoid an excessively large amount of received light, which means that the adjustment of the setpoint Mx for sampling period alone is not sufficient.

As described above, in the setpoint adjustment apparatus for the displacement meter 10 according to Embodiment 8, during adjustment of the applying setpoint Yy among the setpoints Mx for sampling period in parallel to measurement of the reference workpiece, when the measurement value is within the range of the desired measurement value 352, the applying setpoint Yy (setpoint Mx for sampling period) used in acquisition of the measurement value determined to be within the range of the desired measurement value 352 is employed as the applying setpoint Yy to be used in inspection of the measurement target 1. In contrast, when the measurement value is out of the range of the desired measurement value 352 and when the amount of received light is out of the range of the desired amount 353 of received light, the changer 344 changes the applying setpoint from the applying setpoint Yy used in acquisition of the measurement value to a different applying setpoint Yy, the acquirer 341 re-acquires a measurement value using the changed applying setpoint Yy, and the determiner 343 re-determines whether the measurement value acquired using the changed applying setpoint Yy (setpoint Mx+1 for sampling period) is within the range of the desired measurement value 352. This configuration can adjust the applying setpoint Yy for sampling period while reducing the burden of determination and operation on a user during preliminary adjustment of the applying setpoint Yy on the basis of measurement of the reference workpiece.

Furthermore, in the setpoint adjustment apparatus for the displacement meter 10 according to Embodiment 8, during preliminary adjustment of the applying setpoint Yy among the setpoints Mx for sampling period on the basis of measurement of the reference workpiece, when the measurement value based on the initial setpoint M1 is within the range of the desired measurement value 352, the initial setpoint M1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Mx+1 for sampling period) different from the initial setpoint M1 for sampling period. This configuration can adjust the applying setpoint Yy for sampling period while reducing the burden of determination and operation on a user during preliminary adjustment of the applying setpoint Yy on the basis of measurement of the reference workpiece.

In the setpoint adjustment apparatus for the displacement meter 10 according to Embodiment 8, the updater 345 causes the applying setpoint Yy used in acquisition of either one of the amounts of received light, which include the amount of received light (first amount of received light) acquired using the applying setpoint Yy for sampling period (first applying setpoint, setpoint Mx for sampling period) before being changed by the changer 344 and the amount of received light (second amount of received light) acquired using the applying setpoint Yy for sampling period (second applying setpoint, setpoint Mx+1 for sampling period) after being changed by the changer 344, closer to the desired amount 353 of received light as the applying setpoint Yy to be used in measurement of the measurement target 1. This configuration can update the applying setpoint Yy for sampling period to an appropriate setpoint Mx while reducing the burden of determination and operation on a user during preliminary adjustment of the applying setpoint Yy on the basis of measurement of the reference workpiece.

Embodiment 9

A setpoint adjustment system for the displacement meter 10 according to Embodiment 9 will now be described with reference to FIGS. 27 and 28. The component identical to that in any one of Embodiments 1 to 8 is provided with the same reference symbol without detailed description.

Figure 27:
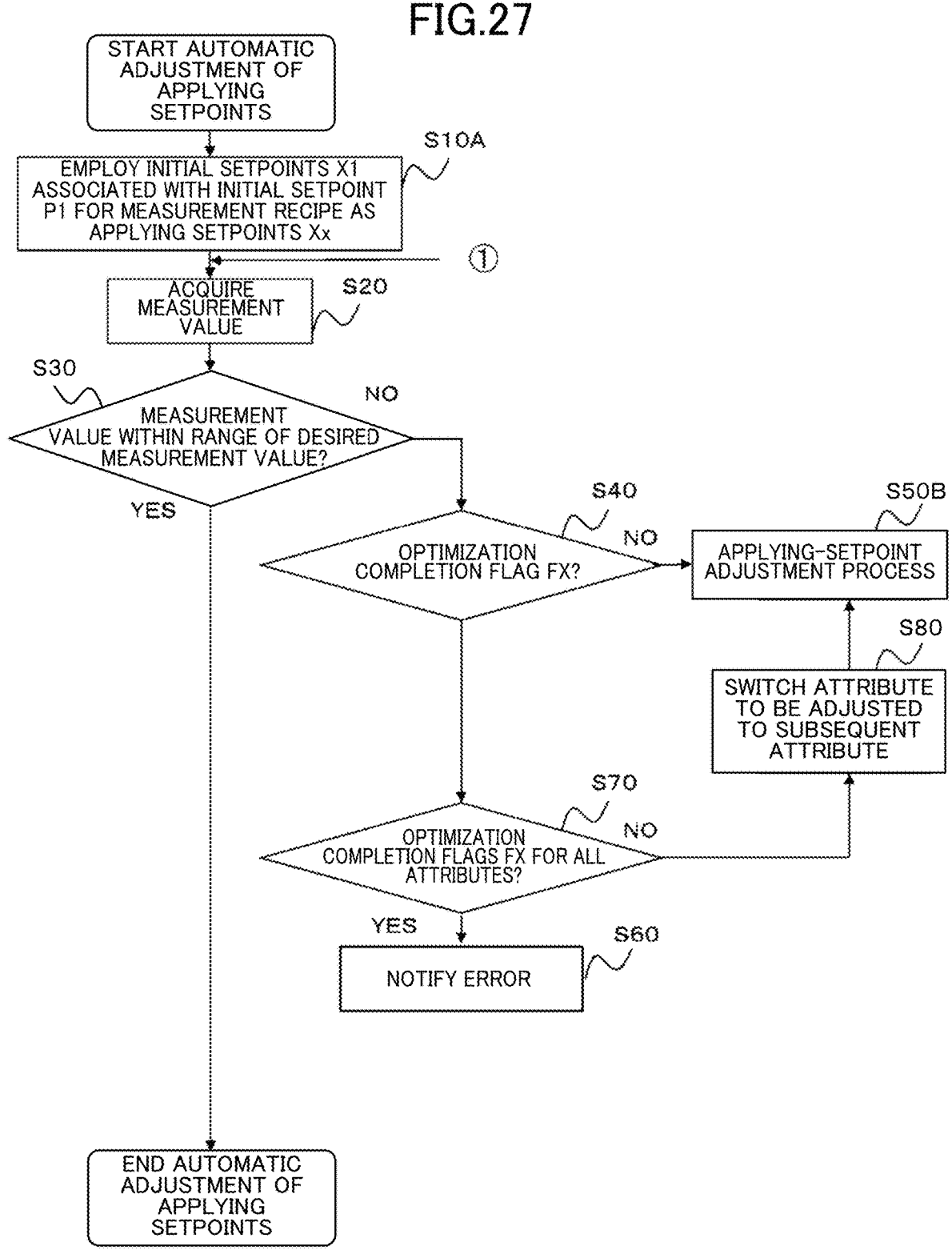
FIG. 27 is a flowchart illustrating an applying-setpoint automatic adjustment process executed in a PC in Embodiment 9 of the disclosure.

In the setpoint adjustment system for the displacement meter 10 according to Embodiment 9, the applying-setpoint automatic adjustment process in FIG. 22 in Embodiment 6 is replaced with an applying-setpoint automatic adjustment process in FIG. 27. Specifically, Steps S70 and S80 are added to the applying-setpoint automatic adjustment process in FIG. 22 in Embodiment 6. Embodiment 9 differs from any one of Embodiments 1 to 8 in that the applying-setpoint adjustment process in Step S50B, which substitutes for the applying-setpoint adjustment process in Step S50, corresponds to the combination of the measurement mode adjustment process in Embodiment 1 to the sampling period adjustment process in Embodiment 8. The processes in Embodiment 9 except for the above-mentioned points are identical to those in any one of Embodiments 1 to 8 and will not be redundantly explained in detail. In the adjustment process for a specified attribute to be adjusted among multiple attributes, whether the current measurement value is the measurement value for the first time for the specified attribute is determined in Step S603 of the measurement recipe adjustment process in Embodiment 6, Step S702 of the light emission adjustment process in Embodiment 7, Step S802 of the sampling period adjustment process in Embodiment 8, Step S101 of the measurement mode adjustment process in Embodiment 1, Step S201 of the first filter adjustment process in Embodiment 2, Step S304 of the second filter adjustment process in Embodiment 3, Step S402 of the third filter adjustment process in Embodiment 4, and Step S502 of the refractive index adjustment process in Embodiment 5. In Embodiment 9, each adjustment process for an attribute also involves determination of whether the current measurement value is the measurement value for the first time in the adjustment process for the attribute. In more detail, the measurement value for the first time in the measurement recipe adjustment process indicates the measurement value, which is acquired in Step S20 in advance of the measurement recipe adjustment process and then subject to the measurement recipe adjustment process for the first time. Also, the measurement value for the first time in the light emission adjustment process indicates the measurement value, which is acquired in Step S20 in advance of the light emission adjustment process and then subject to the light emission adjustment process for the first time. The same holds true for the adjustment processes for other attributes.

In the applying-setpoint automatic adjustment process in Embodiment 9, Steps S10A to S40 in FIG. 27 are executed first, as in Embodiment 6. In Step S40, the determiner 343 confirms the setting of the optimization completion flag FX. When the optimization completion flag FX is not set (Step S40: No), the process goes to Step S50B.

Figure 28:
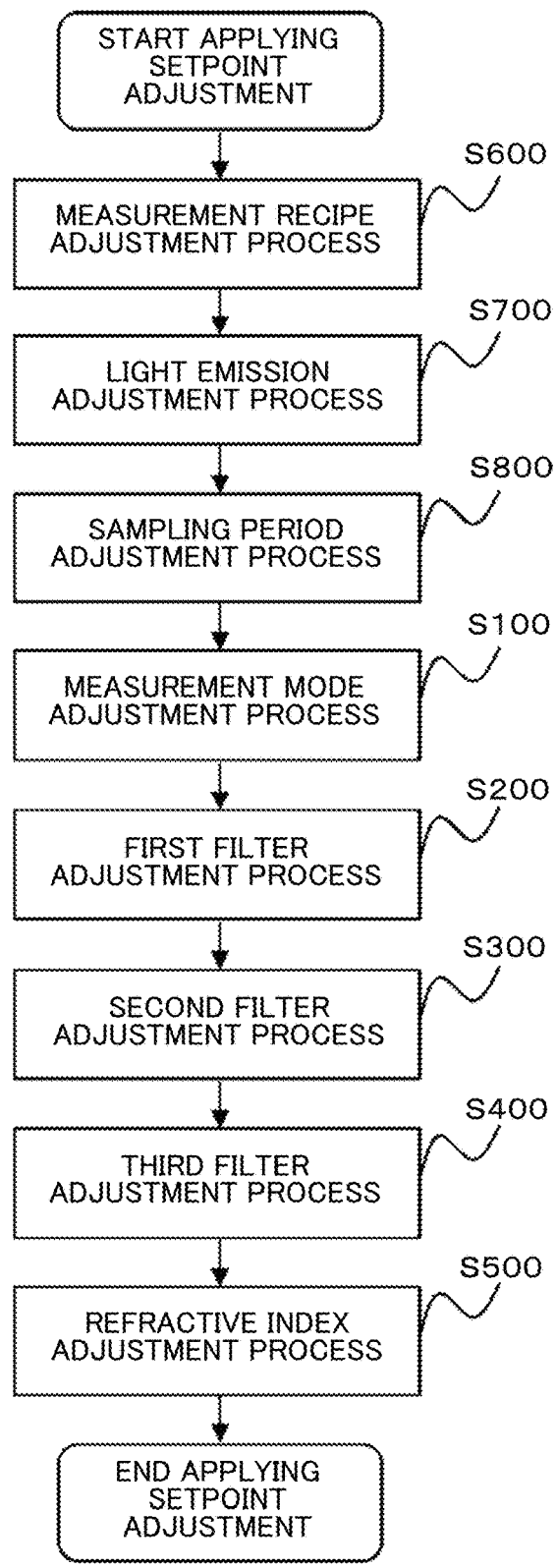
FIG. 28 is a flowchart illustrating an applying-setpoint adjustment process executed in the PC in Embodiment 9 of the disclosure.

In Step S50B, as illustrated in FIG. 28, the adjustment processes for individual attributes are executed in the order of the measurement recipe adjustment process in Step S600, the light emission adjustment process in Step S700, the sampling period adjustment process in Step S800, the measurement mode adjustment process in Step S100, the first filter adjustment process in Step S200, the second filter adjustment process in Step S300, the third filter adjustment process in Step S400, and the refractive index adjustment process in Step S500. That is, multiple attributes of the setpoints Xx are subject to adjustment. First, the measurement recipe adjustment process is executed in accordance with the order. Second, the adjustment processes (that is, the light emission adjustment process and the sampling period adjustment process) related to first attributes are executed. The first attributes affect not only the measurement value but also the amount of received light. Third, the adjustment processes (that is, the measurement mode adjustment process, the first filter adjustment process, the second filter adjustment process, the third filter adjustment process, and the refractive index adjustment process) related to second attributes are executed. The second attributes affect not the amount of received light but the measurement value.

Figure 23:
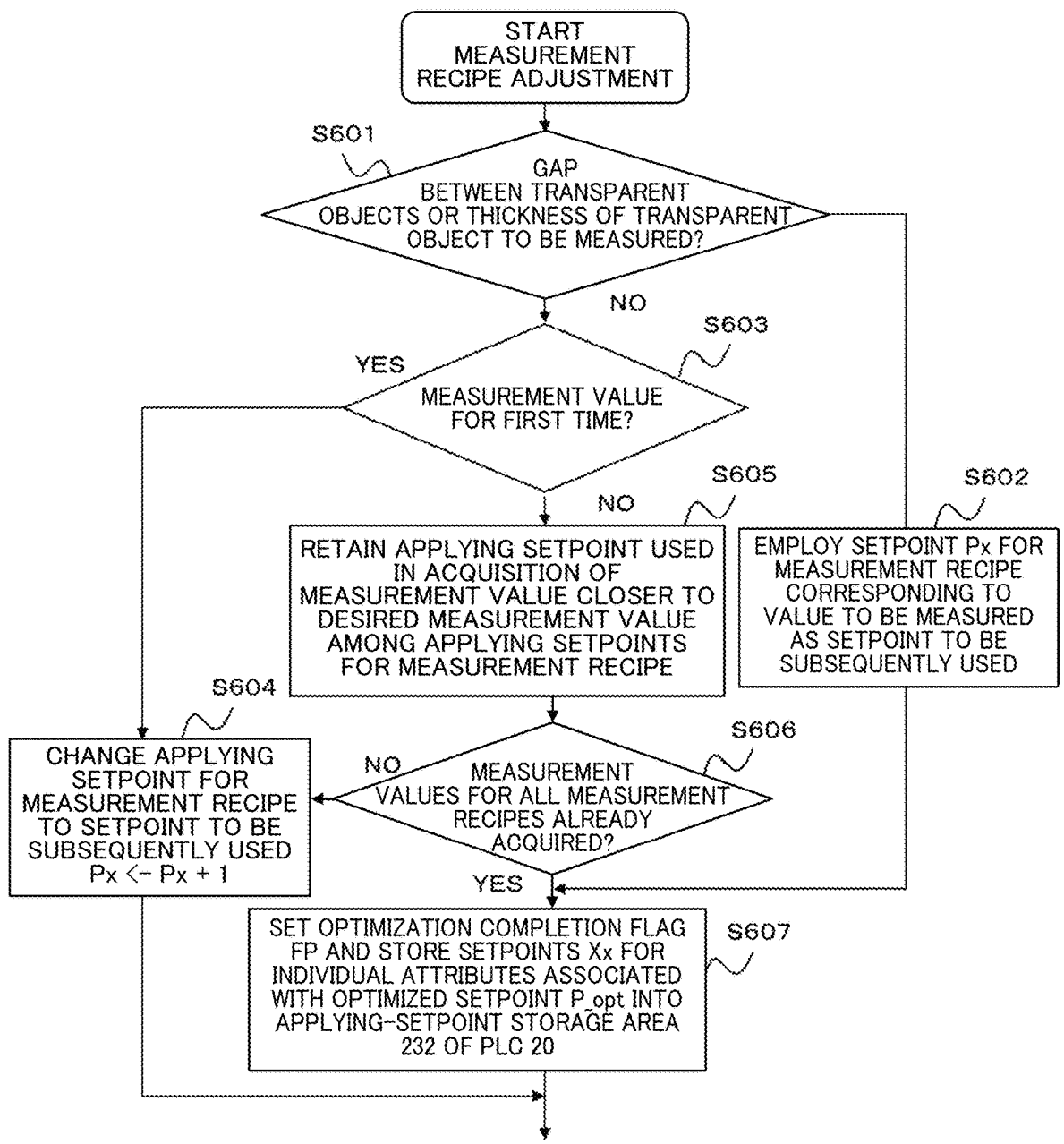
FIG. 23 is a flowchart illustrating a measurement recipe adjustment process executed in the PC in Embodiment 6 of the disclosure.

First, Step S50B involves the measurement recipe adjustment process in Step S600 (Steps S601 to S607 in FIG. 23). Specifically, the measurement recipe adjustment process in Steps S20 to S50B as the applying-setpoint adjustment process is repeated, until the updater 345 confirms that all the measurement values have already been acquired using the setpoints Xx for individual attributes associated with all the setpoints Px for measurement recipe as the applying setpoints Yy in Step S606, and the optimization completion flag FP indicating completion of the measurement recipe adjustment process is set in Step S607.

During repetition of the measurement recipe adjustment process in Steps S20 to S50B as the applying-setpoint adjustment process, when the measurement value is determined to be within the range of the desired measurement value 352 in Step S30 (Step S30: Yes), which means that a measurement value acquired from the reference workpiece using the setpoints Xx (Ix, Jx, Kx, Lx, Mx, Nx, Ox . . . ) for individual attributes, which are associated with the setpoint Px for measurement recipe used in acquisition of the measurement value determined to be within the range of the desired measurement value 352 and stored in the applying-setpoint storage area 232, falls within the appropriate range, then the applying-setpoint automatic adjustment process is terminated. Then, the setpoints Xx (Ix, Jx, Kx, Lx, Mx, Nx, Ox . . . ) for individual attributes associated with the setpoint Px for measurement recipe used in acquisition of the measurement value determined to be within the range of the desired measurement value 352 are employed as the applying setpoints Yy to be used in inspection of the measurement target 1.

In Step S40, the setting of the optimization completion flag FX is confirmed. When the optimization completion flag FX is determined to be not set (Step S40: No), the process goes to Step S50B to execute the applying-setpoint adjustment process. This process is identical to that in any one of Embodiments 1 to 8. At this stage, not all the amounts of received light and/or the measurement values have been acquired using, as the applying setpoints Yy, all the setpoints Xx (all the setpoints P1, P2, P3 . . . for measurement recipe in the measurement recipe adjustment process) belonging to the specified attribute to be adjusted (the specified attribute to be adjusted corresponds to the measurement recipe in the case of the measurement recipe adjustment process) in the applying-setpoint adjustment process. All the amounts of received light and/or the measurement values therefore need to be acquired using, as the applying setpoints Yy, all the setpoints Xx (the setpoints Xx for individual attributes associated with all the setpoints Px for measurement recipe in the case of the measurement recipe adjustment process) belonging to the specified attribute to be adjusted (the specified attribute to be adjusted corresponds to the measurement recipe in the case of the measurement recipe adjustment process). Accordingly, in Step S50B following Step S40, the setpoint Xx for the specified attribute to be currently adjusted (that is, the setpoint Px for measurement recipe in the measurement recipe adjustment process in Step S600 during adjustment of the measurement recipe) is adjusted, while the setpoints Xx (the setpoint Ix for light emission in Step S700 following Step S600 and the other setpoints during adjustment of the measurement recipe) for the other attributes are not adjusted.

In Step S607, the optimization completion flag FP is set. In step S40 of the applying-setpoint automatic adjustment process, when the determiner 343 confirms that the optimization completion flag FP is set for the first time in the applying-setpoint automatic adjustment process (Step S40: Yes), the process goes to Step S70.

In Step S70, the determiner 343 confirms the setting of all the optimization completion flags FX for all the attributes (that is, all the completion flags from the optimization completion flag FI indicating completion of the light emission adjustment process to the optimization completion flag FP indicating completion of the measurement recipe adjustment process, and the like). If not all the optimization completion flags FX for all the attributes are set in Step S70 (Step S70: No), the process goes to Step S80.

In Step S80, the changer 344 switches the attribute of the setpoint Xx to be adjusted to a subsequent attribute. Specifically, when the optimization completion flag FP indicating completion of the measurement recipe adjustment process is determined to be set in Step S40, the changer 344 switches the attribute of the setpoint Xx to be adjusted to the amount of emitted light, which is an attribute different from the measurement recipe. The process then goes to Step S50B. The order of switching the attributes is identical to the order of the adjustment processes for individual attributes in the applying-setpoint adjustment process in FIG. 28. That is, the attributes are switched in the order of the measurement recipe adjustment process, the light emission adjustment process, the sampling period adjustment process, the measurement mode adjustment process, the first filter adjustment process, the second filter adjustment process, the third filter adjustment process, and the refractive index adjustment process.

Step S50B involves the process of adjusting the setpoint Xx for the attribute to be adjusted that is changed in Step S80. Specifically, after completion of the measurement recipe adjustment process, the light emission adjustment process in Step S700 (Steps S701 to S706 in FIG. 24) is executed in order to adjust the amount of emitted light, which is a specified attribute to be subsequently adjusted different from the measurement recipe. The applying-setpoint automatic adjustment process from Steps S20 to S50B is repeated until the optimization completion flag FI indicating completion of the light emission adjustment process is set in Step S706.

The setpoint Xx for each specified attribute is adjusted in the order of Steps S20, S30, S40, and S50B of the applying-setpoint automatic adjustment process in FIG. 27, until completion of the measurement recipe adjustment process and the individual applying-setpoint adjustment processes from the light emission adjustment process to the refractive index adjustment process. The steps in the order of Steps S20, S30, S40, S70, S80, and S50B result in switching of the attribute of the setpoint Xx to be adjusted. That is, Steps S20, S30, S40, and S50B and Steps S20, S30, S40, S70, S80, and S50B of the applying-setpoint automatic adjustment process are repeated, until all the amounts of received light and/or the measurement values are acquired using all the setpoints Xx for all the attributes as the applying setpoints Yy, and the setting of all the optimization completion flags FX for all the attributes (that is, all the completion flags from the optimization completion flag FI indicating completion of the light emission adjustment process to the optimization completion flag FP indicating completion of the measurement recipe adjustment process, and the like) are confirmed in Step S70.

During repetition of Steps S20, S30, S40, and S50B and Steps S20, S30, S40, S70, S80, and S50B of the applying-setpoint automatic adjustment process, the optimized setpoints X_opt of the setpoints Xx for individual attributes are stored into the optimized-setpoint storage area 356, in Step S706 of the light emission adjustment process, Step S806 of the sampling period adjustment process, Step S105 of the measurement mode adjustment process, Step S205 of the first filter adjustment process, Step S308 of the second filter adjustment process, Step S406 of the third filter adjustment process, the Step S506 of the refractive index adjustment process, and other steps.

During repetition of the applying-setpoint adjustment process after the light emission adjustment process contained in the applying-setpoint adjustment process in Steps S20 to S50B, when the measurement value is determined to be within the range of the desired measurement value 352 in Step S30 (Step S30: Yes), which means that a measurement value acquired from the reference workpiece using the setpoints Xx for individual attributes stored in the optimized-setpoint storage area 356 falls within the appropriate range, then the applying-setpoint automatic adjustment process is terminated. That is, at this stage, the setpoints Xx for individual attributes identical to the applying setpoints Yy for individual attributes used in acquisition of the measurement value within the range of the desired measurement value 352 from the reference workpiece are retained in the optimized-setpoint storage area 356 of the PC 30, and the identical applying setpoints Yy are also stored and set in the applying-setpoint storage area 232 of the PLC 20. The setpoints Xx for individual attributes (that is, Ix, Jx, Kx, Lx, Mx, Nx, Ox . . . ) stored in the optimized-setpoint storage area 356 are thus used in actual inspection of the measurement target 1 at the displacement meter 10.

When the determiner 343 determines that all the optimization completion flags FX for all the attributes are set in Step S70 (Step S70: Yes), the process goes to Step S60. In Step S60, the determiner 343 causes the display device 31 to display an error screen, so as to notify the user that the applying-setpoint automatic adjustment process has failed to adjust the setpoints Xx for appropriate measurement of a measurement value.

Although both of the light emission adjustment process and the sampling period adjustment process are executed as the adjustment processes related to the first attributes, which affect not only the measurement value but also the amount of received light, in Embodiment 9, this configuration is a mere example. For example, at least one of the light emission adjustment process or the sampling period adjustment process may be executed as the adjustment processes related to first attributes.

In Embodiment 9, both of the light emission adjustment process and the sampling period adjustment process are executed as the adjustment processes related to the first attributes, which affect not only the measurement value but also the amount of received light. In this configuration, the light emission adjustment process may be followed by the sampling period adjustment process as in this embodiment. The sampling period adjustment process may possibly affect the tact time because of an increase in the exposure time of the image sensor 6. Such effects on the tact time can be reduced by the order of the light emission adjustment process followed by the sampling period adjustment process.

Although all of the measurement mode adjustment process, the first filter adjustment process, the second filter adjustment process, the third filter adjustment process, and the refractive index adjustment process are executed as the adjustment processes related to the second attributes, which affect not the amount of received light but the measurement value, in Embodiment 9, this configuration is a mere example. For example, at least one of the measurement mode adjustment process, the first filter adjustment process, the second filter adjustment process, the third filter adjustment process, or the refractive index adjustment process may be executed as the adjustment processes related to the second attributes.

In Embodiment 9, the adjustment processes related to the first attributes, which affect not only the measurement value but also the amount of received light, are followed by the adjustment processes related to the second attributes, which affect not the amount of received light but the measurement value. When the amount of received light is out of the range of the desired amount 353 of received light, the amount of received light may become excessively small, or the received light waveform may become a trapezoidal waveform without the top of the peak P because of an excessively large amount of received light, often resulting in failure in acquisition of an appropriate measurement value. In order to solve this problem, the adjustment processes related to the first attributes are executed in advance of the adjustment processes related to the second attributes, so that the measurement value is more likely to fall within the range of the desired measurement value in the adjustment processes related to the second attributes following the adjustment processes related to the first attributes.

In Embodiment 9, the first filter adjustment process for adjusting the setpoint Kx for filter type is executed in advance of the second filter adjustment process for adjusting the setpoint Lx for moving-average calculation times. That is, the setpoint Kx for filter type is changed before changing of the setpoint Lx for moving-average calculation times. In other words, after the setpoint K1 for moving average filter is deemed as a more appropriate setpoint Kx than any of the other setpoints Kx for filter types (for example, the low-pass and high-pass filters) and is finalized as the applying setpoint for filter type, the changer 344 switches the attribute to be adjusted to the calculation times of moving average so as to change the setpoint Lx for moving-average calculation times. This order is established because the setpoint Kx for filter type and the setpoint Lx for moving-average calculation times can be more appropriately adjusted when the finalization of the setpoint Kx for moving average filter as the setpoint Kx for filter type is followed by the adjustment of the setpoint Lx for moving-average calculation times. The following description assumes an exemplary case where the setpoint K2 for low-pass filter, which is the initial value of the setpoint Kx for filter type, is employed as the applying setpoint Yy. In this case, the adjustment of the setpoint Lx for moving-average calculation times is followed by the adjustment of the setpoint Kx for filter type, and the setpoint K1 for moving average filter is deemed as the appropriate setpoint Kx. The setpoint Lx for moving-average calculation times adjusted in advance, however, may fail to be the appropriate applying setpoint Yy. In order to avoid this problem, the finalization of the setpoint K1 for moving average filter as the setpoint Kx for filter type should be followed by the adjustment of the setpoint Lx for moving-average calculation times.

In Embodiment 9, the first filter adjustment process for adjusting the setpoint Kx for filter type is executed in advance of the third filter adjustment process for adjusting the setpoint Nx for cut-off frequency. That is, the setpoint Kx for filter type is changed in advance of changing of the setpoint Nx for cut-off frequency. In other words, after the setpoint K2 for low-pass filter or the setpoint K3 for high-pass filter is deemed as a more appropriate setpoint Kx than any of the other setpoints Kx for filter types (for example, the setpoint Kx for moving average filter) and is finalized as the applying setpoint Yy for filter type, the changer 344 switches the attribute to be adjusted from the filter type to the cut-off frequency so as to change the setpoint Nx for cut-off frequency. This order is established because the setpoint Kx for filter type and the setpoint Nx for cut-off frequency can be more appropriately adjusted when the finalization of the setpoint K2 or K3 for low-pass or high-pass filter as the setpoint Kx for filter type is followed by the adjustment of the setpoint Nx for cut-off frequency. As in this embodiment, the initial value of the setpoint Kx for filter type, which is associated with the initial setpoint P1 for measurement recipe (setpoint for measurement recipe A) is the setpoint K1 for moving average filter. The following description assumes an exemplary case where the setpoint Kx for moving average filter is employed as the applying setpoint, as described above. In this case, the adjustment of the setpoint Nx for cut-off frequency is followed by the adjustment of the setpoint Kx for filter type, and the setpoint K2 for low-pass filter or the setpoint K3 for high-pass filter is deemed as the appropriate setpoint Kx. The setpoint Nx for cut-off frequency adjusted in advance, however, may fail to be the appropriate applying setpoint Yy. In order to avoid this problem, the finalization of the setpoint K2 for low-pass filter or the setpoint K3 for high-pass filter as the setpoint Kx for filter type should be followed by the adjustment of the setpoint Nx for cut-off frequency.

Although the adjustment processes are executed in the order of the first filter adjustment process, the second filter adjustment process, and the third filter adjustment process in Embodiment 9, the third filter adjustment process may precede the second filter adjustment process. The measurement mode adjustment process and the refractive index adjustment process may be executed before, after, or during the first to third filter adjustment processes, provided that the measurement mode adjustment process and the refractive index adjustment process are executed after the light emission adjustment process, the sampling period adjustment process, and the measurement recipe adjustment process.

The applying-setpoint adjustment process for the displacement meter 10 in Embodiment 9 can adjust the applying setpoints Yy for multiple attributes while further reducing the burden of determination and operation on a user, during preliminary adjustment of the applying setpoints Yy for individual attributes among the setpoints Xx for multiple attributes on the basis of measurement of the reference workpiece.

Furthermore, in the setpoint adjustment apparatus for the displacement meter 10 according to Embodiment 9, during preliminary adjustment of the applying setpoints Yy among the setpoints Xx for individual attributes on the basis of measurement of the reference workpiece, when the measurement value based on the initial setpoint X1 for each attribute is within the range of the desired measurement value 352, the initial setpoint X1 is employed as the applying setpoint Yy to be used in inspection of the measurement target 1. In contrast, when the measurement value is out of the range of the desired measurement value 352, the changer 344 changes the applying setpoint Yy to a setpoint (for example, setpoint Xx+1) different from the initial setpoint X1. This configuration can adjust the applying setpoints Yy while reducing the burden of determination and operation on a user during preliminary adjustment of the applying setpoints Yy on the basis of measurement of the reference workpiece.

In addition, in the setpoint adjustment apparatus for the displacement meter 10 according to Embodiment 9, the updater 345 causes the applying setpoints Yy used in acquisition of either one of the measurement values, which include the measurement value (first measurement value) acquired using the applying setpoints Yy (first applying setpoints, setpoints Xx for individual attributes) before being changed by the changer 344 and the measurement value (second measurement value) acquired using the applying setpoints Yy (second applying setpoints, setpoints Xx+1 for individual attributes) after being changed by the changer 344, closer to the desired measurement value 352 as the applying setpoints Yy to be used in measurement of the measurement target 1. This configuration can update the applying setpoints Yy for multiple attributes to appropriate setpoints Xx for multiple attributes while further reducing the burden of determination and operation on a user during preliminary adjustment of the applying setpoints Yy for multiple attributes on the basis of measurement of the reference workpiece.

Furthermore, in the applying-setpoint adjustment process for the displacement meter 10 in Embodiment 9, the setpoints Xx belong to multiple attributes to be adjusted. The multiple attributes include two or more of the amount of emitted light, the sampling period, the measurement mode, the filter type, the calculation times of moving average, the cut-off frequency, and the refractive index, and further include the measurement recipe associated with the setpoints Xx for multiple attributes. The setpoint Px for measurement recipe is adjusted first. When the measurement value is determined to be within the range of the desired measurement value 352, the applying setpoints Yy for multiple attributes associated with the measurement recipe used in acquisition of the measurement value determined to be within the range of the desired measurement value 352 are employed as the applying setpoints Yy to be used in inspection of the measurement target 1. In contrast, when the measurement value acquired using the applying setpoints Yy for multiple attributes associated with the measurement recipe changed by the changer 344 is determined to be out of the range of the desired measurement value 352, the attribute to be adjusted is switched to an attribute other than the measurement recipe among the multiple attributes so as to change the applying setpoint Yy for the attribute other than the measurement recipe. This configuration is more likely to reduce the time of adjustment of the applying setpoints Yy for multiple attributes because the setpoint Px for measurement recipe is adjusted first, as explained above.

In addition, in the applying-setpoint adjustment process for the displacement meter 10 in Embodiment 9, the setpoints Xx belong to multiple attributes to be adjusted. The multiple attributes include a first attribute, which is at least one of the amount of emitted light or the sampling period, and a second attribute, which is at least one of the measurement mode, the filter type, the calculation times of moving average, the cut-off frequency, or the refractive index. When the measurement value is determined to be within the range of the desired measurement value 352, the applying setpoint Yy for first attribute used in acquisition of the measurement value determined to be within the range of the desired measurement value 352 is employed as the applying setpoint Yy for first attribute to be used in inspection of the measurement target 1. In contrast, when the measurement value is determined to be out of the range of the desired measurement value 352 and when the amount of received light is determined to be out of the range of the desired amount 353 of received light, the changer 344 switches the attribute to be adjusted from the first attribute to the second attribute, and changes the applying setpoint Yy for second attribute. This configuration is more likely to make the measurement value within the range of the desired measurement value in the adjustment process related to the second attribute following the adjustment process related to the first attribute, because the adjustment of the setpoint Xx (for example, Ix or Mx) for first attribute precedes the adjustment of the setpoint Xx (for example, Jx, Kx, Lx, Nx, or Ox) for second attribute, as explained above.

Furthermore, in the applying-setpoint adjustment process for the displacement meter 10 in Embodiment 9, the attributes of the setpoints Xx to be adjusted include the amount of emitted light and the sampling period. The applying setpoint Yy for light emission (setpoint Ix for light emission) is changed in advance of changing of the applying setpoint Yy for sampling period (setpoint Mx for sampling period). When the measurement value is determined to be within the range of the desired measurement value 352, the applying setpoint Yy for light emission (setpoint Ix for light emission) used in acquisition of the measurement value determined to be within the range of the desired measurement value 352 is employed as the applying setpoint Yy for light emission to be used in inspection of the measurement target 1. In contrast, when the measurement value is determined to be out of the range of the desired measurement value 352 and when the amount of received light is determined to be out of the range of the desired amount 353 of received light, the changer 344 switches the attribute to be adjusted from the amount of emitted light to the sampling period, and changes the applying setpoint Yy for sampling period (setpoint Mx for sampling period). This configuration can reduce the effects on the tact time because the adjustment of the setpoint Ix for light emission precedes the adjustment of the setpoint Mx for sampling period, as explained above.

In addition, in the applying-setpoint adjustment process for the displacement meter 10 in Embodiment 9, the setpoints Xx belong to multiple attributes to be adjusted. The multiple attributes include the filter types including at least the moving average filter and the calculation times of moving average. The changer 344 changes the applying setpoint Yy for filter type (setpoint Kx for filter type) in advance of changing of the applying setpoint Yy for moving-average calculation times (setpoint Lx for moving-average calculation times). After finalization of the setpoint for moving average filter as the applying setpoint Yy for filter type, the changer 344 switches the attribute to be adjusted from the filter type to the calculation times of moving average, and changes the applying setpoint Yy for moving-average calculation times. The adjustment in this order can achieve appropriate adjustment of the setpoint Kx for filter type and the setpoint Lx for moving-average calculation times.

Furthermore, in the applying-setpoint adjustment process for the displacement meter 10 in Embodiment 9, the setpoints Xx belong to multiple attributes to be adjusted. The multiple attributes include the cut-off frequency and the filter types including at least one of the low-pass and high-pass filters. The changer 344 changes the applying setpoint Yy for filter type (setpoint Kx for filter type) in advance of changing of the applying setpoint Yy for cut-off frequency (setpoint Nx for cut-off frequency). After finalization of the setpoint for low-pass or high-pass filter as the applying setpoint Yy for filter type, the changer 344 switches the attribute to be adjusted from the filter type to the cut-off frequency, and changes the applying setpoint Yy for cut-off frequency. The adjustment in this order can achieve appropriate adjustment of the setpoint Kx for filter type and the setpoint Nx for cut-off frequency.

Embodiment 10

A setpoint adjustment system for the displacement meter 10 according to Embodiment 10 will now be described with reference to FIGS. 1, 22, and 29 to 33. The component identical to that in any one of Embodiments 1 to 9 is provided with the same reference symbol without detailed description.

Figure 32:
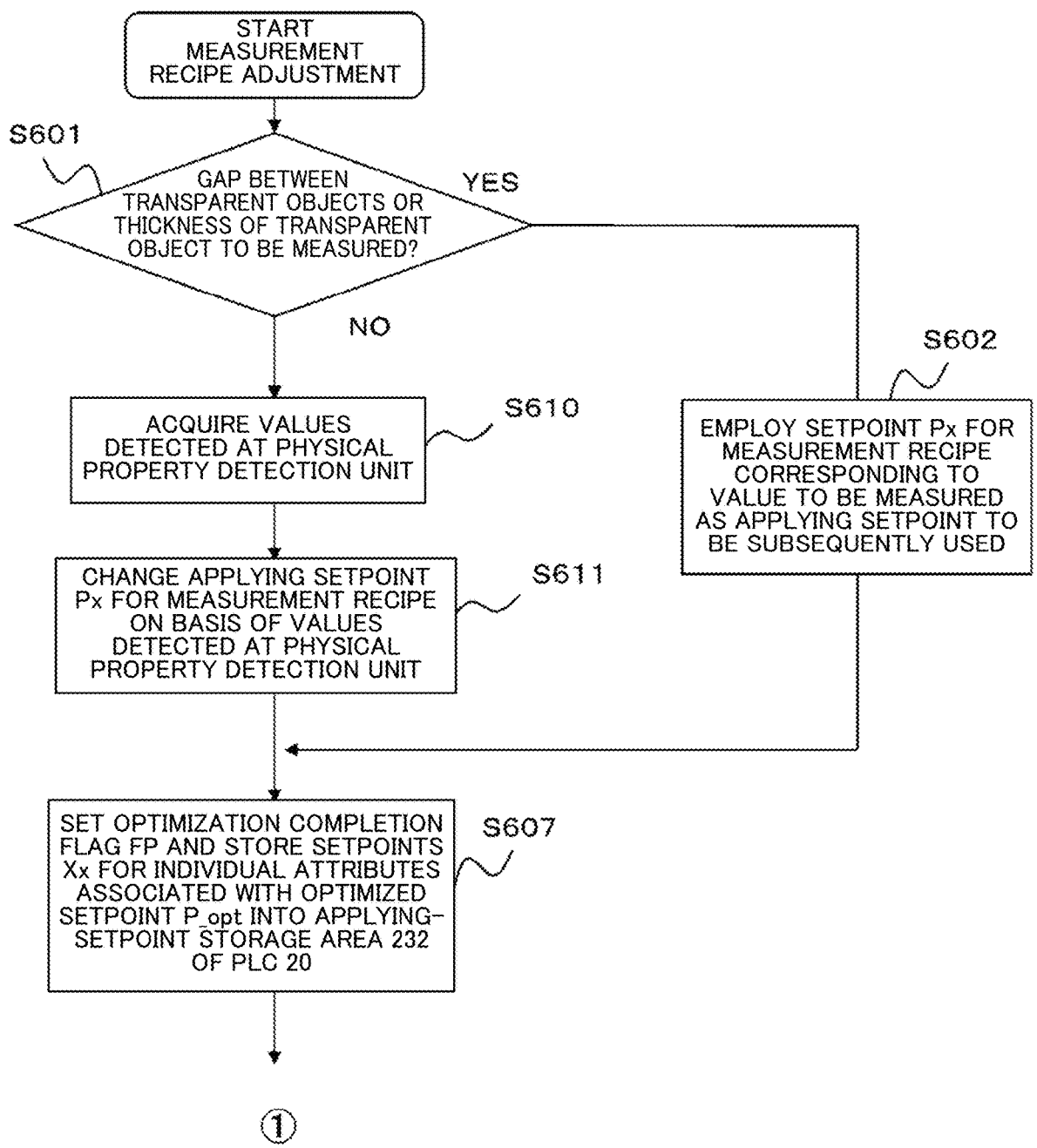
FIG. 32 is a flowchart illustrating a measurement recipe adjustment process executed in a PC in Embodiment 10 of the disclosure.

In the setpoint adjustment system for the displacement meter 10 according to Embodiment 10, the measurement recipe adjustment process in FIG. 23 in Embodiment 6 is replaced with a measurement recipe adjustment process in FIG. 32. Specifically, the measurement recipe adjustment process in Embodiment 10 differs from that in Embodiment 6 in that Steps S610 and S611 are executed instead of Steps S603, S604, S605, and S606 of the measurement recipe adjustment process in Embodiment 6. The processes in Embodiment 10 are identical to those in Embodiment 6 except for Steps S610 and S611 of the measurement recipe adjustment process, and the identical processes will not be redundantly explained.

The following description is directed to the physical property detection unit 40, which is not described in Embodiment 1.

The physical property detection unit 40 specifies the physical properties of the measurement target 1. As illustrated in FIG. 1, the physical property detection unit 40 includes a first detector 41, a second detector 42, a third detector 43, and a fourth detector 44. The first detector 41 to the fourth detector 44 are connected to the first communication I/F 21 of the PLC 20. The acquirer 341 of the PC 30 acquires the values detected at the first detector 41 to the fourth detector 44 via the PLC 20.

Figure 29A:
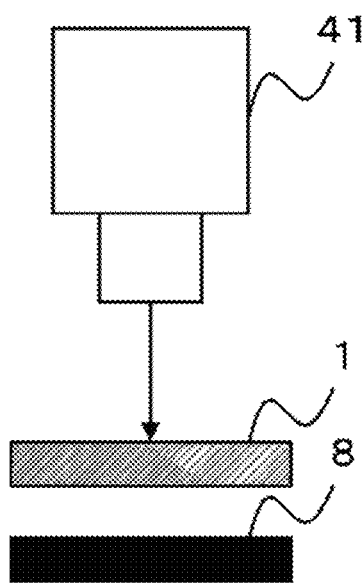
FIG. 29 is a schematic diagram illustrating a measurement method in a first detector in Embodiment 10 of the disclosure.
Figure 29B:
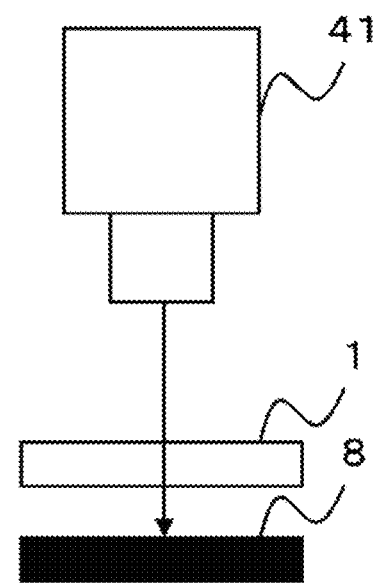

As illustrated in FIG. 29, the first detector 41 determines whether the measurement target 1 has physical properties of a transparent object. The first detector 41 is an imager, such as a charge coupled device (CCD) camera, for capturing an image in the direction toward the measurement target 1 and a background member 8 behind the measurement target 1, for example. The surface of the background member 8 that faces the first detector 41 has a mark or pattern printed thereon. In the case of a non-transparent measurement target 1, as illustrated in the section (a) of FIG. 29, the first detector 41 captures an image of the surface of the measurement target 1, and the captured image thus does not contain the mark or pattern printed on the surface of the background member 8. In contrast, in the case of a transparent measurement target 1, as illustrated in the section (b) of FIG. 29, the first detector 41 captures an image containing the surface of the background member 8 behind the measurement target 1, and the image captured by the first detector 41 contains the mark or pattern printed on the surface of the background member 8. The first detector 41 captures an image in the direction toward the measurement target 1 and transmits the captured image to the PLC 20. The first controller 22 of the PLC 20 then compares this actually captured image with a reference image containing the mark or pattern on the background member 8 by a known pattern matching method, for example. When the actually captured image accords with the reference image, which means that the captured image contains the background member 8 behind the measurement target 1, then the first controller 22 of the PLC 20 determines the measurement target 1 to be a transparent object. In contrast, when the actually captured image does not accord with the reference image containing the mark or pattern on the background member 8 in the comparison between the actually captured image and the reference image, the first controller 22 of the PLC 20 deems the captured image to contain the surface of the measurement target 1 and determines the measurement target 1 to be a non-transparent object. This result of determination from the first controller 22 of the PLC 20 is transmitted to the PC 30 and acquired by the acquirer 341 of the PC 30. The first detector 41 should not necessarily be an imager and may be a transmissive-type photoelectric sensor in which a light emitter and a light receiver are opposed to each other on both sides of the measurement target 1. In this case, the light from the light emitter is received at the light receiver, so as to determine whether the measurement target 1 has physical properties of a transparent object. The first detector 41 may be any detector capable of determining whether the measurement target 1 has physical properties of a transparent object. The determination should not necessarily be performed by the first controller 22 of the PLC 20 and may be performed by the second controller 34 of the PC 30.

Figure 30A:
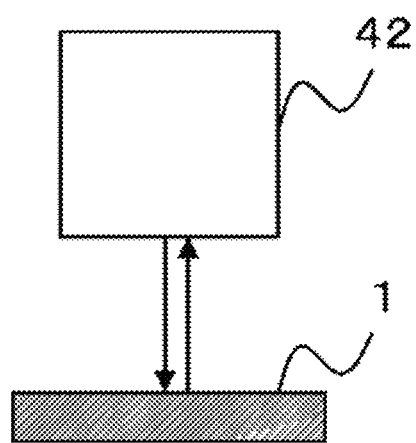
FIG. 30 is a schematic diagram illustrating a measurement method in a second detector in Embodiment 10 of the disclosure.
Figure 30B:
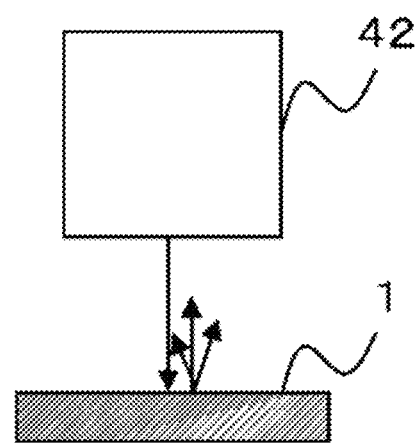

As illustrated in FIG. 30, the second detector 42 determines whether the measurement target 1 has physical properties of an object having a mirror or non-mirror surface. The second detector 42 is a diffuse-reflection-type photoelectric sensor including integrated light emitter and light receiver, for example. The light from the light emitter of the photoelectric sensor, which is the second detector 42, is reflected on the surface of the measurement target 1 and then received at the light receiver. The light receiver of the second detector 42 acquires the detected amount of received light from the measurement target 1 and transmits this detected amount of received light to the PLC 20. When the detected amount of received light is larger than a predetermined threshold, the first controller 22 of the PLC 20 deems the surface of the measurement target 1 to cause mirror-surface reflection, as illustrated in the section (a) of FIG. 30, and determines the measurement target 1 to have a mirror surface. In contrast, when the detected amount of received light is smaller than the predetermined threshold, the first controller 22 of the PLC 20 deems the surface of the measurement target 1 to cause diffuse reflection, as illustrated in the section (b) of FIG. 30, and determines the measurement target 1 to have a non-mirror surface. This result of determination from the first controller 22 of the PLC 20 is transmitted to the PC 30 and acquired by the acquirer 341 of the PC 30. The second detector 42 should not necessarily be a diffuse-reflection-type photoelectric sensor and may be any detector capable of determining whether the measurement target 1 has a mirror or non-mirror surface. The determination should not necessarily be performed by the first controller 22 of the PLC 20 and may be performed by the second controller 34 of the PC 30.

The third detector 43 determines whether the measurement target 1 has physical properties of an electrical conductor, such as metal. The third detector 43 is an induction proximity sensor, for example. The induction proximity sensor generates a high-frequency magnetic field from a detection coil. In the case of an electrically conductive measurement target 1, when the measurement target 1 approaches the magnetic field, an induced electric current (eddy current) flows in the detection object due to electromagnetic induction. This current causes a variation in impedance of the detection coil or stop of oscillation, on the basis of which the induction proximity sensor determines whether the measurement target 1 is an electrical conductor. The signal from the induction proximity sensor is turned on in response to detection of an electrical conductor and output to the PLC 20. The signal from the induction proximity sensor is turned off in response to no detection of an electrical conductor. The third detector 43 should not necessarily be an induction proximity sensor and may be any detector capable of determining whether the measurement target 1 has physical properties of an electrical conductor.

Figure 31A:
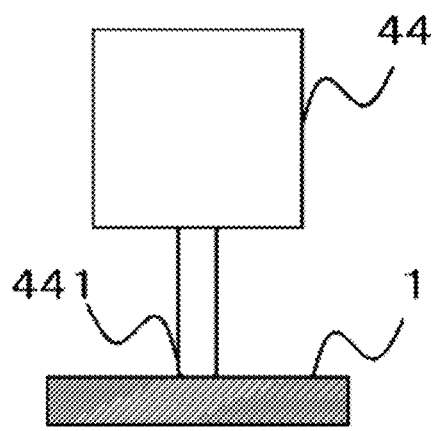
FIG. 31 is a schematic diagram illustrating a measurement method in a fourth detector in Embodiment 10 of the disclosure.
Figure 31B:
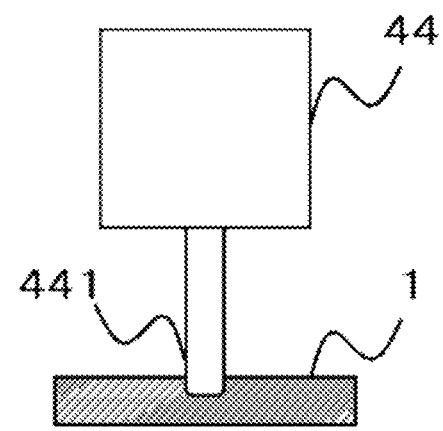

As illustrated in FIG. 31, the fourth detector 44 determines whether the measurement target 1 has physical properties of a hard object. The fourth detector 44 is a contact displacement sensor, in which a probe 431 protruding toward the surface of the measurement target 1 comes into elastic contact with the surface of the measurement target 1, for example. In the case of a hard measurement target 1, such as metal, the signal from the contact displacement sensor is turned on in response to contraction of the probe 441, as illustrated in the section (a) of FIG. 31, and output to the PLC 20. In the case of a measurement target 1 having a deformable surface, such as a rubber, the signal from the contact displacement sensor is turned off in response to extension of the probe 441, as illustrated in the section (b) of FIG. 31. The fourth detector 44 should not necessarily be the contact displacement sensor and may be any detector capable of determining whether the measurement target 1 has physical properties of a hard object.

The applying-setpoint automatic adjustment process in Embodiment 10 will now be explained. Embodiment 10 involves the applying-setpoint automatic adjustment process in FIG. 22 like Embodiment 6. When the process goes to Step S50 in the applying-setpoint automatic adjustment process, a measurement recipe adjustment process in FIG. 32 is executed instead of the measurement recipe adjustment process in FIG. 23 in Embodiment 6.

As illustrated in FIG. 32, Steps S610 and S611 are executed in the measurement recipe adjustment process in Embodiment 10, instead of Steps S603, S604, S605, and S606 of the measurement recipe adjustment process in Embodiment 6, as explained above.

In the measurement recipe adjustment process in Embodiment 10, Steps S601, S602, and S607 are executed as in Embodiment 6.

When the determiner 343 determines that the selected value to be measured is not a gap between transparent objects or the thickness of a transparent object in Step S601 (Step S601: No), the process goes to Step S603.

In Step S610, the acquirer 341 of the PC 30 acquires the values detected at the physical property detection unit 40 including the first detector 41, the second detector 42, the third detector 43, and the fourth detector 44, via the PLC 20.

In Step S611, the changer 344 of the PC 30 changes the setpoint Px for measurement recipe on the basis of the values detected at the physical property detection unit 40 and a measurement recipe adjustment table, which will be described below.

The measurement recipe adjustment table in FIG. 33 is preliminarily stored in the second storage 35 of the PC 30 and used in changing of the setpoint Px for measurement recipe. The definitions of the symbols "O" and "X" in the measurement recipe adjustment table will be described. In the measurement recipe adjustment table, the column of the first detector 41 is provided with a symbol "O" when the value detected at the first detector 41 reveals that the measurement target 1 is a transparent object, and is provided with a symbol "X" when the value reveals that the measurement target 1 is a non-transparent object. The column of the second detector 42 is provided with a symbol "O" when the value detected at the second detector 42 reveals that the measurement target 1 has a mirror surface, and is provided with a symbol "X" when the value reveals that the measurement target 1 has a non-mirror surface. The column of the third detector 43 is provided with a symbol "O" when the value detected at the third detector 43 reveals that the measurement target 1 is an electrical conductor, and provided with a symbol "X" when the value reveals that the measurement target 1 is an insulating object. The column of the fourth detector 44 is provided with a symbol "O" when the value detected at the fourth detector 44 reveals that the measurement target 1 is made of a hard material, such as metal, and is provided with a symbol "X" when the value reveals that the measurement target 1 is made of a soft material, such as rubber.

A measurement recipe in the measurement recipe adjustment table is selected on the basis of the values detected at the first detector 41 to the fourth detector 44 of the physical property detection unit 40. In an exemplary case where the value detected at the first detector 41 is "X (non-transparent object)", the value detected at the second detector 42 is "X (non-mirror surface)", the value detected at the third detector 43 is "X (insulating object)", and the value detected at the fourth detector 44 is "O (hard)", the measurement target 1 is determined to have physical properties of a typical resin, for example, so that the setpoint Px indicating the measurement recipe A is selected. In another exemplary case where the value detected at the first detector 41 is "X (non-transparent object)", the value detected at the second detector 42 is "X (non-mirror surface)", the value detected at the third detector 43 is "O (electrical conductor)", and the value detected at the fourth detector 44 is "O (hard)", the measurement target 1 is determined to have physical properties of a metal having a non-mirror surface, so that the setpoint Px indicating the measurement recipe B is selected. Any of the other setpoints Px for measurement recipe listed in the measurement recipe adjustment table is selected in the same way depending on a combination of "O" and "X" of the values detected at the first detector 41 to the fourth detector 44 in FIG. 33.

That is, the changer 344 changes the initial setpoint P1 for measurement recipe set in Step S10A in FIG. 22 to the setpoint Px for measurement recipe selected on the basis of the values detected at the first detector 41 to the fourth detector 44 and the measurement recipe adjustment table. The changer 344 then stores the setpoints Xx (Ix, Jx, Kx, Lx, Mx, Nx, Ox, Px . . . ) for individual attributes associated with the selected setpoint Px for measurement recipe into the applying-setpoint storage area 355, thereby employing the setpoints Xx for individual attributes as the applying setpoints Yy. The selected setpoint Px for measurement recipe and the setpoints Xx (Ix, Jx, Kx, Lx, Mx, Nx, Ox . . . ) for individual attributes associated with the selected setpoint Px for measurement recipe are also stored into the optimized-setpoint storage area 356. The changer 344 transmits the setpoints Xx for individual attributes (except for the setpoint Px for measurement recipe), which are the applying setpoints Yy stored in the applying-setpoint storage area 355, to the PLC 20. The first controller 22 then stores and sets the received setpoints Xx for individual attributes (except for the setpoint Px for measurement recipe) into the applying-setpoint storage area 232. The process then goes to Step S607.

In Step S607, the updater 345 sets the optimization completion flag FP indicating completion of the measurement recipe adjustment process, as in Embodiment 6. The updater 345 then transmits an instruction to the first controller 22 of the PLC 20, so as to cause the setpoints Xx for individual attributes (except for the setpoint Px for measurement recipe) associated with the optimized setpoint P_opt for measurement recipe retained in the optimized-setpoint storage area 356 at the time of completion of the measurement recipe adjustment process to be retained in the applying-setpoint storage area 232 of the first storage 23.

The measurement recipe adjustment process in Embodiment 10 is aimed at adjusting only the setpoint Px for measurement recipe, as in Embodiment 6. Alternatively, the measurement recipe adjustment process in Embodiment 10 may also be applied as the measurement recipe adjustment process in the applying-setpoint automatic adjustment process configured by combining the measurement mode adjustment process to the sampling period adjustment process in Embodiment 9.

In the case where the measurement recipe adjustment process in Embodiment 10 is not applied as the measurement recipe adjustment process in the applying-setpoint automatic adjustment process configured by combining the measurement mode adjustment process to the sampling period adjustment process in Embodiment 9, the setpoints Xx (Ix, Jx, Kx, Lx, Mx, Nx, Ox, Px . . . ) for individual attributes associated with the selected setpoint Px for measurement recipe are only required to be stored into the optimized-setpoint storage area 356 in Step S611 of the measurement recipe adjustment process in Embodiment 10. The step of storage into the applying-setpoint storage area 232 of the PLC 20 in Step S611 may be omitted because the setpoints Xx for individual attributes (except for the setpoint Px) associated with the selected setpoint Px for measurement recipe are retained in the applying-setpoint storage area 232 of the PLC 20 in Step S607.

In the setpoint adjustment apparatus for the displacement meter 10 according to Embodiment 10, the acquirer 341 acquires the values detected at the physical property detection unit 40 for detecting the physical properties of the reference workpiece, and the changer 344 changes the applying setpoint for measurement recipe on the basis of the values detected at the physical property detection unit 40. When the measurement value is determined to be within the range of the desired measurement value 352, the applying setpoints Yy for individual attributes associated with the measurement recipe used in acquisition of the measurement value determined to be within the range of the desired measurement value 352 are employed as the applying setpoints Yy to be used in inspection of the measurement target 1. This configuration can adjust the applying setpoints Yy while reducing the burden of determination and operation on a user. The configuration can also update the applying setpoint Yy to an appropriate setpoint Px suitable for the physical properties of the reference workpiece. Since the applying setpoint Yy for measurement recipe is changed on the basis of the values detected at the physical property detection unit 40, the configuration can finalize the applying setpoint Yy for measurement recipe at an early timing without unnecessary repetition of the measurement recipe adjustment process.

Embodiment 11

A setpoint adjustment system for the displacement meter 10 according to Embodiment 11 will now be described with reference to FIGS. 1, 14, 34, and 35. The component and process identical to those in any one of Embodiments 1 to 10 will not be redundantly described.

Figure 34:
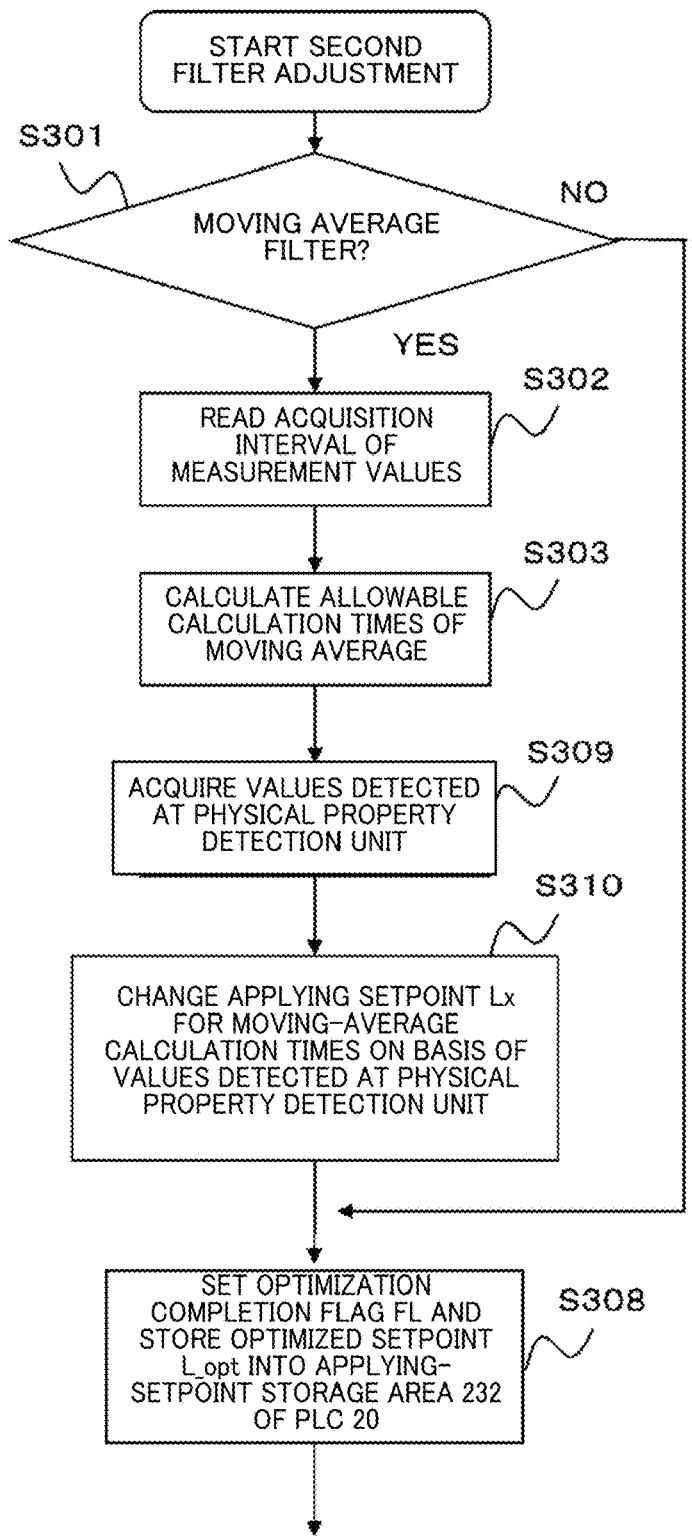
FIG. 34 is a flowchart illustrating a second filter adjustment process executed in a PC in Embodiment 11 of the disclosure.

In the setpoint adjustment system for the displacement meter 10 according to Embodiment 11, a second filter adjustment process in FIG. 34 is executed instead of the second filter adjustment process in FIG. 18 in Embodiment 3. Specifically, the second filter adjustment process in Embodiment 11 differs from that in Embodiment 3 in that Steps S309 and S310 are executed instead of Steps S304, S305, S306, and Step S307 of the second filter adjustment process in Embodiment 3. The processes in Embodiment 11 are identical to those in Embodiment 3 except for Steps S309 and S310 of the second filter adjustment process, and the identical processes will not be redundantly explained.

In Embodiment 11, the applying-setpoint automatic adjustment process in FIG. 14 is executed, as in Embodiment 3. When the process goes to Step S50 in the applying-setpoint automatic adjustment process, the second filter adjustment process in FIG. 34 is executed instead of the second filter adjustment process in FIG. 18.

In the second filter adjustment process in Embodiment 11, Steps S301, S302, and S303 are executed as in Embodiment 3. The process then goes to Step S309.

In Step S309, the acquirer 341 of the PC 30 acquires the values detected at the physical property detection unit 40 including the first detector 41, the second detector 42, the third detector 43, and the fourth detector 44 via the PLC 20, as in Step S610 in Embodiment 10.

In Step S310, the changer 344 of the PC 30 changes the setpoint Lx for moving-average calculation times on the basis of the values detected at the physical property detection unit 40 and a moving-average calculation-time adjustment table, which will be described below.

The moving-average calculation-time adjustment table in FIG. 35 is preliminarily stored in the second storage 35 of the PC 30 and is used in changing of the setpoint Lx for moving-average calculation times. The definition of "O" and "X" in the moving-average calculation-time adjustment table is identical to that described in Embodiment 10.

A setpoint Lx for moving-average calculation times contained in the moving-average calculation-time adjustment table is selected on the basis of the values detected at the first detector 41 to the fourth detector 44 included in the physical property detection unit 40, depending on the surface physical properties of the reference workpiece, which is the measurement target 1. Specifically, among the setpoints Lx for moving-average calculation times contained in the moving-average calculation-time adjustment table, a smaller setpoint Lx for moving-average calculation times corresponds to the reference workpiece having a smooth mirror surface, while a larger setpoint Lx for moving-average calculation times corresponds to the reference workpiece having a coarse uneven surface. In an exemplary case where the value detected at the first detector 41 is "X (non-transparent object)", the value detected at the second detector 42 is "O (mirror surface)", the value detected at the third detector 43 is "O (electrical conductor)", and the value detected at the fourth detector 44 is "O (hard)", the measurement target 1 is determined to have surface physical properties of a metal having a mirror surface, for example, so that the setpoint indicating 32 times is selected as the setpoint Lx for moving-average calculation times. In another exemplary case where the value detected at the first detector 41 is "X (non-transparent object)", the value detected at the second detector 42 is "X (non-mirror surface)", the value detected at the third detector 43 is "O (electrical conductor)" or "X (insulating object)", and the value detected at the fourth detector 44 is "O (hard)", the measurement target 1 is determined to have surface physical properties of a normal material or metal having a non-mirror surface, so that the setpoint indicating 128 times is selected as the setpoint Lx for moving-average calculation times. In another exemplary case where the value detected at the first detector 41 is "O (transparent object)", the value detected at the second detector 42 is "X (non-mirror surface)", the value detected at the third detector 43 is "O (electrical conductor)", and the value detected at the fourth detector 44 is "O (hard)", the measurement target 1 is determined to have surface physical properties of a patterned glass, so that the setpoint indicating 512 times is selected as the setpoint Lx for moving-average calculation times.

That is, the changer 344 stores the setpoint Lx for moving-average calculation times selected on the basis of the values detected at the first detector 41 to the fourth detector 44 and the moving-average calculation-time adjustment table, into the applying-setpoint storage area 355, thereby employing the selected setpoint Lx for moving-average calculation times as the applying setpoint Yy instead of the initial setpoint L1 for moving-average calculation times set in Step S10 in FIG. 14. The selected setpoint Lx for moving-average calculation times is also stored into the optimized-setpoint storage area 356. The changer 344 then transmits the selected setpoint Lx for moving-average calculation times, which is the applying setpoint Yy stored in the applying-setpoint storage area 355, to the PLC 20. The first controller 22 then stores and sets the received setpoint Lx for moving-average calculation times into the applying-setpoint storage area 232. The process then goes to Step S308.

In Step S308, the updater 345 sets the optimization completion flag FL indicating completion of the second filter adjustment process, as in Embodiment 3. The updater 345 then transmits an instruction to the first controller 22 of the PLC 20, and causes the optimized setpoint L_opt for moving-average calculation times retained in the optimized-setpoint storage area 356 at the time of completion of the second filter adjustment process to be stored into the applying-setpoint storage area 232 of the first storage 23.

The second filter adjustment process in Embodiment 11 is aimed at adjusting only the setpoint Lx for moving-average calculation times, as in Embodiment 3. Alternatively, the second filter adjustment process in Embodiment 11 may be applied as the second filter adjustment process in the applying-setpoint automatic adjustment process configured by combining the processes from the measurement mode adjustment process to the sampling period adjustment process in Embodiment 9.

In the case where the second filter adjustment process in Embodiment 11 is not applied as the second filter adjustment process in the applying-setpoint automatic adjustment process configured by combining the processes from the measurement mode adjustment process to the sampling period adjustment process in Embodiment 9, the selected setpoint Lx for moving-average calculation times is only required to be stored into the optimized-setpoint storage area 356 in Step S310 of the second filter adjustment process in Embodiment 11. The step of storage into the applying-setpoint storage area 232 of the PLC 20 in Step S308 may be omitted because the selected setpoint Lx for moving-average calculation times is retained in the applying-setpoint storage area 232 of the PLC 20 in Step S310.

In the setpoint adjustment apparatus for the displacement meter 10 according to Embodiment 11, the acquirer 341 acquires the values detected at the physical property detection unit 40 for detecting the physical properties of the reference workpiece. The setpoints Xx contain the setpoint Lx for moving-average calculation times. The changer 344 changes the applying setpoint Yy for moving-average calculation times (setpoint Lx for moving-average calculation times) on the basis of the values detected at the physical property detection unit 40. When the measurement value is determined to be within the range of the desired measurement value 352, the applying setpoint Yy for moving-average calculation times (setpoint Lx for moving-average calculation times) used in acquisition of the measurement value determined to be within the range of the desired measurement value 352 is employed as the applying setpoint Yy to be used in inspection of the measurement target 1. This configuration can adjust the applying setpoint Yy while reducing the burden of determination and operation on a user. The configuration can also update the applying setpoint Yy to an appropriate setpoint Lx for moving-average calculation times suitable for the physical properties of the reference workpiece. Since the applying setpoint Yy for moving-average calculation times is changed on the basis of the values detected at the physical property detection unit 40, the configuration can finalize the applying setpoint Yy for moving-average calculation times at an early timing without unnecessary repetition of the second filter adjustment process.

Embodiment 12

A setpoint adjustment system for the displacement meter 10 according to Embodiment 12 will now be described with reference to FIGS. 1, 36, and 37. The component and process identical to those in any one of Embodiments 1 to 11 will not be redundantly described.

Figure 36:
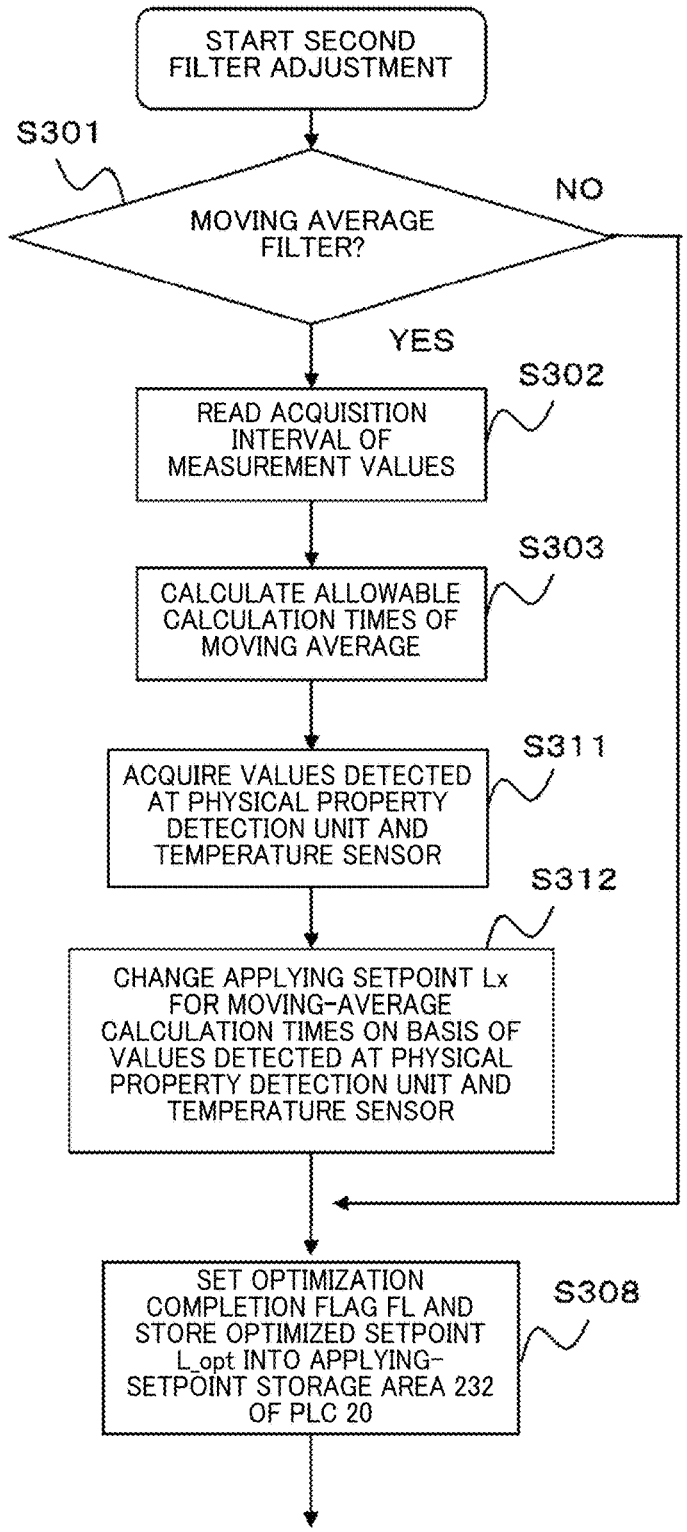
FIG. 36 is a flowchart illustrating a second filter adjustment process executed in a PC in Embodiment 12 of the disclosure.

In the setpoint adjustment system for the displacement meter 10 according to Embodiment 12, a second filter adjustment process in FIG. 36 is executed instead of the second filter adjustment process in FIG. 34 in Embodiment 11. Specifically, the second filter adjustment process in Embodiment 12 differs from that in Embodiment 11 in that Steps S311 and S312 are executed in Embodiment 12, instead of Steps S309 and S310 of the second filter adjustment process in Embodiment 11. The processes in Embodiment 11 are identical to those in Embodiment 11 except for Steps S311 and S312 of the second filter adjustment process, and the identical processes will not be redundantly explained.

The following description is directed to the temperature sensor 50, which is not described in Embodiment 1.

The temperature sensor 50 in FIG. 1 serves as a temperature detector for detecting a temperature of the displacement meter 10. The temperature to be detected is a temperature inside the displacement meter 10 or an environmental temperature. Alternatively, a room temperature may be used as the environmental temperature because many factories have a constant room temperature in general. The temperature sensor 50 is connected to the first communication I/F 21 of the PLC 20, as well as the physical property detection unit 40 including the first detector 41 to the fourth detector 44. The acquirer 341 of the PC 30 acquires the values detected at the physical property detection unit 40 including the first detector 41 to the fourth detector 44 and the temperature detected at the temperature sensor 50, via the PLC 20.

A second filter adjustment process in Embodiment 12 will now be explained with reference to FIG. 36.

In the second filter adjustment process in Embodiment 12, Steps S301, S302, and S303 are executed as in Embodiment 11. The process then goes to Step S311.

In Step S311, the acquirer 341 of the PC 30 acquires the values detected at the physical property detection unit 40 including the first detector 41, the second detector 42, the third detector 43, and the fourth detector 44 via the PLC 20, as in Step S309 in Embodiment 11. The acquirer 341 further acquires the temperature detected at the temperature sensor 50 as a detected value in Embodiment 12.

In Step S312, the changer 344 of the PC 30 changes the setpoint Lx for moving-average calculation times on the basis of the values detected at the physical property detection unit 40 and the temperature sensor 50 and a moving-average calculation-time adjustment table, which will be described below.

In Embodiment 12, the moving-average calculation-time adjustment table in FIG. 37 is referenced in changing of the setpoint Lx for moving-average calculation times, instead of the moving-average calculation-time adjustment table in FIG. 35 in Embodiment 11. The definition of "O" and "X" in the moving-average calculation-time adjustment table is identical to that described in Embodiment 10.

The moving-average calculation-time adjustment table in FIG. 37 in Embodiment 12 is originated from the moving-average calculation-time adjustment table in FIG. 35 in Embodiment 11, but further defines different setpoints Lx for moving-average calculation times depending on the temperature detected at the temperature sensor 50. Specifically, in the case of a first temperature detected at the temperature sensor 50, the setpoint Lx for moving-average calculation times is identical to that contained in the moving-average calculation-time adjustment table in FIG. 35 in Embodiment 11. In contrast, in the case of a second temperature detected at the temperature sensor 50, a larger setpoint Lx for moving-average calculation times is selected so as to increase the calculation times of moving average. It should be noted that the second temperature is higher than the first temperature. The setpoint Lx for moving-average calculation times is thus changed such that the calculation times of moving average increase in accordance with a rise in temperature detected at the temperature sensor 50, because a higher temperature makes the measurement value less stable and leads to a larger deviation of the measurement value from the desired measurement value 352 due to thermal expansion of the components of the displacement meter 10.

That is, in Step S312, the changer 344 stores the setpoint Lx for moving-average calculation times selected on the basis of the values detected at the first detector 41 to the fourth detector 44 and the temperature sensor 50 and the moving-average calculation-time adjustment table in FIG. 37, into the applying-setpoint storage area 355 and the optimized-setpoint storage area 356, thereby employing the selected setpoint Lx for moving-average calculation times, instead of the initial setpoint L1 for moving-average calculation times set in Step S10 in FIG. 14. The changer 344 then causes the first controller 22 to store the selected setpoint Lx for moving-average calculation times into the applying-setpoint storage area 232. The process then goes to Step S308.

In Step S308, the updater 345 sets the optimization completion flag FL indicating completion of the second filter adjustment process, and causes the optimized setpoint L_opt for moving-average calculation times retained in the optimized-setpoint storage area 356 at the time of completion of the second filter adjustment process to be retained in the applying-setpoint storage area 232 of the first storage 23, as in Embodiment 11.

The second filter adjustment process in Embodiment 12 may be applied as the second filter adjustment process in the applying-setpoint automatic adjustment process configured by combining the processes from the measurement mode adjustment process to the sampling period adjustment process in Embodiment 9, as in Embodiment 11.

In the case where the second filter adjustment process in Embodiment 12 is not applied as the second filter adjustment process in the applying-setpoint automatic adjustment process configured by combining the processes from the measurement mode adjustment process to the sampling period adjustment process in Embodiment 9, the selected setpoint Lx for moving-average calculation times is only required to be stored into the optimized-setpoint storage area 356 in Step S311 of the second filter adjustment process in Embodiment 12. The step of storage into the applying-setpoint storage area 232 of the PLC 20 in Step S312 may be omitted because the selected setpoint Lx for moving-average calculation times is retained in the applying-setpoint storage area 232 of the PLC 20 in Step S311.

In the setpoint adjustment apparatus for the displacement meter 10 according to Embodiment 12, the acquirer 341 acquires the temperature detected at the temperature detector for detecting a temperature of the displacement meter 10, and the changer 344 changes the applying setpoint Yy for moving-average calculation times such that the calculation times of moving average increase with a rise in the temperature detected at the temperature detector. This configuration can update the applying setpoint Yy to an appropriate setpoint Lx for moving-average calculation times suitable for the temperature of the displacement meter 10.

Embodiment 13

A setpoint adjustment system for the displacement meter 10 according to Embodiment 13 will now be described with reference to FIGS. 38 and 39. The component and process identical to those in any one of Embodiments 1 to 12 will not be redundantly described.

Figure 38:
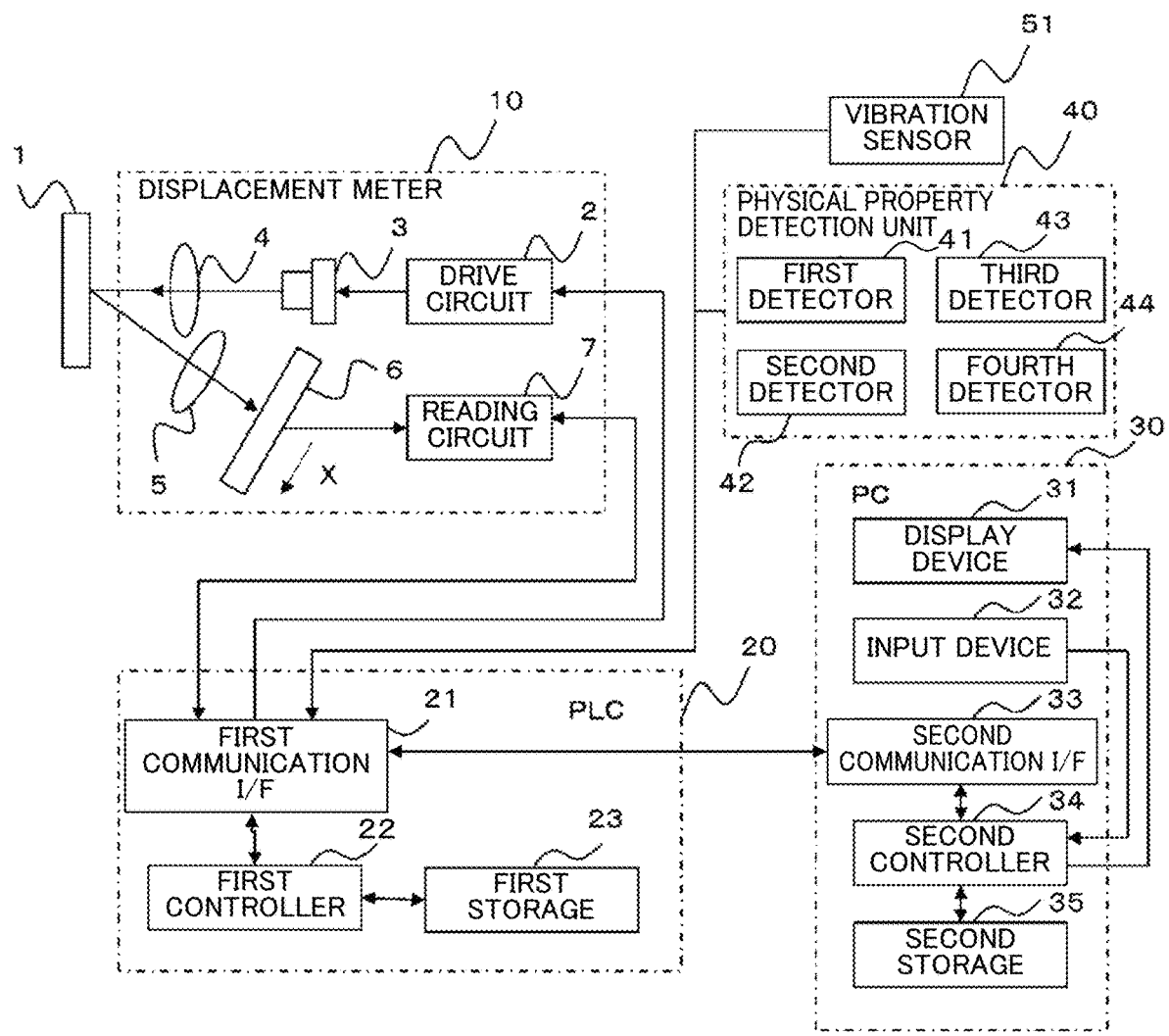
FIG. 38 illustrates an entire configuration of a setpoint adjustment system for a displacement meter according to Embodiment 13 of the disclosure.
Figure 39:
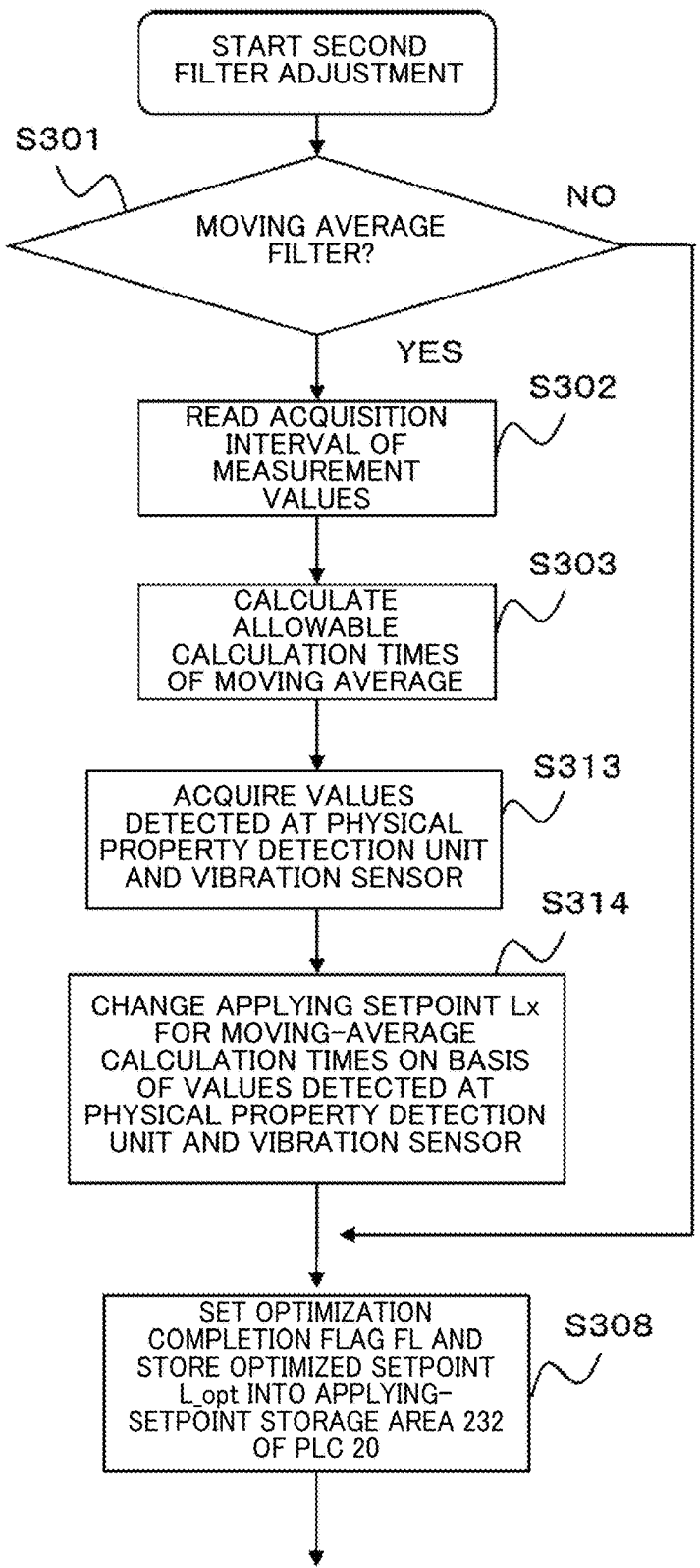
FIG. 39 is a flowchart illustrating a second filter adjustment process executed in a PC in Embodiment 13 of the disclosure.

In the setpoint adjustment system for the displacement meter 10 according to Embodiment 13, the temperature sensor 50 in Embodiment 12 is replaced with a vibration sensor 51, as illustrated in FIG. 38. The second filter adjustment process in FIG. 36 in Embodiment 12 is replaced with a second filter adjustment process in FIG. 39. Specifically, the second filter adjustment process in Embodiment 13 differs from that in Embodiment 12 in that Steps S313 and S314 are executed in in Embodiment 13, instead of Steps S311 and S312 of the second filter adjustment process in Embodiment 12. The processes in Embodiment 12 are identical to those in Embodiment 12 except for Steps S313 and S314 of the second filter adjustment process, and the identical processes will not be redundantly explained.

First, the vibration sensor 51 in Embodiment 13 will be described.

The vibration sensor 51 in FIG. 38 serves as a vibration detector for detecting vibration of the displacement meter 10. The value detected at the vibration sensor 51 is an acceleration corresponding to vibration of the displacement meter 10. The acquirer 341 of the PC 30 acquires the values detected at the physical property detection unit 40 including the first detector 41 to the fourth detector 44 and the vibration sensor 51, via the PLC 20.

The second filter adjustment process in Embodiment 13 will now be explained with reference to FIG. 39.

In the second filter adjustment process in Embodiment 13, Steps S301, S302, and S303 are executed as in Embodiment 11. The process then goes to Step S313.

In Step S313, the acquirer 341 of the PC 30 acquires the values detected at the physical property detection unit 40 including the first detector 41, the second detector 42, the third detector 43, and the fourth detector 44 via the PLC 20, as in Step S311 in Embodiment 12. The acquirer 341 also acquires the value detected at the vibration sensor 51 as a detected value in Embodiment 13.

In Step S314, the changer 344 of the PC 30 changes the setpoint Lx for moving-average calculation times, on the basis of the values detected at the physical property detection unit 40 and the vibration sensor 51 and a moving-average calculation-time adjustment table, which will be described below.

In Embodiment 13, the moving-average calculation-time adjustment table in FIG. 40 is referenced in changing of the setpoint Lx for moving-average calculation times, instead of the moving-average calculation-time adjustment table in FIG. 37 in Embodiment 12.

The moving-average calculation-time adjustment table in FIG. 40 in Embodiment 13 is originated from the moving-average calculation-time adjustment table in FIG. 37 in Embodiment 12, but further defines different setpoints Lx for moving-average calculation times depending on the value detected at the vibration sensor 51. Specifically, in the case of no vibration detected at the vibration sensor 51, the setpoint Lx for moving-average calculation times is identical to that contained in the moving-average calculation-time adjustment table in FIG. 35 in Embodiment 11. In contrast, in the case of any vibration detected at the vibration sensor 51, a larger setpoint Lx for moving-average calculation times is selected so as to increase the calculation times of moving average. The vibration sensor 51 is configured to detect a vibration when the acceleration sensed by the vibration sensor 51 exceeds a predetermined vibration threshold. The setpoint Lx for moving-average calculation times is thus changed such that the calculation times of moving average increase in accordance with a rise in vibration detected at the vibration sensor 51, because larger vibration in the displacement meter 10 makes the measurement value less stable and leads to a larger deviation of the measurement value from the desired measurement value 352.

In the setpoint adjustment apparatus for the displacement meter 10 according to Embodiment 13, the acquirer 341 acquires the value detected at the vibration detector for detecting vibration of the displacement meter 10, and the changer 344 changes the applying setpoint Yy for moving-average calculation times such that the calculation times of moving average increase in accordance with a rise in the value detected at the vibration detector. This configuration can update the applying setpoint Yy to an appropriate setpoint Lx for moving-average calculation times suitable for the vibration of the displacement meter 10.

Embodiment 14

A setpoint adjustment system for the displacement meter 10 according to Embodiment 14 will now be described with reference to FIGS. 5, 6, 10, 21, and 41 to 43. The component identical to that in any one of Embodiments 1 to 12 will not be redundantly described.

In the setpoint adjustment system for the displacement meter 10 according to Embodiment 14, the PC 30 in any one of Embodiments 1 to 12 is replaced with a PC 30A. The PC 30A has a configuration identical to that of the PC 30 in any one of Embodiments 1 to 12 except for that the PC 30A further includes a machine learning device 36. This machine learning device 36 learns the applying setpoints Yy that provide a measurement value within the range of the desired measurement value 352 and the applying setpoints Yy that provide an amount of received light within the range of the desired amount 353 of received light, on the basis of measurement values indicating displacements, amounts of received light, and applying setpoints Yy. It should be noted that the measurement value, the amount of received light, the applying setpoints Yy, the desired measurement value 352, and the desired amount 353 of received light are identical to those in any one of Embodiments 1 to 12.

In an exemplary configuration of the setpoint adjustment system for the displacement meter 10 according to Embodiment 14 described below, the PC 30A includes the PC 30 and the machine learning device 36 integrated with each other. The machine learning device 36 may be integrated with the PC 30A or may be a separate computer disposed outside the PC 30A. Alternatively, the machine learning device 36 may exist in a cloud server. The functions of the machine learning device 36 are achieved by the processor.

Figure 41:
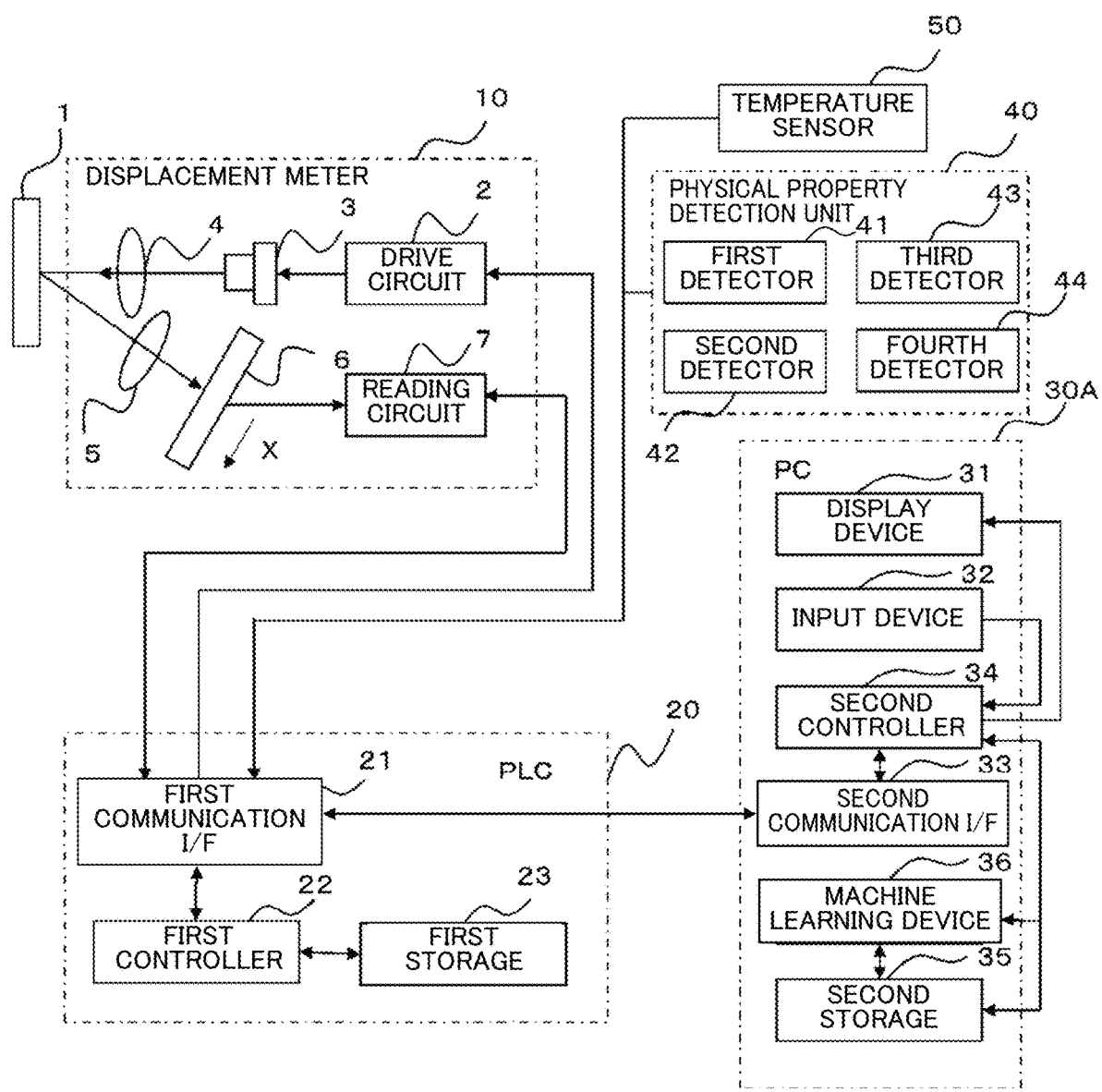
FIG. 41 illustrates an entire configuration of a setpoint adjustment system for a displacement meter according to Embodiment 14 of the disclosure.

FIG. 41 illustrates an entire configuration of the setpoint adjustment system for the displacement meter 10 according to Embodiment 14. The component in FIG. 41 having the functions identical to those in the setpoint adjustment system for the displacement meter 10 according to Embodiment 1 in FIG. 1 is provided with the same reference symbol without redundant description. The PC 30A includes the machine learning device 36 for learning the applying setpoints Yy in addition to the PC 30.

The machine learning device 36 includes a state observer 361 and a learner 363. The machine learning device 36 is connected to the second controller 34 and the second storage 35.

The state observer 361 observes state variables 362, which are the measurement value and the amount of received light acquired by the acquirer 341 in measurement of the reference workpiece using the applying setpoints Yy, and the applying setpoints Yy used in acquisition of the measurement value and the amount of received light. The measurement value and the amount of received light observed by the state observer 361 are associated with the applying setpoints Yy used in acquisition of the measurement value and the amount of received light. The state observer 361 then transmits the state variables 362, which are observation results, to the learner 363.

The learner 363 learns the applying setpoints Yy in accordance with the state variables 362. In other words, the learner 363 learns the applying setpoints Yy that provide a measurement value within the range of the desired measurement value 352 and the applying setpoints Yy that provide an amount of received light within the range of the desired amount 353 of received light. Specifically, the learner 363 learns the applying setpoints Yy that provide a measurement value within the range of the desired measurement value 352 and the applying setpoints Yy that provide an amount of received light within the range of the desired amount 353 of received light, in accordance with a training data set generated on the basis of the state variables 362 containing the measurement value, the amount of received light, and the applying setpoints Yy used in acquisition of the measurement value and the amount of received light. In Embodiment 14, the learner 363 learns the relationship between the measurement value and the amount of received light, and the applying setpoints Yy used in acquisition of the measurement value and the amount of received light, in accordance with the concept of reinforcement learning.

The machine learning device 36 in Embodiment 14 performs reinforcement learning by a known Q-learning method. The machine learning device 36 learns the best action on the basis of an action-value function $Q(s_t, a_t)$ for obtaining an action value Q (expected value) when an action a is selected in the case of a certain state variable s.

At the initial stage of learning, an action value Q to be assigned to the combination of the certain state variable s and the action a is unknown. The machine learning device 36 selects and executes actions a at random for various state variables s, and adds up rewards provided as results of the actions a, thereby updating the action-value function $Q(s_t, a_t)$. The general formula for updating the action-value function $Q(s_t, a_t)$ is represented by Expression 2 below.

(Math 1)

$$Q(s_t,a_t) \leftarrow Q(s_t,a_t)+\alpha(r_{t+1}+\gamma \max Q(s_{t+1},a_{t+1})-Q(s_t,a_t)) \qquad \text{(Expression 2)}$$

In this expression, $s_t$ indicates the state variable at a time t, and at indicates the action performed at the time t. $s_{t+1}$ indicates the state variable at a time t+1, in other words, the state variable after the change as a result of the action $a_t$. $r_{t+1}$ indicates a reward provided depending on the environment changed as a result of the action $a_t$. The term "max" represents the maximum action value Q (that is, the action value for the best action a) for the state variable $s_{t+1}$. $\gamma$ indicates a discount rate satisfying the expression $0 < \gamma \leq 1$ (for example, $\gamma$=0.9 to 0.99). $\alpha$ indicates a learning factor satisfying the expression $0 < \alpha \leq 1$ (for example, $\alpha$=0.05 to 0.2). In Embodiment 14 in which a Q-learning method is applied to the setpoint adjustment system for the displacement meter 10, the applying setpoints Yy serve as the action $a_t$.

The updating formula represented by Expression 2 increases the action value Q in the case where the action value for the best action a at the time t+1 is higher than the action value Q for the action a at the time t, and decreases the action value Q in the opposite case. In other words, the action-value function $Q(s_t, a_t)$ is updated such that the action value Q for the action a at the time t approaches the best action value at the time t+1. Accordingly, the best action value in a certain environment sequentially propagates to action values in the past environment.

Referring back to FIG. 42, the learner 363 includes a reward calculator 364 and a function updater 365.

The reward calculator 364 calculates a reward in accordance with the state variables 362. That is, the reward calculator 364 calculates a reward on the basis of the measurement value and the amount of received light acquired by the acquirer 341. The reward calculator 364 provides a higher reward as the amount of received light becomes closer to the desired amount 353 of received light.

The reward calculator 364 also provides a higher reward as the measurement value becomes closer to the desired measurement value 352. The reward calculator 364 may assign different weights between the reward for the amount of received light and the reward for the measurement value. As described in Embodiment 1, an excessively large amount of received light and an excessively small amount of received light result in significant impairment of the accuracy of detecting the top of the peak P of the received light waveform. In order to avoid this problem, the reward for the amount of received light may be significantly higher than the reward for the measurement value. In this case, the reward calculator 364 may provide a reward of "+1" to "−1" for the amount of received light and provide a reward of "+0.2" to "−0.2" for the measurement value, for example. The reward calculator 364 then transmits the calculated reward to the function updater 365.

The function updater 365 stores a function for defining the applying setpoints Yy to be used in acquisition of the measurement value and the amount of received light from the reference workpiece, and updates the function in accordance with the reward calculated by the reward calculator 364. A typical example of the function for defining the applying setpoints Yy to be used in acquisition of the measurement value and the amount of received light from the reference workpiece is the above-mentioned action-value function $Q(s_t, a_t)$. The function can be updated by updating an action value table, for example, in accordance with the training data set. The action value table is a data set that is stored in the form of a table and contains actions at, state variables $s_t$, and their action values Q in association with each other. The function updater 365 in Embodiment 14 updates the action-value function $Q(s_t, a_t)$ every time when the state observer 361 observes a new measurement value and a new amount of received light. The function updater 365 then transmits the updated action-value function $Q(s_t, a_t)$ to the second storage 35 and causes the action-value function $Q(s_t, a_t)$ to be stored into the second storage 35.

The second storage 35 preliminarily stores data learned in the past and data to be used in learning. An example of the learned data is the learned applying setpoints Yy, and an example of the data to be used in learning is the action-value function $Q(s_t, a_t)$ to be used in learning at the learner 363. The applying setpoints Yy preliminarily stored in the optimized-setpoint storage area 356 of the second storage 35 are the applying setpoints Yy that achieve the highest reward among the applying setpoints Yy used in acquisition of the measurement values and the amounts of received light from the reference workpiece in the past. For the applying setpoint Yy for each attribute, the second storage 35 stores the combination of the applying setpoint Yy that achieves the highest reward among the applying setpoints Yy used in acquisition of the measurement values and the amounts of received light from the reference workpiece in the past, and the measurement value and the amount of received light associated with this applying setpoint Yy.

Figure 43:
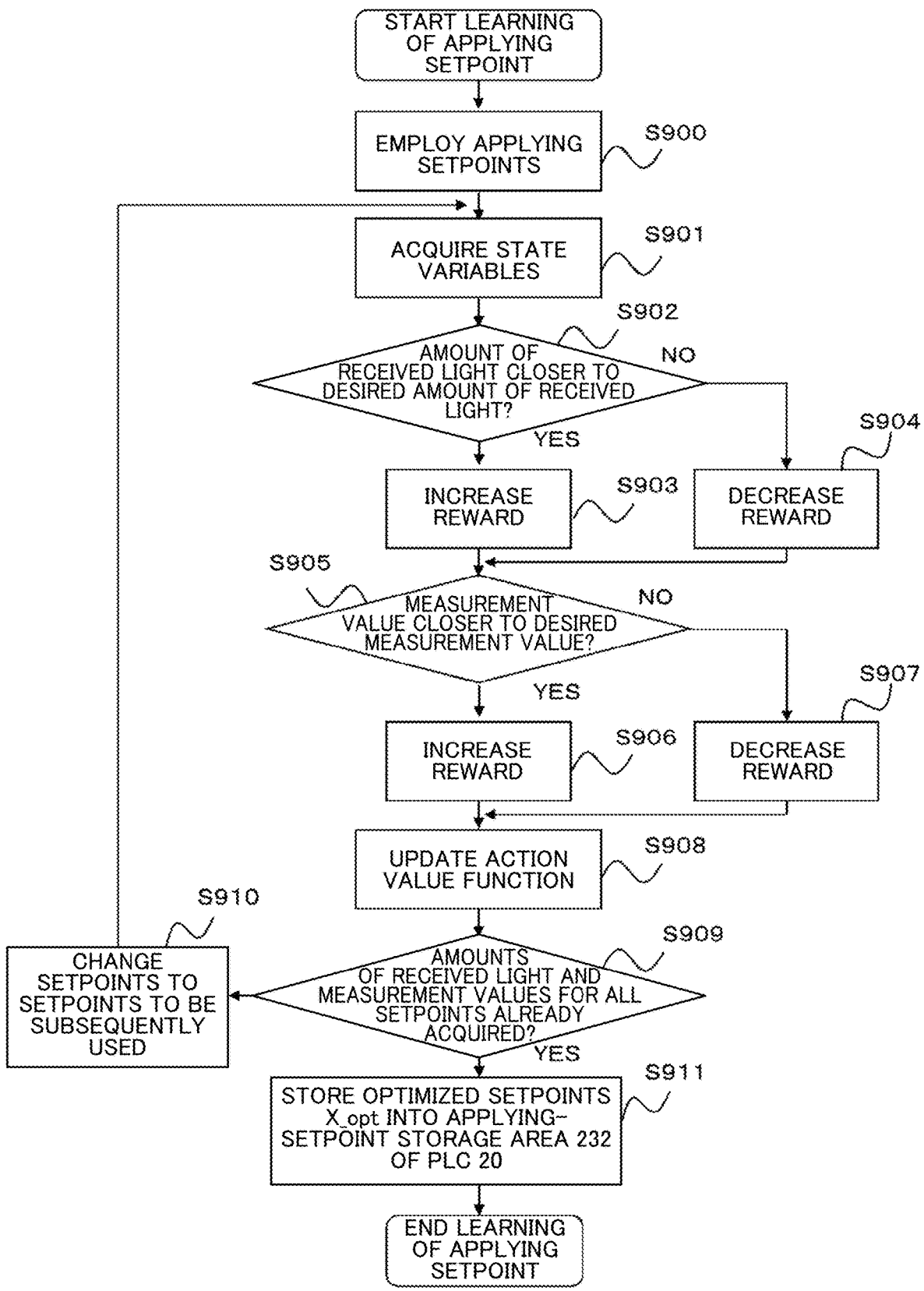
FIG. 43 is a flowchart illustrating an applying-setpoint learning process executed in the PC in Embodiment 14 of the disclosure.

First, Steps S1 to S5 are executed in the adjustment process in FIG. 6, as in Embodiment 1. When the button 732 for automatic adjustment of the setpoints Xx in FIG. 10 is selected, an applying-setpoint learning process in FIG. 43 is started in Step S5.

The process of reinforcement learning for updating the action value function $Q(s_t, a_t)$ will now be explained with reference to the flowchart in FIG. 43. FIG. 43 is a flowchart illustrating the applying-setpoint learning process executed in the PC 30A in Embodiment 14. The following explanation assumes an exemplary case where the attribute of the applying setpoint Yy to be learned is the measurement recipe.

First, in Step S900, the setter 342 reads a single setpoint Xx for each attribute from the entire setpoints 351 and stores the setpoints Xx into the applying-setpoint storage area 355 and the applying-setpoint storage area 232, thereby employing the setpoints Xx as the applying setpoints Yy. Specifically, the setter 342 reads the setpoints Xx (Ix, Jx, Kx, Lx, Mx, Nx, Ox . . . ) for individual attributes associated with the setpoint Px for measurement recipe, stores the setpoints Xx into the applying-setpoint storage area 355 and the applying-setpoint storage area 232, and employs the setpoints Xx as the applying setpoints Yy. In Step S900, which precedes the applying-setpoint learning process, the setter 342 may select one of the setpoints Px for measurement recipe in FIGS. 5 and 21 at random, and employ the setpoints Xx (Ix, Jx, Kx, Lx, Mx, Nx, Ox . . . ) for individual attributes associated with the selected setpoint Px for measurement recipe as the applying setpoints Yy. Alternatively, as in Step S10A in FIG. 22 in Embodiment 6, the setpoints Xx (I1, J1, K1, L1, M1, none, none . . . ) for individual attributes associated with the initial setpoint for the measurement recipe A, which is the initial value P1 of the setpoint Px for measurement recipe, may be employed as the applying setpoints Yy. Alternatively, as in Step S10 in Embodiment 1, the setter 342 may employ the initial setpoints X1 for individual attributes listed in the central column in FIG. 5 as the applying setpoints Yy.

In Step S901, the state observer 361 observes the measurement value and the amount of received light acquired using the applying setpoints Yy stored in the applying-setpoint storage area 232 and the applying setpoints Yy stored in the applying-setpoint storage area 355, via the PLC 20 and the acquirer 341 of the PC 30. The state observer 361 then transmits the state variables 362 to the reward calculator 364. That is, the state observer 361 transmits information, which contains the measurement value and the amount of received light acquired from the reference workpiece using the applying setpoints Yy and the applying setpoints Yy used in acquisition of the measurement value and the amount of received light in association with each other, to the reward calculator 364.

In Step S902, the reward calculator 364 determines whether the amount of received light currently acquired from the state observer 361 is closer to the desired amount 353 of received light than the amount of received light that has been closest to the desired amount 353 of received light among the amounts of received light acquired in the past. When the currently-acquired amount of received light is closer to the desired amount 353 of received light than the amount of received light that has been closest to the desired amount 353 of received light among the amounts of received light acquired in the past (Step S902: Yes), then the process goes to Step S903. When the currently-acquired amount of received light is farther from the desired amount 353 of received light than the amount of received light that has been closest to the desired amount 353 of received light among the amounts of received light acquired in the past (Step S902: No), then the process goes to Step S904. The desired amount 353 of received light may be a range between the lower and upper limits of the desired amount of received light, such as the range of 400 to 800, or may be a certain value, such as 600, as in Embodiment 7.

In Step S903, the reward calculator 364 increases the reward. In contrast, in Step S904, the reward calculator 364 decreases the reward. The reward calculator 364 may maintain the reward without increasing or decreasing when the currently-acquired amount of received light is equal to the amount of received light that has been closest to the desired amount 353 of received light among the amounts of received light acquired in the past. Step S903 or S904 is followed by Step S905.

In Step S905, the reward calculator 364 determines whether the measurement value currently acquired from the state observer 361 is closer to the desired measurement value 352 than the measurement value that has been closest to the desired measurement value 352 among the measurement values acquired in the past. When the currently-acquired measurement value is closer to the desired measurement value 352 than the measurement value that has been closest to the desired measurement value 352 among the measurement values acquired in the past (Step S905: Yes), then the process goes to Step S906. When the currently-acquired measurement value is farther from the desired measurement value 352 than the measurement value that has been closest to the desired measurement value 352 among the measurement values acquired in the past (Step S905: No), then the process goes to Step S907. The desired measurement value 352 may be a range between the upper-limit and lower-limit thresholds designated by an operation of the user, or may be a certain value, such as a displacement of 0, provided that the surface of the reference workpiece is disposed $a_t$ the measurement center, as in Embodiment 1.

In Step S906, the reward calculator 364 increases the reward. In contrast, in Step S907, the reward calculator 364 decreases the reward. The reward calculator 364 may maintain the reward without increasing or decreasing when the currently-acquired measurement value is equal to the measurement value that has been closest to the desired measurement value 352 among the measurement values acquired in the past. Step S906 or S907 is followed by Step S908.

In Step S908, the function updater 365 updates the action-value function $Q(s_t, a_t)$ on the basis of the increased or decreased reward. The function updater 365 then transmits the updated action-value function $Q(s_t, a_t)$ to the second storage 35 and causes the action-value function $Q(s_t, a_t)$ to be stored into the second storage 35. The function updater 365 provides an instruction to the updater 345 of the second controller 34, so that the updater 345 causes the applying setpoints Yy that achieve the highest reward among the applying setpoints Yy in the past (including the current applying setpoints Yy) used in acquisition of the measurement values and the amounts of received light from the reference workpiece, to be stored into the optimized-setpoint storage area 356. More specifically, the updater 345 stores information containing the applying setpoints Yy that achieve the highest reward (that is, the combination of the setpoints Xx for individual attributes associated with the setpoint Px for measurement recipe that achieves the highest reward) among the applying setpoints Yy in the past (that is, the combinations of the setpoints Xx (Ix, Jx, Kx, Lx, Mx, Nx, Ox . . . ) for individual attributes associated with the setpoints Px for measurement recipe, including the current applying setpoints Yy), and containing the measurement value and the amount of received light associated with the applying setpoints Yy. The process then goes to Step S909.

In Step S909, the determiner 343 determines whether all the amounts of received light and the measurement values have already been acquired from the reference workpiece using all the setpoints Xx as the applying setpoints Yy. Specifically, in the case where the applying setpoint Yy for measurement recipe is to be learned, the determiner 343 determines whether all the amounts of received light and the measurement values have already been acquired from the reference workpiece using all the setpoints Px for measurement recipe as the applying setpoint Yy. For example, the determiner 343 determines whether all the measurement values have been acquired by comparing the number of $a_t$ least one of the acquired amounts of received light or measurement values that have been acquired by the acquirer 341 from the start of the applying-setpoint learning process with the number of setpoints Px for measurement recipe in the entire setpoints 351 in the second storage 35. When the determiner 343 determines that not all the amounts of received light and the measurement values have been acquired in Step S909 (Step S909: No), the process goes to Step S910. In contrast, when all the amounts of received light and the measurement values have already been acquired in Step S909 (Step S909: Yes), the process goes to Step S911.

In Step S910, the changer 344 reads, from the entire setpoints 351, a new setpoint Px different from the setpoint Px for measurement recipe for which the amount of received light and the measurement value have already been acquired. The changer 344 then causes the new setpoint Px for measurement recipe and the setpoints Xx (Ix, Jx, Kx, Lx, Mx, Nx, Ox . . . ) for individual attributes associated with the new setpoint Px for measurement recipe to be stored into the applying-setpoint storage area 355, thereby changing the applying setpoints Yy. The changer 344 then transmits the setpoints Xx for individual attributes (the setpoints Ix, Jx, Kx, Lx, Mx, Nx, Ox . . . associated with the setpoint Px for measurement recipe, except for the setpoint Px for measurement recipe), which are the applying setpoints Yy that are stored in the applying-setpoint storage area 355 and will be subsequently used, to the PLC 20. The first controller 22 then stores and sets the setpoints Xx for individual attributes (the setpoints Ix, Jx, Kx, Lx, Mx, Nx, Ox . . . associated with the setpoint Px for measurement recipe), which are the applying setpoints Yy to be subsequently used, into the applying-setpoint storage area 232. The process then returns to Step S901, and the setpoints Xx associated with the new setpoint Px for measurement recipe are employed as the applying setpoints Yy. Steps S901 to S910 are repeated after every change of the setpoint Px for measurement recipe.

If all the amounts of received light and the measurement values have already been acquired in Step S909 (Step S909: Yes), which means that all the amounts of received light and the measurement values have already been acquired using all the setpoints Px for measurement recipe as the applying setpoints Yy and means completion of the applying-setpoint learning process, then the updater 345 transmits an instruction to the first controller 22 of the PLC 20, so as to cause the setpoints Xx (Ix, Jx, Kx, Lx, Mx, Nx, Ox . . . ) for individual attributes associated with the optimized setpoint P_opt for measurement recipe retained in the optimized-setpoint storage area 356 at the time of completion of the applying-setpoint learning process to be retained in the first storage 23 as the applying setpoints Yy for individual attributes in Step S911. The applying-setpoint learning process is then terminated.

Although the setpoint Px for measurement recipe is learned in Embodiment 14, $a_t$ least one of the setpoints Xx for the other attributes other than the setpoint Px for measurement recipe may be learned. A modification of Embodiment 14, which involves learning of the setpoints Xx for multiple attributes, will now be described with reference to FIG. 43.

First, in Step S900, the setter 342 reads a single setpoint Xx for each attribute from the entire setpoints 351 and stores the setpoints Xx into the applying-setpoint storage area 355 and the applying-setpoint storage area 232, thereby employing the setpoints Xx as the applying setpoints Yy. Specifically, the setter 342 reads the setpoints Ix, Jx, Kx, Lx, Mx, Nx, Ox . . . for individual attributes, stores the setpoints into the applying-setpoint storage area 355 and the applying-setpoint storage area 232, and employs the setpoints as the applying setpoints Yy for individual attributes. In Step S900, which precedes the applying-setpoint learning process, the setter 343 selects one of the multiple setpoints Xx for each attribute in FIG. 5 at random, and employs the selected setpoints Ix, Jx, Kx, Lx, Mx, Nx, Ox . . . for individual attributes as the applying setpoints Yy. Alternatively, as in Step S10 in Embodiment 1, the setter 342 may employ the initial setpoints X1 for individual attributes listed in the central column in FIG. 5 as the applying setpoints Yy.

Steps S901 to S909 are executed as in the case of learning of the setpoint Px for measurement recipe.

In Step S909, the determiner 343 determines whether all the amounts of received light and the measurement values have already been acquired from the reference workpiece using all the combinations of the setpoints Xx for attributes as the applying setpoints Yy. For example, the determiner 343 confirms whether the number of at least one of the acquired amounts of received light or the measurement values that have been acquired by the acquirer 341 from the start of the applying-setpoint learning process is equal to the total number of combinations of the setpoints Ix, Jx, Kx, Lx, Mx, Nx, Ox for individual attributes in the entire setpoints 351, and thereby determines whether all the amounts of received light and the measurement values have already been acquired. If not all the amounts of received light and the measurement values have been acquired in Step S909 (Step S909: No), the process goes to Step S910. In contrast, if all the amounts of received light and the measurement values have already been acquired in Step S909 (Step S909: Yes), the process goes to Step S911.

In Step S910, the changer 344 reads, from the entire setpoints 351, the setpoints Xx for individual attributes which are a new combination of the setpoints Xx (Ix, Jx, Kx, Lx, Mx, Nx, Ox . . . ) for individual attributes different from the combination of the setpoints Xx (Ix, Jx, Kx, Lx, Mx, Nx, Ox . . . ) for individual attributes for which the amount of received light and the measurement value have already been acquired. The changer 344 then causes the new setpoints Xx (Ix, Jx, Kx, Lx, Mx, Nx, Ox . . . ) for individual attributes to be stored into the applying-setpoint storage area 355, thereby changing the applying setpoints Yy. The changer 344 then transmits the new setpoints Xx (Ix, Jx, Kx, Lx, Mx, Nx, Ox . . . ) for individual attributes, which are the applying setpoints Yy that are stored in the applying-setpoint storage area 355 and will be subsequently used, to the PLC 20. The first controller 22 then stores and sets the setpoints Xx for individual attributes, which are the applying setpoints Yy to be subsequently used, into the applying-setpoint storage area 232. The process then returns to Step S901, and the new setpoints Xx for individual attributes are employed as the applying setpoints Yy. Steps S901 to S910 are repeated after every change of the combination of the setpoints Xx for individual attributes. In the case where the setpoint Lx for moving-average calculation times is changed in Step S910, the changer 344 changes the applying setpoint Yy to the setpoint Lx for moving-average calculation times equal to or smaller than the allowable calculation times of moving average, which are calculated by dividing the acquisition interval of measurement values by the applying setpoint for sampling period, as in Embodiment 3.

When determiner 343 determines that all the amounts of received light and the measurement values have already been acquired in Step S909 (Step S909: Yes), which means that all the amounts of received light and the measurement values have already been acquired using all the combinations of the setpoints Xx for attributes as the applying setpoints Yy and means completion of the applying-setpoint learning process, then the updater 345 transmits an instruction to the first controller 22 of the PLC 20, so as to cause the optimized setpoints X_opt (Ix, Jx, Kx, Lx, Mx, Nx, Ox . . . ) for individual attributes stored in the optimized-setpoint storage area 356 at the time of completion of the applying-setpoint learning process to be retained as the applying setpoints Yy for individual attributes stored in the first storage 23, in Step S911. In addition, the updater 345 causes the optimized setpoints X_opt (combination of the setpoints Ix, Jx, Kx, Lx, Mx, Nx, Ox . . . ) for individual attributes stored in the optimized-setpoint storage area 356 to be added to the entire setpoints 351 in the second storage 35 in the form of a new setpoint Px for measurement recipe. The applying-setpoint learning process is then terminated.

Although the applying-setpoint learning process is terminated after Step S911 in this configuration, Step S911 may be followed by re-acquisition of a measurement value from the reference workpiece using the optimized setpoints X_opt for individual attributes and re-determination of whether the acquired measurement value is within the range of the desired measurement value 352. When the measurement value is within the range of the desired measurement value 352, the applying-setpoint learning process may be terminated. In contrast, when the measurement value is out of the range of the desired measurement value 352, the display device 31 may display an error screen.

Although the applying-setpoint learning process related to the setpoint Px for measurement recipe and the applying-setpoint learning process related to the other setpoints Xx (Ix, Jx, Kx, Lx, Mx, Nx, Ox . . . ) for individual attributes other than the measurement recipe are separately explained in Embodiment 14 and the modification of Embodiment 14, these processes may also be combined.

Although the machine learning device 36 performs machine learning by a reinforcement learning method in Embodiment 14 and the modification of Embodiment 14, the machine learning device 36 may also perform machine learning by another known method, for example, by means of neural network, genetic programming, functional logic programming, or support vector machine.

Although the state observer 361 observes the measurement value and the amount of received light in Embodiment 14 and the modification of Embodiment 14, the state observer 361 may observe only the measurement value. In this case, Steps S902 to S904 of the applying-setpoint learning process in FIG. 43 may be omitted.

In the combined embodiment of Embodiment 14 and the modification of Embodiment 14, the setpoint Px for measurement recipe may be adjusted on the basis of the values detected at the physical property detection unit 40 as in Embodiment 10, accompanied by the above-explained applying-setpoint learning process for the setpoints Xx (Ix, Jx, Kx, Lx, Mx, Nx, Ox . . . ) for individual attributes other than the setpoint Px for measurement recipe.

In the modification of Embodiment 14, or the combined embodiment of Embodiment 14 and the modification of Embodiment 14, the setpoint Px for measurement recipe and the setpoint Lx for moving-average calculation times may be adjusted on the basis of the values detected at the physical property detection unit 40 and the temperature sensor 50 as in Embodiment 11, accompanied by the above-explained applying-setpoint learning process for the setpoints Xx (Ix, Jx, Kx, Mx, Nx, Ox . . . ) for individual attributes except for the setpoint Px for measurement recipe and the setpoint Lx for moving-average calculation times.

In the modification of Embodiment 14, or the combined embodiment of Embodiment 14 and the modification of Embodiment 14, a part of the setpoints Xx for individual attributes may be adjusted as in any one of Embodiments 1 to 9, while the remaining part of the setpoints Xx for individual attributes may be adjusted as in the modification of Embodiment 14, or the combined embodiment of Embodiment 14 and the modification of Embodiment 14.

The learner 363 should not necessarily learn both of the applying setpoint Yy for light emission and the applying setpoint Yy for sampling period in accordance with the training data set generated on the basis of the state variables 362, as in the modification of Embodiment 14, or the combined embodiment of Embodiment 14 and the modification of Embodiment 14. The learner 363 may learn at least one of the applying setpoint Yy for light emission or the applying setpoint Yy for sampling period in accordance with the training data set generated on the basis of the state variables 362.

In the setpoint adjustment apparatus for the displacement meter 10 according to Embodiment 14, during preliminary adjustment of the applying setpoints Yy among the setpoints Xx on the basis of measurement of the reference workpiece, the state observer 361 observes the state variables containing the measurement value and the applying setpoints Yy used in measurement of the reference workpiece, and the learner 363 learns the applying setpoints Yy in accordance with the training data set generated on the basis of the state variables. This configuration can learn and adjust the applying setpoints Yy while reducing the burden of determination and operation on a user, as in any one of Embodiments 1 to 12. The configuration can also update the applying setpoints Yy to appropriate setpoints Xx.

Furthermore, in the setpoint adjustment apparatus for the displacement meter 10 according to Embodiment 14, the optimized setpoints X_opt for individual attributes learned on the basis of the measurement value acquired at the displacement meter 10 are added to the entire setpoints 351 in the form of a new setpoint Px for measurement recipe. This configuration can reuse the added new setpoint Px for measurement recipe as the applying setpoints Yy for individual attributes, for example, when another displacement meter 10 is connected to the PLC 20 or when the measurement target 1 is changed.

In addition, in the setpoint adjustment apparatus for the displacement meter 10 according to Embodiment 14, during preliminary adjustment of the applying setpoints Yy among the setpoints Xx on the basis of measurement of the reference workpiece, the learner 363 learns the applying setpoint Yy for light emission (setpoint Ix for light emission) and the applying setpoint Yy for sampling period (setpoint Mx for sampling period) in accordance with the training data set generated on the basis of the state variables containing the amounts of received light acquired by the state observer 361 and the applying setpoints Yy used in measurement of the reference workpiece. This configuration can learn and adjust the applying setpoint Yy for light emission and the applying setpoint Yy for sampling period while reducing the burden of determination and operation on a user, as in any one of Embodiments 1 to 12. The configuration can also update the applying setpoints Yy to appropriate setpoints Ix and Mx.

Furthermore, in the setpoint adjustment apparatus for the displacement meter 10 according to Embodiment 14, the changer 344 changes the applying setpoint Yy to the setpoint Lx for moving-average calculation times equal to or smaller than the allowable calculation times of moving average, which are calculated by dividing the acquisition interval of measurement values by the applying setpoint Yy for sampling period (setpoint Mx for sampling period). This configuration can automatically adjust the applying setpoint Yy for moving-average calculation times to an appropriate setpoint Lx without affecting a tact time expected by a user, as in Embodiment 3.

Embodiment 15

A setpoint adjustment system for the displacement meter 10 according to Embodiment 15 will now be described with reference to FIGS. 44 and 45. The component identical to that in any one of Embodiments 1 to 13 will not be redundantly described.

Embodiment 15 differs from Embodiment 14, the modification of Embodiment 14, or the combined embodiment thereof, in that the completion of optimization of the setpoint Px for measurement recipe and/or the setpoints Xx for individual attributes in Embodiment 14 or the like is followed by correction of the determination thresholds, which are the desired measurement value 352.

Embodiment 15 involves a threshold corrector 347, which is not described in Embodiment 1.

The threshold corrector 347 corrects and resets the upper-limit and lower-limit thresholds so as to narrow the desired measurement value 352, that is, the range of determination thresholds defined by the upper-limit and lower-limit thresholds, which is set by an operation of the user in Step S3 of the adjustment process in FIG. 6.

In the above-described Embodiment 14, the optimized setpoint P_opt of the setpoint Px for measurement recipe and the setpoints Xx (Ix, Jx, Kx, Lx, Mx, Nx, Ox . . . ) for individual attributes associated with the optimized setpoint P_opt of the setpoint Px for measurement recipe are stored in the optimized-setpoint storage area 356 at the time of completion of the applying-setpoint learning process in FIG. 43. Also, the setpoints Xx (Ix, Jx, Kx, Lx, Mx, Nx, Ox . . . ) for individual attributes associated with the optimized setpoint P_opt for measurement recipe stored in the optimized-setpoint storage area 356 at the time of completion of the applying-setpoint learning process are retained as the applying setpoints Yy for individual attributes in the applying-setpoint storage area 232 of the first storage 23.

In the modification of Embodiment 14 or the combined embodiment of Embodiment 14 and the modification of Embodiment 14, the optimized setpoints X_opt (I_opt, J_opt, K_opt, L_opt, M_opt, N_opt, O_opt . . . ) for individual attributes are stored in the optimized-setpoint storage area 356 at the time of completion of the applying-setpoint learning process in FIG. 43. Also, the optimized setpoints X_opt for individual attributes stored in the optimized-setpoint storage area 356 at the time of completion of the applying-setpoint learning process are retained as the applying setpoints Yy for individual attributes in the applying-setpoint storage area 232 of the first storage 23.

Figure 44:
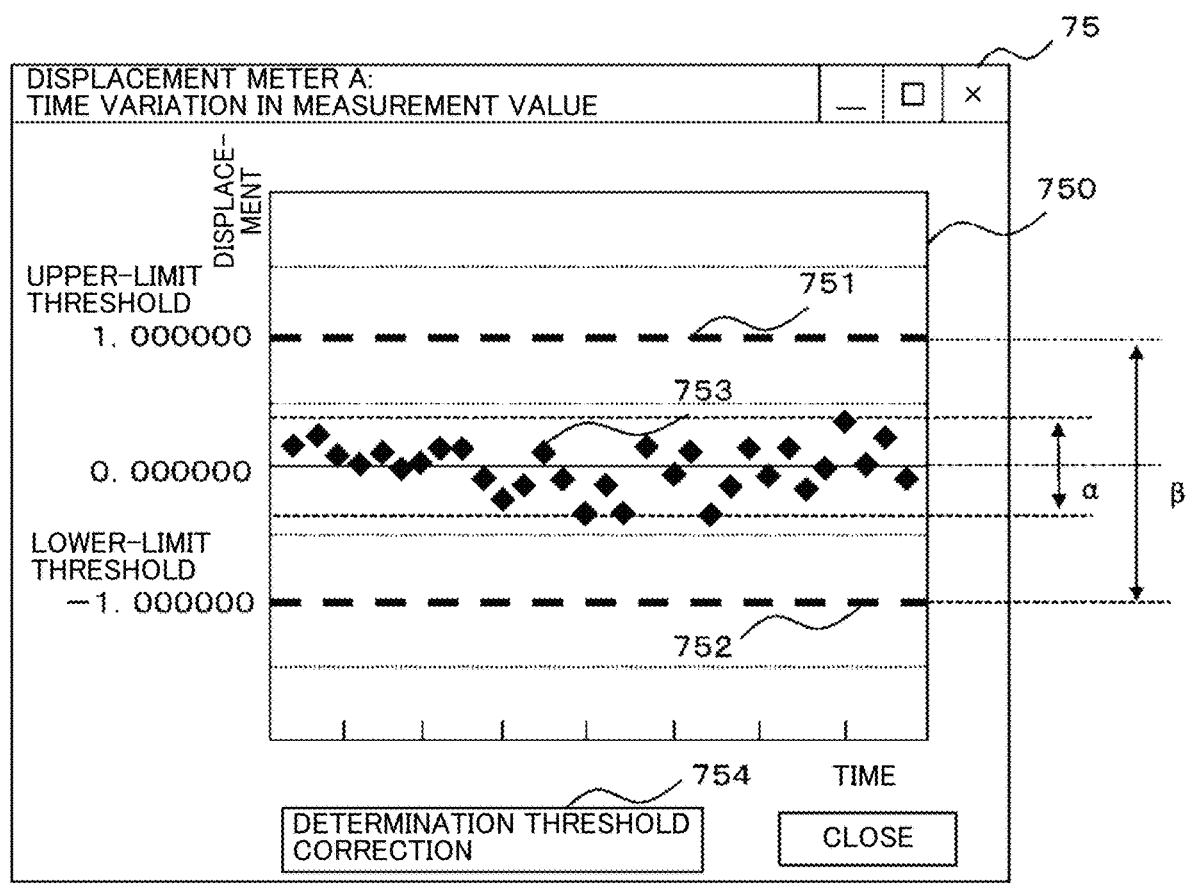
FIG. 44 illustrates a window for displaying a time variation in measurement value acquired at a displacement meter in Embodiment 15 of the disclosure.
Figure 45:
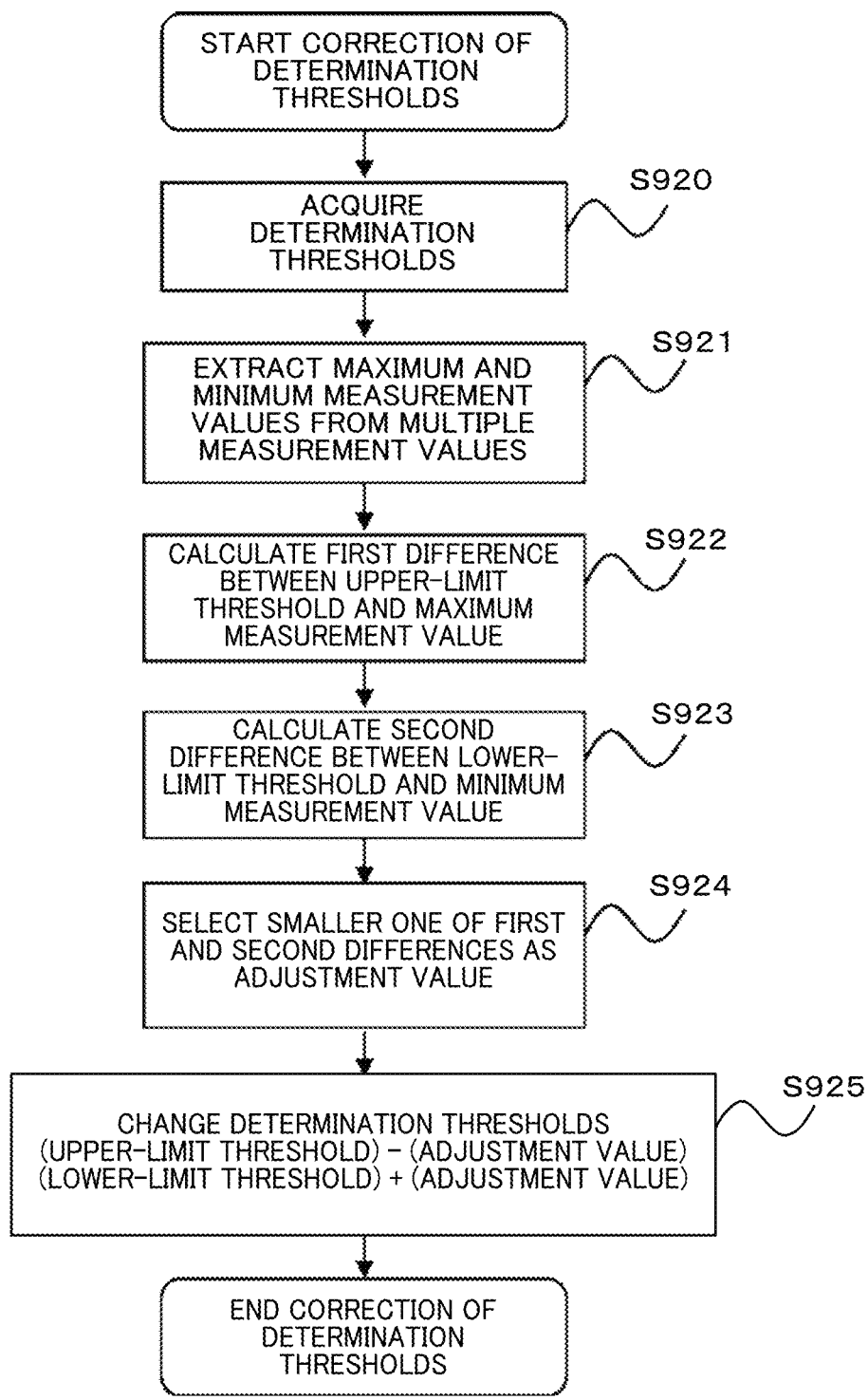
FIG. 45 is a flowchart illustrating a determination threshold correction process executed in a PC in Embodiment 15 of the disclosure.

At the time of completion of the applying-setpoint learning process, the relationship between the measurement value and the determination thresholds defined by the upper-limit and lower-limit thresholds set by an operation of the user in Step S3 of the adjustment process in FIG. 6 has varied from the state of the window 75 for displaying a time variation in measurement value in FIG. 12 to the state of the window 75 for displaying a time variation in measurement value in FIG. 44 due to the optimization of the setpoints Xx. That is, the measurement values 753 as illustrated in FIG. 12 containing some measurement values higher than the upper-limit threshold 751 and some measurement values lower than the lower-limit threshold 752 are replaced with the measurement values 753 as illustrated in FIG. 44 that fall within a range β between the upper-limit threshold 751 and the lower-limit threshold 752. The measurement values have approached the median of the range between the upper-limit threshold 751 and the lower-limit threshold 752, which indicates a displacement of 0 from the measurement center. For example, a range α in FIG. 44 indicates the range between the maximum and minimum measurement values among the measurement values. A determination threshold correction process in FIG. 45 is thus introduced, so as to narrow the range between the upper-limit and lower-limit thresholds, which was set by an operation of the user before the applying-setpoint learning process, and thereby increase the accuracy of evaluation of a conforming or nonconforming product in the inspection of the measurement target 1.

The determination threshold correction process is started, for example, when the acquirer 341 receives an operation of the user to a determination threshold correction button 754 in the window 75 for displaying a time variation in measurement value in FIG. 44 after completion of the applying-setpoint learning process.

The determination threshold correction process will now be explained with reference to the flowchart in FIG. 45.

First, in Step S920, the acquirer 341 reads the desired measurement value 352 from the second storage 35, and thus acquires the upper-limit and lower-limit thresholds serving as the determination thresholds.

In Step S921, the threshold corrector 347 acquires multiple measurement values from the reference workpiece acquired using the optimized setpoints X_opt. The threshold corrector 347 then extracts the maximum and minimum measurement values from the multiple measurement values.

In Step S922, the threshold corrector 347 calculates a first difference, which is the difference between the upper-limit threshold and the maximum measurement value.

In Step S923, the threshold corrector 347 calculates a second difference, which is the difference between the lower-limit threshold and the minimum measurement value.

In Step S924, the threshold corrector 347 selects a smaller one of the first difference and the second difference as an adjustment value.

In Step S925, the threshold corrector 347 subtracts the adjustment value from the upper-limit threshold set by an operation of the user in Step S3 in FIG. 6 and adds the adjustment value to the lower-limit threshold, thereby correcting the upper-limit and lower-limit thresholds. The determination thresholds defined by the corrected upper-limit and lower-limit thresholds are then stored into the second storage 35 as the desired measurement value 352. The determination threshold correction process is then terminated.

As explained above, in Embodiment 15, multiple measurement values are acquired from the reference workpiece using the optimized setpoints Xx, and the upper-limit and lower-limit thresholds defining the range of determination thresholds are corrected, such that the maximum and minimum measurement values fall within the range of the determination thresholds, and such that the corrected range is narrower than the range of determination thresholds (that is, the range between the upper-limit and lower-limit thresholds set by the user) that was defined before execution of the applying-setpoint learning process.

In the setpoint adjustment apparatus for the displacement meter 10 according to Embodiment 15, the threshold corrector 347 corrects the upper-limit and lower-limit thresholds, such that the corrected range of the desired measurement value 352 is narrower than the range of the desired measurement value 352 set before learning of the applying setpoints Yy, and such that the measurement values acquired from the reference workpiece using the applying setpoints Yy fall within the corrected range of the desired measurement value 352. This configuration can accurately correct the desired measurement value 352 to be used in inspection of the measurement target 1. The configuration can also increase the accuracy of evaluation of a conforming or nonconforming product.

Embodiment 16

A setpoint adjustment system for displacement meters according to Embodiment 16 will now be described with reference to FIGS. 16, 42, 43, 46, and 47. The component identical to that in any one of Embodiments 1 to 14 will not be redundantly described.

Embodiment 16 differs from Embodiment 14, the modification of Embodiment 14, or the combined embodiment thereof (hereinafter abbreviated as "Embodiment 14 or the like") in that the inspection of the measurement target 1 on the basis of the optimized setpoints X_opt after the applying-setpoint learning process in Embodiment 14 or the like also involves another applying-setpoint learning process. The following description is directed to an example in Embodiment 14 or the like, in which the applying-setpoint learning process with a first displacement meter 10A is followed by inspection of the measurement target 1 using a measurement value for inspection acquired at the first displacement meter 10A, and more optimized applying setpoints Yy are concurrently learned using an amount of received light for learning acquired at a second displacement meter 10B, which is additionally connected to the first communication I/F 21 of the PLC 20, and a measurement value for learning acquired at the second displacement meter 10B.

Figure 46:
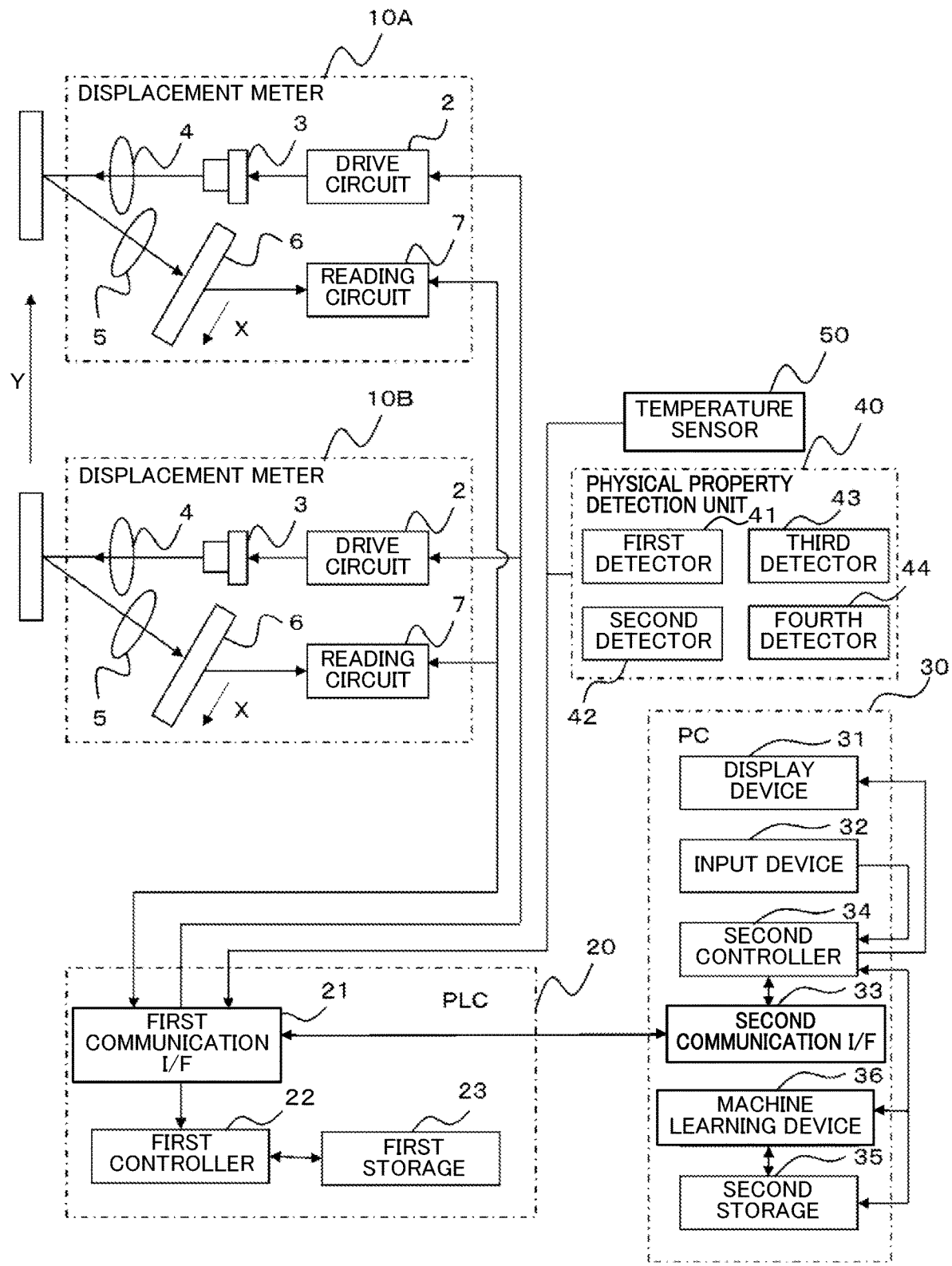
FIG. 46 illustrates an entire configuration of a setpoint adjustment system for displacement meters according to Embodiment 16 of the disclosure.

As illustrated in FIG. 46, the setpoint adjustment system for displacement meters according to Embodiment 16 is equipped with multiple displacement meters, that is, the first displacement meter 10A and the second displacement meter 10B. The first displacement meter 10A and the second displacement meter 10B are optical displacement meters, for example. In the example illustrated in FIG. 46 in which the measurement target 1 is transported in the Y direction by a belt conveyor, for example, the second displacement meter 10B is disposed on the upstream side while the first displacement meter 10A is disposed on the downstream side. This configuration is, however, a mere example. The first displacement meter 10A may be disposed on the upstream side while the second displacement meter 10B is disposed on the downstream side. The first displacement meter 10A and the second displacement meter 10B are installed to achieve the identical measurement conditions for the measurement target 1. Specifically, the first displacement meter 10A and the second displacement meter 10B are disposed such that the distance from the second displacement meter 10B to the measurement target 1 is equal to the distance from the first displacement meter 10A to the measurement target 1. In addition, the second displacement meter 10B is installed in the manner (installed for achieving diffusion reflection or installed for achieving regular reflection) identical to that for the first displacement meter 10A.

Figure 47:
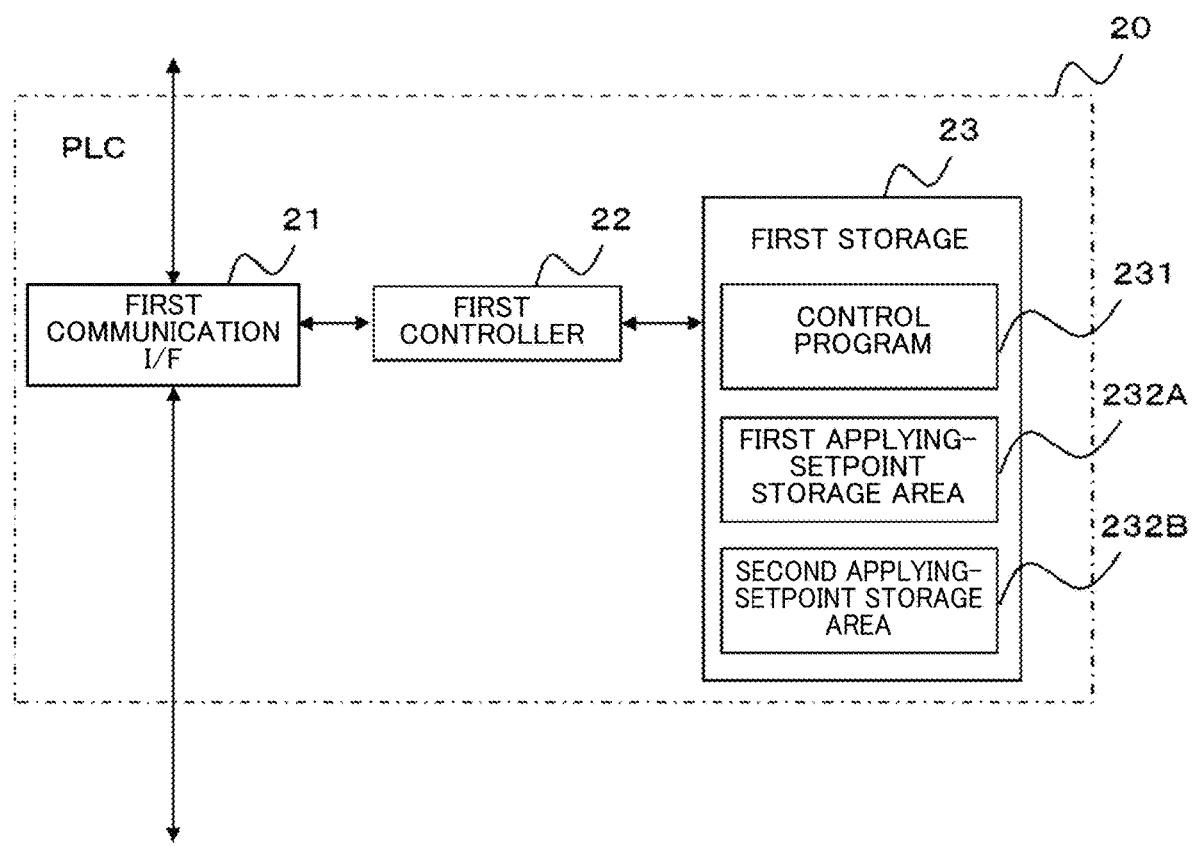
FIG. 47 illustrates functional blocks of a PLC included in the setpoint adjustment system for displacement meters according to Embodiment 16 of the disclosure.

As illustrated in FIG. 47, the first storage 23 of the PLC 20 in Embodiment 16 has a first applying-setpoint storage area 232A for storing applying setpoints Yy for the first displacement meter 10A, and a second applying-setpoint storage area 232B for storing applying setpoints Yy for the second displacement meter 10B.

The first applying-setpoint storage area 232A stores the applying setpoints Yy set at the time of completion of the applying-setpoint learning process using a reference workpiece, that is, the applying setpoints Yy identical to the optimized setpoints X_opt stored in the optimized-setpoint storage area 356 at the time of completion of the applying-setpoint learning process using the reference workpiece in Embodiment 14 or the like. The applying setpoints Yy for individual attributes stored in the first applying-setpoint storage area 232A will be used in inspection of the measurement target 1.

The second applying-setpoint storage area 232B stores the applying setpoints Yy, which are sequentially changed and stored as in Embodiment 14, in parallel to inspection of the measurement target 1, so as to learn more optimized applying setpoints Yy. At first, the second applying-setpoint storage area 232B stores the applying setpoints Yy identical to the optimized setpoints X_opt stored in the optimized-setpoint storage area 356 at the time of completion of the applying-setpoint learning process using the reference workpiece, like the first applying-setpoint storage area 232A.

Figure 42:
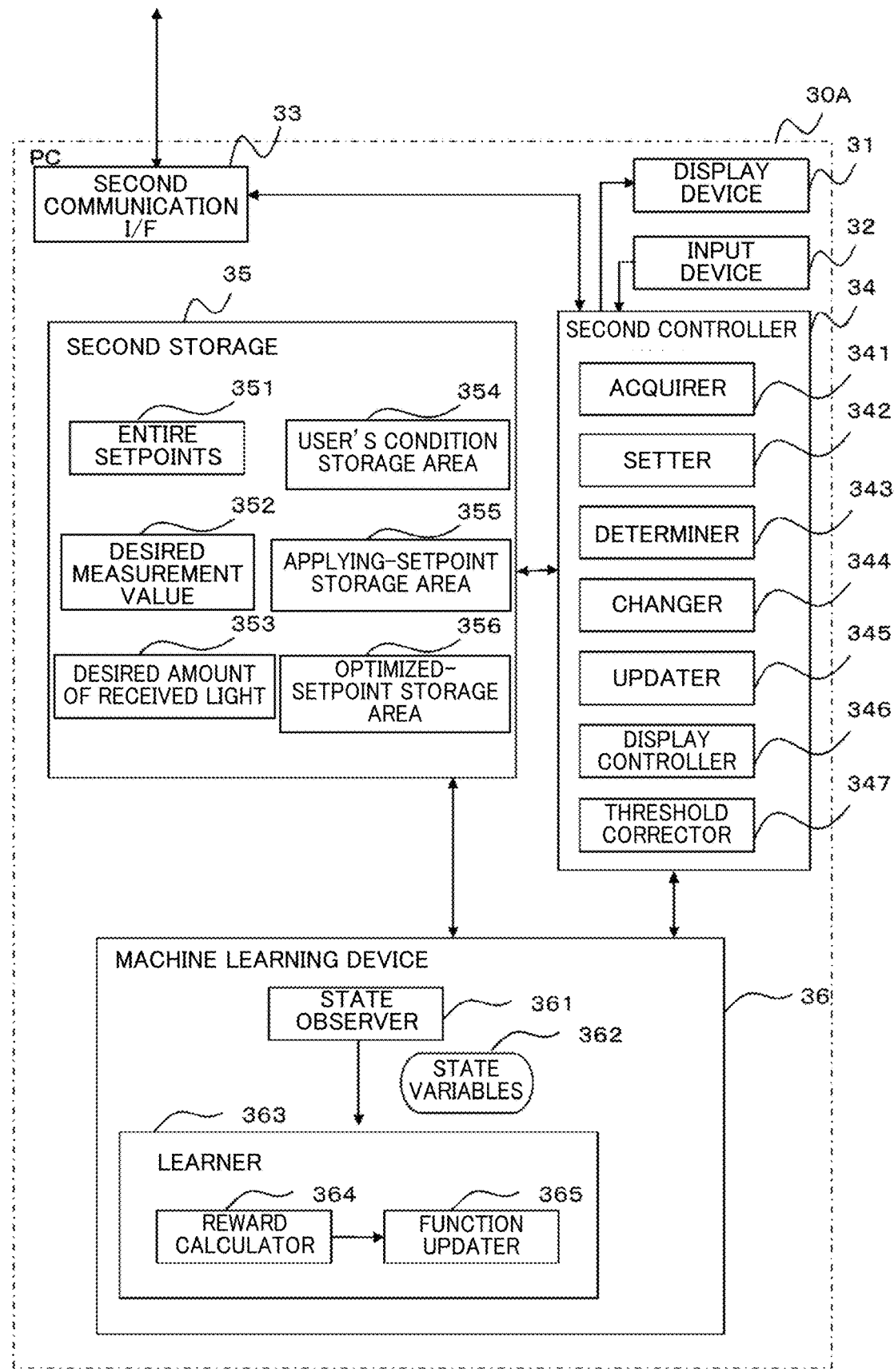
FIG. 42 illustrates functional blocks of a PC included in the setpoint adjustment system for a displacement meter according to Embodiment 14 of the disclosure.

The PC 30A in Embodiment 16 is identical to the PC 30A in FIG. 42 in Embodiment 14 or the like.

The first displacement meter 10A is a displacement meter for inspection of the measurement target 1. The laser diode 3 of the first displacement meter 10A serves as a first light source for emitting light to the measurement target 1, which is an inspection target. The image sensor 6 of the first displacement meter 10A serves as a first light receiver for receiving first reflected light from the measurement target 1, which is an inspection target, and outputting first reception light signals. The PLC 20 executes the control program 231 in accordance with the applying setpoints Yy stored in the first applying-setpoint storage area 232A (which are identical to the optimized setpoints X_opt stored in the optimized-setpoint storage area 356 at the time of completion of the applying-setpoint learning process using the reference workpiece). In Step S1001 of the inspection process in FIG. 16, the acquirer 341 of the PC 30 acquires a measurement value for inspection, which indicates a displacement of the measurement target 1 as an inspection target on the basis of the first reception light signals from the first displacement meter 10A via the PLC 20. The determiner 343 of the PC 30 continues to execute Steps S1002 to S1005 of the inspection process in FIG. 16 and evaluates whether the measurement target 1 is a conforming or nonconforming product.

The second displacement meter 10B is a displacement meter for learning of more optimized applying setpoints Yy during inspection of the measurement target 1. The second displacement meter 10B acquires an amount of received light for learning and a measurement value for learning, which indicates a displacement of the inspection target. The laser diode 3 of the second displacement meter 10B serves as a second light source for emitting light to the measurement target 1, which is an inspection target. The image sensor 6 of the second displacement meter 10B serves as a second light receiver for receiving second reflected light from the measurement target, which is an inspection target, and outputting second reception light signals. The PLC 20 executes the control program 231 in accordance with the applying setpoints Yy stored in the second applying-setpoint storage area 232B, and acquires the amount of received light for learning and the measurement value for learning from the second displacement meter 10B. The PC 30 then executes an applying-setpoint learning process in FIG. 43 to learn more optimized applying setpoints Yy. The second displacement meter 10B may be controlled by the control program 231 so as to receive, as second reflected light, the reflected light from the measurement target 1 identical to the measurement target 1 from which the measurement value for inspection is acquired at the first displacement meter 10A, and output second reception light signals. In the case where similar measurement targets 1 are transported by the belt conveyor, for example, the amount of received light for learning and the measurement value for learning acquired at the second displacement meter 10B may be an amount of received light and a measurement value from a measurement target 1 different from the measurement target 1 subject to inspection at the first displacement meter 10A.

The inspection process achieved by the first displacement meter 10A and the applying-setpoint learning process achieved by the second displacement meter 10B will now be explained with reference to FIGS. 16 and 43.

As explained above, the description assumes that the applying-setpoint learning process using the reference workpiece has been completed, and the optimized setpoints X_opt stored in the optimized-setpoint storage area 356 at the time of completion of the applying-setpoint learning process using the reference workpiece has already been stored in the first applying-setpoint storage area 232A.

First, the inspection process based on the measurement value from the first displacement meter 10A will be explained with reference to FIG. 16.

First, in Step S1001, the acquirer 341 of the PC 30 acquires the measurement value for inspection from the first displacement meter 10A, which is acquired by execution of the control program 231 at the first controller 22 of the PLC 20 in accordance with the applying setpoints Yy stored in the first applying-setpoint storage area 232A.

In Step S1002, the determiner 343 of the PC 30 determines whether the measurement value for inspection from the first displacement meter 10A is within the range of the desired measurement value 352, as in Embodiment 1. Steps S1003 to S1005 are then continuously executed to determine whether the measurement target 1 as an inspection target is a conforming or nonconforming product.

The applying-setpoint learning process based on the amount of received light for learning and the measurement value for learning from the second displacement meter 10B will now be explained with reference to FIG. 43. The applying-setpoint learning process based on the amount of received light for learning and the measurement value for learning from the second displacement meter 10B is executed in parallel to the inspection process based on the measurement value for inspection from the first displacement meter 10A.

First, in Step S900, the setter 342 reads the optimized setpoints X_opt for individual attributes from the optimized-setpoint storage area 356, stores the optimized setpoints X_opt into the applying-setpoint storage area 355 and the second applying-setpoint storage area 232B, and employs the optimized setpoints X_opt as the applying setpoints Yy to be used at the second displacement meter 10B.

In Step S901, the state observer 361 observes, as the state variables 362, the amount of received light for learning and the measurement value for learning from the second displacement meter 10B, which are acquired using the applying setpoints Yy stored in the second applying-setpoint storage area 232B via the PLC 20 and the acquirer 341 of the PC 30, and the applying setpoints Yy stored in the applying-setpoint storage area 355. The applying setpoints Yy stored in the applying-setpoint storage area 355, included in the state variables 362 observed by the state observer 361, are identical to the applying setpoints Yy stored in the second applying-setpoint storage area 232B and were used in acquisition of the amount of received light for learning and the measurement value for learning from the measurement target 1, which is the inspection target, at the second displacement meter 10B. The state observer 361 then transmits the state variables 362 to the reward calculator 364, as in Embodiment 14 or the like. It should be noted that the amount of received light for learning and the measurement value for learning acquired at the second displacement meter 10B are derived from the measurement target 1 identical to the inspection target inspected by the first displacement meter 10A. The process then goes to Step S902.

In Step S902, the reward calculator 364 determines whether the amount of received light for learning currently acquired from the state observer 361 is closer to the desired amount 353 of received light than the amount of received light for learning that has been closest to the desired amount 353 of received light among the amounts of received light acquired in the past, as in Embodiment 14 or the like. In Step S903 or S904, the reward calculator 364 increases or decreases the reward, as in Embodiment 14 or the like. The process then goes to Step S905.

In Step S905, the reward calculator 364 determines whether the measurement value for learning currently acquired from the state observer 361 is closer to the desired measurement value 352 than the measurement value for learning that has been closest to the desired measurement value 352 among the measurement values acquired in the past, as in Embodiment 14 or the like. In Step S906 or S907, the reward calculator 364 increases or decreases the reward, as in Embodiment 14 or the like. The process then goes to Step S908.

In Step S908, the function updater 365 updates the action-value function $Q(s_t, a_t)$ on the basis of the increased or decreased reward, transmits the updated action-value function $Q(s_t, a_t)$ to the second storage 35, and causes the action-value function $Q(s_t, a_t)$ to be stored into the second storage 35, as in Embodiment 14 or the like. The function updater 365 provides an instruction to the updater 345 of the second controller 34, so that the updater 345 causes the applying setpoints Yy that achieve the highest reward among the applying setpoints Yy in the past (including the current applying setpoints Yy) used in acquisition of the measurement values for learning and the amounts of received light for learning from the measurement target 1, which is the inspection target, to be stored into the optimized-setpoint storage area 356. The process then goes to Step S909.

In Step S909, the determiner 343 determines whether all the amounts of received light for learning and the measurement values for learning have already been acquired from the measurement target 1, which is the inspection target, using all the applying setpoints Yy, as in Embodiment 14 or the like. If not all the amounts of received light for learning and the measurement values for learning have been acquired in Step S909 (Step S909: No), the process goes to Step S910.

In Step S910, the changer 344 stores a combination of the setpoints Xx (Ix, Jx, Kx, Lx, Mx, Nx, Ox . . . ) for individual attributes different from the previous combination into the applying-setpoint storage area 355 and the second applying-setpoint storage area 232B, thereby changing the applying setpoints Yy to be used at the second displacement meter 10B, as in Embodiment 14 or the like. The process then returns to Step S901. Steps S901 to S910 are repeated using the new applying setpoints Yy.

If all the amounts of received light for learning and the measurement values for learning have already been acquired in Step S909 (Step S909: Yes), the updater 345 transmits an instruction to the first controller 22 of the PLC 20, so as to cause the optimized setpoints X_opt for individual attributes (the optimized setpoints I_opt, J_opt, K_opt, L_opt, M_opt, N_opt, O_opt . . . , or the setpoints Xx for individual attributes associated with the optimized setpoint P_opt for measurement recipe) stored in the optimized-setpoint storage area 356 at the time of completion of the applying-setpoint learning process, to be stored into the first applying-setpoint storage area 232A and retained as the applying setpoints Yy for individual attributes to be used at the first displacement meter 10A, in Step S911. The updater 345 then adds the optimized setpoints X_opt for individual attributes stored in the optimized-setpoint storage area 356 to the entire setpoints 351 in the second storage 35 in the form of a new setpoint Px for measurement recipe.

The applying-setpoint learning process is then terminated. This configuration is, however, a mere example. The applying-setpoint learning process may be repeated from the beginning during continuation of the inspection process based on the measurement value for inspection acquired at the first displacement meter 10A. Alternatively, the applying-setpoint learning process may be followed by the determination threshold correction process in Embodiment 15.

Although the state observer 361 observes both of the measurement value for learning and the amount of received light for learning from the second displacement meter 10B in Embodiment 16, the state observer 361 may observe only the measurement value for learning. In this case, Steps S902 to S904 of the applying-setpoint learning process in FIG. 43 should be omitted.

In the setpoint adjustment apparatus for displacement meters according to Embodiment 16, the learner 363 learns the applying setpoints Yy in accordance with the training data set generated on the basis of the state variables, which contain the measurement value for learning from the second displacement meter 10B and the applying setpoints Yy used in measurement of the inspection target at the second displacement meter 10B, while the determiner 343 performs inspection by determining whether the measurement value for inspection, which is acquired from the measurement target 1 as the inspection target at the first displacement meter 10A, is within the range of the desired measurement value. That is, the applying setpoints Yy are learned on the basis of the measurement value for learning acquired at the second displacement meter 10B during inspection of the inspection target on the basis of the measurement value for inspection acquired at the first displacement meter 10A. This configuration can search for more appropriate applying setpoints Yy without affecting the inspection of the inspection target at the first displacement meter 10A, regardless of any change in the environment during the inspection.

Furthermore, the setpoint adjustment apparatus for displacement meters according to Embodiment 16 causes the applying setpoints Yy learned on the basis of the measurement value for learning acquired at the second displacement meter 10B to be retained for updating the applying setpoints Yy to be used at the first displacement meter 10A. This configuration can continue the inspection of the inspection target after employment of more appropriate applying setpoints Yy.

In addition, in the setpoint adjustment apparatus for displacement meters according to Embodiment 16, the optimized setpoints X_opt for individual attributes learned on the basis of the measurement value for learning acquired at the second displacement meter 10B are added to the entire setpoints 351 in the form of a new setpoint Px for measurement recipe. This configuration can reuse the added new setpoint Px for measurement recipe to set the applying setpoints Yy for individual attributes, for example, when another displacement meter 10 is connected to the PLC 20 or when the measurement target 1 is changed.

Furthermore, in the setpoint adjustment apparatus for displacement meters according to Embodiment 16, the learner 363 learns the applying setpoint Yy for light emission and the applying setpoint Yy for sampling period in accordance with the training data set generated on the basis of the state variables, which further contain the amount of received light for learning from the second displacement meter 10B, while the determiner 343 performs inspection by determining whether the measurement value for inspection, which is acquired from the measurement target 1 as the inspection target at the first displacement meter 10A, is within the range of the desired measurement value. That is, the applying setpoint Yy for light emission and the applying setpoint Yy for sampling period are learned on the basis of the amount of received light for learning from the second displacement meter 10B, during inspection of the inspection target on the basis of the measurement value for inspection acquired at the first displacement meter 10A. This configuration can search for a more appropriate applying setpoint Yy for light emission and a more appropriate applying setpoint Yy for sampling period without affecting the inspection of the inspection target at the first displacement meter 10A, regardless of any change in the environment during the inspection.

Other Modifications

Although Embodiments 1 to 16 are directed to the applying-setpoint adjustment process or the applying-setpoint learning process for the optical displacement meter 10 configured by applying the triangulation principle, this configuration should not be construed as limiting the disclosure. The scope of the disclosure also encompasses preliminary adjustment of applying setpoints for optical displacement meters in other systems, such as a coaxial-confocal optical displacement meter in which the light emitted to the measurement target 1 and the light reflected from the measurement target 1 are arranged on the same axis, for example.

Although Embodiments 1 to 16 are directed to the applying-setpoint adjustment process or the applying-setpoint learning process for the optical displacement meter 10, this configuration should not be construed as limiting the disclosure. The scope of the disclosure also encompasses preliminary adjustment of applying setpoints for displacement meters in other systems. Examples of the displacement meters in other systems include: i) an induction proximity sensor for generating a magnetic flux due to AC current flowing in a detection coil and determining a displacement between the detection coil and a metal measurement target 1 on the basis of a variation in inductance in the detection coil caused by the measurement target 1; ii) an ultrasonic displacement sensor, in which a transmitter transmits ultrasonic waves to a measurement target 1 and a receiver receives the reflected ultrasonic waves, and which determines a displacement by calculating the relationship between the velocity of the ultrasonic waves and the time required from transmission until reception of the ultrasonic waves; iii) a displacement sensor based on electromagnetic waves, in which a transmitter transmits electromagnetic waves, such as millimeter waves, to a measurement target 1 and a receiver receives the reflected electromagnetic waves, and which determines a displacement on the basis of attenuation of the strength of the electromagnetic waves, for example; and a contact displacement sensor for determining a displacement using a probe coming into contact with a measurement target 1.

Although two displacement meters are connected to the PLC 20 in Embodiment 16, this configuration should not be construed as limiting the disclosure. For example, three or more displacement meters may be connected to the PLC 20. In this case, one of the three or more displacement meters may serve as a first displacement meter for acquiring a measurement value for inspection, while the remaining two or more displacement meters may serve as displacement meters for acquiring amounts of received light for learning and measurement values for learning. The remaining two or more displacement meters for acquiring amounts of received light for learning and measurement values for learning may search for mutually different applying setpoints Yy. For example, one displacement meter may search for an applying setpoint for measurement mode, while another displacement meter may search for an applying setpoint for light emission.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Measurement target
2 Drive circuit
3 Laser diode
4 Light emitting lens
5 Light receiving lens
6 Image sensor
7 Reading circuit
8 Background member
10 Displacement meter
10A First displacement meter
10B Second displacement meter
11 Neutral density filter
20 PLC
21 First communication I/F
22 First controller
23 First storage
30, 30A PC
31 Display device
32 Input device
33 Second communication IX
34 Second controller
35 Second storage
36 Machine learning device
40 Physical property detection unit
41 First detector 42 Second detector
43 Third detector
44 Fourth detector
50 Temperature sensor
51 Vibration sensor
60 Measurement recipe table
70 Window for selecting a value to be measured
71 Window for requesting installation of a reference workpiece
72 Window for setting determination thresholds
73 Window for setting an acquisition interval of measurement values
74 Window for displaying measurement values
75 Window for displaying a time variation in measurement value
76 Window for displaying a received light waveform
77 Window for requesting installation of a neutral density filter
231 Control program
232 Applying-setpoint storage area
232A First applying-setpoint storage area
232B Second applying-setpoint storage area
341 Acquirer
342 Setter
343 Determiner
344 Changer
345 Updater
347 Threshold corrector
351 Entire setpoints
352 Desired measurement value
354 User's condition storage area
355 Applying-setpoint storage area
361 State observer
362 State variable
363 Learner
364 Reward calculator
365 Function updater
431 Probe
701 Field for selecting a value to be measured
702 Set button
710, 722, 731, 732 Button
720, 721, 730 Input field
740, 741 Field for displaying a measurement value
750 Distribution map
751 Upper-limit threshold
752 Lower-limit threshold
753 Measurement value
754 Determination threshold correction button
760, 761, 762 Display region

The invention claimed is:

1. A setpoint adjustment apparatus for a displacement meter, the setpoint adjustment apparatus comprising:
an acquirer to acquire a measurement value indicating a displacement of a reference workpiece on basis of a reception light signal received from a displacement meter, the displacement meter comprising a light source to emit light to the reference workpiece and a light receiver to receive reflected light from the reference workpiece and output the reception light signal, the reference workpiece serving as a standard of a measurement target;
a storage comprising a storage area for storing an applying setpoint to be used in measurement of the reference workpiece, the storage being configured to store setpoints defining measurement conditions for measurement of the reference workpiece and store a desired measurement value to be compared with the measurement value;
a determiner to determine whether the measurement value acquired by the acquirer in measurement of the reference workpiece using the applying setpoint is within a range of the desired measurement value; and
a changer to change the applying setpoint, wherein
when the measurement value is determined to be within the range of the desired measurement value, the applying setpoint used in acquisition of the measurement value is employed as the applying setpoint to be used in inspection of a measurement target, and
when the measurement value is determined to be out of the range of the desired measurement value,
the changer changes the applying setpoint from the applying setpoint used in acquisition of the measurement value to a different applying setpoint,
the acquirer measures the reference workpiece using the changed applying setpoint and acquires a measurement value, and
the determiner determines whether the measurement value acquired using the changed applying setpoint is within the range of the desired measurement value, and wherein the setpoints comprise at least one of
setpoints for light emissions each indicating an amount of light emitted from the light source to the reference workpiece, or
setpoints for sampling periods each indicating a period of reading the reception light signal from the light receiver.

2. The setpoint adjustment apparatus according to claim 1, further comprising:
an updater to employ the applying setpoint used in acquisition of either one of a first measurement value and a second measurement value closer to the desired measurement value as the applying setpoint to be used in measurement of a measurement target, the first measurement value being acquired using a first applying setpoint corresponding to the applying setpoint before being changed by the changer, the second measurement value being acquired using a second applying setpoint corresponding to the applying setpoint after being changed by the changer.

3. The setpoint adjustment apparatus according to claim 1, further comprising:
a receiver to receive an operation of a user for designating an acquisition interval of measurement values, the acquisition interval being an interval of acquisition of measurement values in the acquirer, wherein
the setpoints comprise
a setpoint for a moving average filter for filtering the measurement value by a moving average method,
setpoints for moving-average calculation times each indicating a number of calculation times of moving average of the moving average filter, and
setpoints for sampling periods each indicating a period of reading the reception light signal from the light receiver, and
the changer changes the applying setpoint to a setpoint for the moving-average calculation times equal to or smaller than allowable calculation times of moving average, the allowable calculation times being calculated by dividing the acquisition interval of measurement values by an applying setpoint for a sampling period.

4. The setpoint adjustment apparatus according to claim 1, wherein the acquirer acquires an amount of received light reflected from the reference workpiece and received at the light receiver on basis of the reception light signal, the storage further stores a desired amount of received light to be compared with the amount of received light, the determiner determines whether the amount of received light is within a range of the desired amount of received light, the amount of received light being acquired by the acquirer in measurement of the reference workpiece using at least one of an applying setpoint for a light emission or an applying setpoint for a sampling period, the changer changes the at least one of the applying setpoint for the light emission or the applying setpoint for the sampling period, when the measurement value is determined to be within the range of the desired measurement value, the applying setpoint used in acquisition of the measurement value is employed as the applying setpoint to be used in inspection of a measurement target, and when the measurement value is determined to be out of the range of the desired measurement value and when the amount of received light is determined to be out of the range of the desired amount of received light, the changer changes the at least one of the applying setpoint for a light emission or the applying setpoint for a sampling period to a different applying setpoint that is different from the applying setpoint used in acquisition of the measurement value, the acquirer measures the reference workpiece using the changed applying setpoint and acquires a measurement value, and the determiner determines whether the measurement value acquired using the changed applying setpoint is within the range of the desired measurement value.

5. The setpoint adjustment apparatus according to claim 4, further comprising:

an updater to employ an applying setpoint used in acquisition of either one of a first amount of received light and a second amount of received light closer to the desired amount of received light as the applying setpoint to be used in measurement of a measurement target, the first amount of received light being acquired using a first applying setpoint, the first applying setpoint corresponding to at least one of the applying setpoint for the light emission or the applying setpoint for the sampling period before being changed by the changer, the second amount of received light being acquired using a second applying setpoint, the second applying setpoint corresponding to at least one of the applying setpoint for the light emission or the applying setpoint for the sampling period after being changed by the changer.

6. The setpoint adjustment apparatus according to claim 1, wherein the setpoints belong to multiple attributes to be adjusted, the attributes comprise two or more of:

a light emission indicating an amount of light emitted from the light source to the reference workpiece;

a sampling period indicating a period of reading the reception light signal from the light receiver;

a measurement mode for determining a peak point of a received light waveform based on the reception light signal from the light receiver;

filter types comprising a moving average filter for filtering the measurement value by a moving average method, a low-pass filter for diminishing components of frequencies higher than a cut-off frequency in the received light waveform, and a high-pass filter for diminishing components of frequencies lower than the cut-off frequency in the received light waveform;

moving-average calculation times in a filtering process of the measurement value through the moving average filter;

the cut-off frequency; and a refractive index of a measurement target, the attributes further comprise a measurement recipe associated with the applying setpoints for the respective attributes depending on physical properties of the measurement target, the changer changes the applying setpoint for the measurement recipe among the applying setpoints for the attributes, when the measurement value is determined to be within the range of the desired measurement value, the applying setpoints for the attributes associated with the measurement recipe used in acquisition of the measurement value determined to be within the range of the desired measurement value are employed as the applying setpoints to be used in inspection of the measurement target, and when the determiner determines the measurement value to be out of the range of the desired measurement value, the measurement value being acquired using the applying setpoints for the attributes associated with the measurement recipe changed by the changer, then the changer switches the attribute to be adjusted to an attribute other than the measurement recipe among the multiple attributes, and changes the applying setpoint for the attribute other than the measurement recipe.

7. The setpoint adjustment apparatus according to claim 4, wherein the setpoints belong to multiple attributes to be adjusted, the attributes comprise, as a first attribute, at least one of:

a light emission indicating an amount of light emitted from the light source to the reference workpiece; or a sampling period indicating a period of reading the reception light signal from the light receiver, the attributes further comprise, as a second attribute, at least one of:

a measurement mode for determining a peak point of a received light waveform based on the reception light signal from the light receiver;

filter types comprising a moving average filter for filtering the measurement value by a moving average method, a low-pass filter for diminishing components of frequencies higher than a cut-off frequency in the received light waveform, and a high-pass filter for diminishing components of frequencies lower than the cut-off frequency in the received light waveform;

moving-average calculation times in a filtering process of the measurement value through the moving average filter;

the cut-off frequency; or a refractive index of a measurement target, the changer changes the applying setpoint for the first attribute, when the measurement value is determined to be within the range of the desired measurement value, the applying setpoint for the first attribute used in acquisition of the measurement value is employed as the applying setpoint for the first attribute to be used in inspection of the measurement target, and when the measurement value is determined to be out of the range of the desired measurement value and when the amount of received light is determined to be out of the range of the desired amount of received light, the changer switches the attribute to be adjusted from the first attribute to the second attribute, and changes the applying setpoint for the second attribute.

8. The setpoint adjustment apparatus according to claim 4, wherein
attributes of the setpoints to be adjusted comprise:
a light emission indicating an amount of light emitted from the light source to the reference workpiece; and
a sampling period indicating a period of reading the reception light signal from the light receiver,
the changer changes the applying setpoint for the light emission before changing the applying setpoint for the sampling period,
when the measurement value is determined to be within the range of the desired measurement value, the applying setpoint for the light emission used in acquisition of the measurement value is employed as the applying setpoint for the light emission to be used in inspection of a measurement target, and
when the determiner determines the measurement value to be out of the range of the desired measurement value, the measurement value being acquired using the applying setpoint for the light emission changed by the changer, and when the determiner determines the amount of received light to be out of the range of the desired amount of received light, then the changer switches the attribute to be adjusted from the light emission to the sampling period, and changes the applying setpoint for the sampling period.

9. The setpoint adjustment apparatus according to claim 1, wherein
the setpoints belong to multiple attributes to be adjusted, the attributes comprise:
filter types comprising at least a moving average filter for filtering the measurement value by a moving average method; and
moving-average calculation times in a filtering process of the measurement value through the moving average filter,
the changer changes the applying setpoint for the filter type before changing the applying setpoint for the moving-average calculation times, and
after finalization of the applying setpoint for the filter type, the changer switches the attribute to be adjusted from the filter type to the moving-average calculation times, and changes the applying setpoint for the moving-average calculation times.

10. The setpoint adjustment apparatus according to claim 1, wherein
the setpoints belong to multiple attributes to be adjusted, the attributes comprise:
filter types comprising at least one of
a low-pass filter for diminishing components of frequencies higher than a cut-off frequency in the received light waveform, or
a high-pass filter for diminishing components of frequencies lower than the cut-off frequency in the received light waveform; and
the cut-off frequency,
the changer changes the applying setpoint for the filter type before changing the applying setpoint for the cut-off frequency, and
after finalization of the applying setpoint for the filter type, the changer switches the attribute to be adjusted from the filter type to the cut-off frequency, and changes the applying setpoint for the cut-off frequency.

11. The setpoint adjustment apparatus according to claim 1, wherein
the acquirer further acquires a value detected at a physical property detection unit to detect physical properties of the reference workpiece,
the setpoints belong to multiple attributes to be adjusted,
the attributes comprise two or more of:
a light emission indicating an amount of light emitted from the light source to the reference workpiece;
a sampling period indicating a period of reading the reception light signal from the light receiver; and
a measurement mode for determining a peak point of a received light waveform based on the reception light signal from the light receiver;
filter types comprising
a moving average filter for filtering the measurement value by a moving average method,
a low-pass filter for diminishing components of frequencies higher than a cut-off frequency in the received light waveform, and
a high-pass filter for diminishing components of frequencies lower than the cut-off frequency in the received light waveform;
moving-average calculation times in a filtering process of the measurement value through the moving average filter;
the cut-off frequency; and
a refractive index of a measurement target,
the attributes further comprise a measurement recipe associated with the applying setpoints for the respective attributes depending on the physical properties of the measurement target,
the changer changes the applying setpoint for the measurement recipe on basis of the value detected at the physical property detection unit, and
when the measurement value is determined to be within the range of the desired measurement value, the applying setpoints for the attributes associated with the measurement recipe used in acquisition of the measurement value are employed as the applying setpoints to be used in inspection of the measurement target.

12. The setpoint adjustment apparatus according to claim 1, wherein
the acquirer further acquires a value detected at a physical property detection unit to detect physical properties of the reference workpiece,
the setpoints comprise a setpoint for a moving average filter for filtering the measurement value by a moving average method,
the changer changes an applying setpoint for moving-average calculation times on basis of the value detected at the physical property detection unit, and
when the measurement value is determined to be within the range of the desired measurement value, the applying setpoint for the moving-average calculation times used in acquisition of the measurement value is employed as the applying setpoint for the moving-average calculation times to be used in inspection of a measurement target.

13. The setpoint adjustment apparatus according to claim 12, wherein
the acquirer further acquires a temperature detected at a temperature detector to detect a temperature of the displacement meter, and
the changer changes the applying setpoint for the moving-average calculation times such that the moving-average calculation times increase with a rise in the temperature detected at the temperature detector.

14. The setpoint adjustment apparatus according to claim 12, wherein
the acquirer further acquires a value detected at a vibration detector to detect vibration of the displacement meter, and
the changer changes the applying setpoint for the moving-average calculation times such that the moving-average calculation times increase with a rise in the value detected at the vibration detector.

15. A setpoint adjustment apparatus for a displacement meter, the setpoint adjustment apparatus comprising:
a storage to store setpoints defining measurement conditions for measurement of a reference workpiece serving as a standard of a measurement target and store a desired measurement value for evaluation of a result of measurement, the setpoints comprising an initial setpoint;
a setter to set the initial setpoint as an applying setpoint to be used in measurement of the measurement target;
an acquirer to acquire a measurement value indicating a displacement of the reference workpiece based on the initial setpoint and a reception light signal received from the displacement meter, the displacement meter including a light source to emit light to the reference workpiece and a light receiver to receive reflected light from the reference workpiece and output the reception light signal;
a determiner to determine whether the measurement value acquired by the acquirer using the initial setpoint is within a range of the desired measurement value; and
a changer to change the applying setpoint to another setpoint different from the initial setpoint, wherein
when the measurement value is determined to be within the range of the desired measurement value, the initial setpoint set by the setter is employed as the applying setpoint, and
when the measurement value is determined to be out of the range of the desired measurement value, the changer changes the applying setpoint to another setpoint different from the initial setpoint, and wherein
the setpoints comprise at least one of
setpoints for light emissions each indicating an amount of light emitted from the light source to the reference workpiece, or
setpoints for sampling periods each indicating a period of reading the reception light signal from the light receiver.

16. A setpoint adjustment apparatus for a displacement meter, the setpoint adjustment apparatus comprising:
processing circuitry configured as an acquirer to acquire a measurement value indicating a displacement of a reference workpiece on basis of a reception light signal received from a displacement meter, the displacement meter comprising a light source to emit light to the reference workpiece and a light receiver to receive reflected light from the reference workpiece and output the reception light signal, the reference workpiece serving as a standard of a measurement target;
a storage comprising a storage area for storing an applying setpoint to be used in measurement of the reference workpiece, the storage being configured to store setpoints defining measurement conditions for measurement of the reference workpiece and store a desired measurement value to be compared with the measurement value;
the processing circuitry further configured as a determiner to determine whether the measurement value acquired by the acquirer in measurement of the reference workpiece using the applying setpoint is within a range of the desired measurement value; and
the processing circuitry further configured as a changer to change the applying setpoint, wherein
when the measurement value is determined to be within the range of the desired measurement value, the applying setpoint used in acquisition of the measurement value is employed as the applying setpoint to be used in inspection of a measurement target, and
when the measurement value is determined to be out of the range of the desired measurement value,
the changer changes the applying setpoint from the applying setpoint used in acquisition of the measurement value to a different applying setpoint,
the acquirer measures the reference workpiece using the changed applying setpoint and acquires a measurement value, and
the determiner determines whether the measurement value acquired using the changed applying setpoint is within the range of the desired measurement value, and wherein
the setpoints comprise at least one of
setpoints for light emissions each indicating an amount of light emitted from the light source to the reference workpiece, or
setpoints for sampling periods each indicating a period of reading the reception light signal from the light receiver.

* * * * *